US012789702B2

(12) United States Patent
Lerner

(10) Patent No.: US 12,789,702 B2
(45) Date of Patent: Nov. 10, 2026

(54) INDICATORS TO IDENTIFY STATUS AND SAFETY OF VEHICLES

(71) Applicant: William S. Lerner, Litchfield, CT (US)

(72) Inventor: William S. Lerner, Litchfield, CT (US)

(*) Notice: Subject to any disclaimer, the term of this patent is extended or adjusted under 35 U.S.C. 154(b) by 22 days.

(21) Appl. No.: 18/956,078

(22) Filed: Nov. 22, 2024

(65) Prior Publication Data

US 2025/0162497 A1 May 22, 2025

Related U.S. Application Data

(63) Continuation of application No. 18/230,076, filed on Aug. 3, 2023, now abandoned, which is a
(Continued)

(51) Int. Cl.

| | |
|---|---|
| ***B60Q 1/50*** | (2006.01) |
| ***B60K 35/10*** | (2024.01) |
| ***B60K 35/22*** | (2024.01) |
| ***B60K 35/28*** | (2024.01) |
| ***B60K 35/60*** | (2024.01) |
| ***B60K 37/00*** | (2024.01) |

(Continued)

(52) U.S. Cl.

CPC .............. *B60Q 1/543* (2022.05); *B60K 35/10* (2024.01); *B60K 35/22* (2024.01); *B60Q 1/52* (2013.01); *B60W 30/08* (2013.01); *B60W 50/14* (2013.01); *B60K 35/28* (2024.01); *B60K 35/60* (2024.01); *B60K 37/00* (2013.01); *B60K 2360/178* (2024.01); *B60K 2360/797* (2024.01); *B60W 2030/082* (2013.01); *B60W 2050/146* (2013.01)

(58) Field of Classification Search
None
See application file for complete search history.

(56) References Cited

U.S. PATENT DOCUMENTS

| | | | | | |
|---|---|---|---|---|---|
| 4,574,269 | A * | 3/1986 | Miller | B60Q 1/5035 | 345/82 |
| 5,394,138 | A * | 2/1995 | Stephens | B60Q 1/52 | 340/471 |

(Continued)

FOREIGN PATENT DOCUMENTS

| | | | | | |
|---|---|---|---|---|---|
| CA | 2648123 | A1 * | 10/2007 | F21S 41/00 |
| CN | 1362923 | A * | 8/2002 | B62J 45/20 |

(Continued)

OTHER PUBLICATIONS

Alternative Fuel Vehicles and High Occupancy Vehicle Lanes, downloaded from https://afdc.energy.gov/laws/HOV on Nov. 24, 2021.

(Continued)

*Primary Examiner* — Kevin R Steckbauer
(74) *Attorney, Agent, or Firm* — Scale LLP

(57) ABSTRACT

One or more indicators provide an indication of the energy source of power for one or more vehicles. The indicators may be positioned on a vehicle and/or on other structures such as parking garages, tunnels, and entrance gates. The indicators may be visual and/or acoustic. On a vehicle the indicators are positioned to most likely be intact during and after an accident and provide a predetermined indication that identifies an energy source that provides power for the vehicle.

17 Claims, 45 Drawing Sheets

Related U.S. Application Data continuation of application No. 17/319,039, filed on May 12, 2021, now Pat. No. 11,760,258.

(60) Provisional application No. 63/024,500, filed on May 13, 2020.

(51) Int. Cl.

| | |
|---|---|
| ***B60Q 1/52*** | (2006.01) |
| ***B60W 30/08*** | (2012.01) |
| ***B60W 50/14*** | (2020.01) |

(56) References Cited

U.S. PATENT DOCUMENTS

| | | | | | |
|---|---|---|---|---|---|
| 5,829,846 | A * | 11/1998 | Zeiner | B60T 8/4275<br>303/113.5 |
| 6,587,042 | B2 * | 7/2003 | Tabata | G08B 25/016<br>340/432 |
| 7,476,013 | B2 * | 1/2009 | Gergets | F21S 41/00<br>362/543 |
| 7,559,316 | B2 * | 7/2009 | Matsushita | B60Q 1/44<br>701/104 |
| 7,905,640 | B2 * | 3/2011 | Gergets | B60Q 1/2611<br>362/543 |
| 8,487,752 | B2 * | 7/2013 | Stillfried | B60L 58/12<br>340/425.5 |
| 8,581,716 | B2 * | 11/2013 | Wright | B60Q 1/52<br>340/436 |
| 8,636,395 | B2 * | 1/2014 | Gergets | F21S 45/47<br>362/499 |
| 8,754,751 | B1 * | 6/2014 | Picolli | G01S 13/751<br>455/562.1 |
| 9,007,193 | B2 * | 4/2015 | Boston | B60Q 1/50<br>705/14.62 |
| 9,340,119 | B2 * | 5/2016 | Chen | B60Q 1/2661 |
| 9,346,397 | B2 * | 5/2016 | Gergets | B60Q 1/2611 |
| 9,487,125 | B2 * | 11/2016 | Geller | B60K 35/80 |
| 9,550,453 | B2 * | 1/2017 | Gergets | F21S 43/31 |
| 9,663,028 | B2 * | 5/2017 | Parkes | B60Q 1/50 |
| 9,873,375 | B2 * | 1/2018 | Matsubara | G10K 11/17855 |
| 9,878,656 | B2 * | 1/2018 | Gergets | F21V 23/04 |
| 10,061,326 | B2 * | 8/2018 | Gordon | B60R 21/0134 |
| 10,186,089 | B2 * | 1/2019 | Garcia | B60Q 1/5037 |
| 10,209,158 | B2 * | 2/2019 | Cho | G01M 3/3281 |
| 10,210,732 | B2 * | 2/2019 | Kim | B60Q 1/52 |
| 10,399,484 | B2 * | 9/2019 | Parkes | B60Q 1/50 |
| 10,598,564 | B2 * | 3/2020 | Cho | G01M 3/3281 |
| 10,644,387 | B2 * | 5/2020 | Shiina | H01Q 3/04 |
| 10,836,307 | B2 * | 11/2020 | Parkes | B60Q 1/50 |
| 11,283,163 | B2 * | 3/2022 | Thoday | B60Q 1/0023 |
| 11,511,626 | B2 * | 11/2022 | Kuroda | B60K 35/22 |
| 11,580,798 | B2 * | 2/2023 | Weber | B60L 58/12 |
| 11,642,873 | B2 * | 5/2023 | Masuyama | B32B 17/10036<br>359/453 |
| 11,760,258 | B1 * | 9/2023 | Lerner | B60K 35/10<br>701/1 |
| 12,479,521 | B2 * | 11/2025 | Schmidt | B62D 39/00 |
| 2007/0100687 | A1 * | 5/2007 | Yoshikawa | G06Q 30/0284<br>705/13 |
| 2007/0242472 | A1 * | 10/2007 | Gergets | F21S 41/321<br>340/815.4 |
| 2008/0000457 | A1 * | 1/2008 | Matsushita | F02D 41/00<br>701/104 |
| 2009/0141511 | A1 * | 6/2009 | Gergets | F21V 23/04<br>362/493 |
| 2011/0156589 | A1 * | 6/2011 | Gergets | B60Q 1/52<br>315/77 |
| 2011/0291822 | A1 * | 12/2011 | Boston | B60Q 1/50<br>340/425.5 |
| 2011/0295697 | A1 * | 12/2011 | Boston | B60Q 1/50<br>340/466 |
| 2012/0062373 | A1 * | 3/2012 | Wright | B60Q 1/52<br>340/436 |
| 2012/0201041 | A1 * | 8/2012 | Gergets | F21S 43/195<br>362/544 |
| 2012/0242466 | A1 * | 9/2012 | Stillfried | B60L 58/12<br>340/425.5 |
| 2014/0125476 | A1 * | 5/2014 | Gergets | F21V 23/04<br>340/471 |
| 2015/0175052 | A1 * | 6/2015 | Gergets | F21S 43/195<br>307/9.1 |
| 2015/0283939 | A1 * | 10/2015 | Parkes | B60Q 1/50<br>340/468 |
| 2015/0314697 | A1 * | 11/2015 | Chen | B60L 58/10<br>340/455 |
| 2015/0379844 | A1 * | 12/2015 | Kim | G08B 17/00<br>340/468 |
| 2016/0144778 | A1 * | 5/2016 | Tucker | B60Q 1/52<br>340/471 |
| 2017/0010178 | A1 * | 1/2017 | Cho | G01M 3/26 |
| 2017/0096099 | A1 * | 4/2017 | Matsubara | G10K 11/17855 |
| 2017/0168502 | A1 * | 6/2017 | Gordon | B60R 21/0134 |
| 2017/0305336 | A1 * | 10/2017 | Parkes | B60Q 1/50 |
| 2018/0033274 | A1 * | 2/2018 | Kim | B60Q 1/52 |
| 2018/0158255 | A1 * | 6/2018 | Garcia | B60Q 1/5037 |
| 2018/0186309 | A1 * | 7/2018 | Batten | G09G 3/36 |
| 2019/0178748 | A1 * | 6/2019 | Cho | G01M 3/3281 |
| 2019/0359126 | A1 * | 11/2019 | Parkes | B60Q 1/50 |
| 2020/0287278 | A1 * | 9/2020 | Thoday | B60Q 1/0023 |
| 2020/0290507 | A1 * | 9/2020 | Cobb | B60Q 1/0023 |
| 2021/0009032 | A1 * | 1/2021 | Parkes | B60Q 1/50 |
| 2022/0347976 | A1 * | 11/2022 | Masuyama | B32B 17/10036 |
| 2023/0036188 | A1 * | 2/2023 | Schmidt | B62D 39/00 |
| 2024/0109480 | A1 * | 4/2024 | Lerner | B60K 35/10 |
| 2025/0162497 | A1 * | 5/2025 | Lerner | B60K 35/10 |

FOREIGN PATENT DOCUMENTS

| | | | | | |
|---|---|---|---|---|---|
| CN | 1140434 | C * | 3/2004 | G08B 25/016 |
| CN | 101325002 | A * | 12/2008 | |
| CN | 102741084 | A * | 10/2012 | B60L 50/16 |
| CN | 102289693 | B * | 9/2013 | |
| CN | 105390018 | A * | 3/2016 | G08G 1/146 |
| CN | 102741084 | B * | 7/2016 | B60L 53/65 |
| CN | 106240445 | A * | 12/2016 | B60Q 1/503 |
| CN | 104158580 | B * | 8/2017 | |
| CN | 107393293 | A * | 11/2017 | G08G 1/015 |
| CN | 206672355 | U * | 11/2017 | |
| CN | 206818606 | U * | 12/2017 | |
| CN | 110182091 | A * | 8/2019 | B60Q 9/00 |
| CN | 110706443 | A * | 1/2020 | G08B 17/10 |
| CN | 210221397 | U * | 3/2020 | |
| CN | 110969892 | A * | 4/2020 | G08G 1/149 |
| CN | 105390018 | B * | 7/2020 | G08G 1/096811 |
| CN | 112644371 | A * | 4/2021 | H05B 47/115 |
| CN | 113920686 | A * | 1/2022 | G08B 21/02 |
| CN | 114340894 | A * | 4/2022 | G03B 21/62 |
| DE | 4234399 | A1 * | 4/1994 | B60Q 1/52 |
| DE | 102017207225 | A1 * | 10/2018 | B60R 13/04 |
| DE | 102019203307 | | 1/2020 | |
| DE | 102019203307 | B3 * | 1/2020 | G09F 21/04 |
| DE | 102019219261 | A1 * | 6/2021 | B60W 50/0205 |
| EP | 1878896 | A2 * | 1/2008 | B60Q 1/543 |
| EP | 2848448 | A2 | 3/2015 | |
| EP | 2019763 | B1 * | 7/2017 | F21S 41/00 |
| EP | 2848448 | B1 * | 10/2018 | B60L 53/14 |
| EP | 4011848 | A1 * | 6/2022 | G03B 21/62 |
| ES | 2637915 | T3 * | 10/2017 | F21S 41/00 |
| JP | 3853704 | B2 * | 12/2006 | |
| JP | 2014050291 | A * | 3/2014 | |
| JP | 6040643 | B2 * | 12/2016 | |
| JP | 2020055354 | A * | 4/2020 | G06F 3/14 |
| JP | 6715377 | B2 * | 7/2020 | |
| JP | 6745316 | B2 * | 8/2020 | G07C 5/06 |
| KR | 20030008085 | A * | 1/2003 | |
| KR | 20080048850 | A * | 6/2008 | H01M 8/04 |
| KR | 20120096229 | A * | 8/2012 | B60Q 1/30 |
| KR | 20170102710 | A * | 9/2017 | H02S 40/38 |
| KR | 20180035202 | A * | 4/2018 | B60Q 1/503 |
| KR | 101857942 | B1 * | 5/2018 | B60Q 1/503 |
| KR | 20200099936 | A * | 8/2020 | B60Q 1/50 |

(56) References Cited

FOREIGN PATENT DOCUMENTS

| | | | | | | |
|---|---|---|---|---|---|---|
| KR | 20220043203 | A | * | 4/2022 | ............ | G03B 21/62 |
| KR | 102496336 | B1 | * | 2/2023 | ............ | B60K 35/28 |
| TW | 202130513 | A | * | 8/2021 | ............ | G03B 21/62 |
| WO | WO-2007117854 | A2 | * | 10/2007 | ............ | F21S 41/00 |
| WO | WO-2012161818 | A1 | * | 11/2012 | ............ | B60Q 1/543 |
| WO | WO-2021107062 | A1 | * | 6/2021 | ............ | G03B 21/62 |

OTHER PUBLICATIONS

Amon, F., et al., Fire effluent contaminants, predictive models, and gap analysis, Technical Report, Jan. 2014.

Cirrone, D. et al., Pre-normative research for safety of hydrogen driven vehicles and transport through tunnels and similar confined spaces, Fuel Cells and Hydrogen Joint Undertaking (Aug. 2019).

Clarity Fuel Cell, 2017-18 Honda Clarity Fuel Cell Emergency Response Guide, American Honda Motor Co. (2018).

Clean Pass Stickers for High-Occupancy Vehicle Lanes on the Long Island Expressway, NY State Dept of Motor Vehicles, downloaded from internet on Nov. 24, 2021.

Gehandler, J., et al., Risks associated with alternative fuels in road tunnels and underground garages, SP Technical Research Institute of Sweden, SP Report 2017:14.

Groethe, M. et al., Large-Scale Hydrogen Deflagrations and Detonations, International Journal of Hydrogen Energy 32 (13):2125-2133 (Sep. 2007).

Gurel, M. et al., LPG explosion damage of a reinforced concrete building: A case study in Sanliurfa, Turkey, Engineering Failure Analysis (Sep. 2013).

IX35 FCEV Emergency Response Guide, Hyundai Motor Company (2013).

Kumar, S. et al., Hytunnel Project to Investigate the Use of Hydrogen Vehicles in Road Tunnels (2009).

Li, Ring Zhen, Fire and explosion hazards of alternative fuel vehicles in tunnels, RISE Research Institutes of Sweden (2018).

Lonnermark, A., New Energy Carriers in Tunnels, Fourth International Symposium on Tunnel Safety and Security, Frankfurt am Main, Germany, Mar. 17-19, 2010.

Mellert, L. D., et al., Electric Mobility and Road Tunnel Safety Hazards of Electric Vehicle Fires, 9th International Conference 'Tunnel Safety and Ventilation' 2018, Graz.

Methods to Identify Alternative Fuel Vehicles, National Alternative Fuels Training Consortium, West Virginia University (Oct. 2019).

Module 6: Fuel Cell Engine Safety, College of the Desert, Rev. 0, Dec. 2001.

Natural Gas Systems: Suggested Changes to Truck and Motorcoach Regulations and Inspection Procedures, U.S. Dept. of Transportation (Mar. 2013).

News from SP Fire Research, brandposten, English edition (2015).

Perrette, L., et al., CNG buses fire safety : learnings from recent accidents in France and Germany, HAL open science, https://hal-ineris.archives-ouvertes.fr/ineris-00976180 (Apr. 2014).

Proceedings from the Seventh International Symposium on Tunnel Safety and Security, Montreal, Canada Mar. 16-18, 2016, Edited by Anders Lönnermark and Haukur Ingason.

Purchase and affixing of the E-Badge on the vehicle, Green-Zones.eu (2020), downloaded from the internet on Nov. 24, 2021.

The On-Board Rescue Sheet, FIA Foundation for the Automobile and Society (Apr. 2010).

Tucson Fuel Cell Emergency Response Guide, Hyundai Motor Company (2014).

Venetsanos, A.G., et al., CFD modelling of hydrogen release, dispersion and combustion for automotive scenarios, Journal of Loss Prevention in the Process Industries 21 (2008) 162-184.

Y. Xu, Y. Huang and G. Ma, A review on effects of different factors on gas explosions in underground structures, Underground Space, https://doi.org/10.1016/j.undsp.2019.05.002 (2019).

* cited by examiner

INDICATORS TO IDENTIFY STATUS AND SAFETY OF VEHICLES

RELATED APPLICATIONS

This application is a continuation of U.S. patent application Ser. No. 18/230,076 filed on Aug. 3, 2023, which application is a continuation of U.S. patent application Ser. No. 17/319,039 filed on May 12, 2021, which application claims priority to U.S. provisional patent application 63/024,500 filed on May 13, 2020. Each of the foregoing applications is hereby incorporated by reference in its entirety.

FIELD OF THE DISCLOSURE

This disclosure relates generally to identification of vehicles and more particularly to electronic systems for identifying vehicles.

BACKGROUND

Historically, vehicles have been largely powered by petroleum-based fuels. Vehicles, fueling stations, parking structures, tunnels and emergency response have consequently been developed around the usage of petroleum-based fuels. For example, fueling of petroleum-based fuels is well understood by the general public and safety systems have been designed to permit safe re-fueling of petroleum-based vehicles. Moreover, emergency response measures are well understood given the ubiquity of petroleum-based vehicles.

The development of power sources for vehicles other than petroleum-based sources, such as batteries and hydrogen, and combinations thereof, and the increasing usage of vehicles powered by such different power sources introduces new challenges to the safe usage of powered vehicles, both in normal usage and in emergency situations.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques.

DETAILED DESCRIPTION

Figure 1:
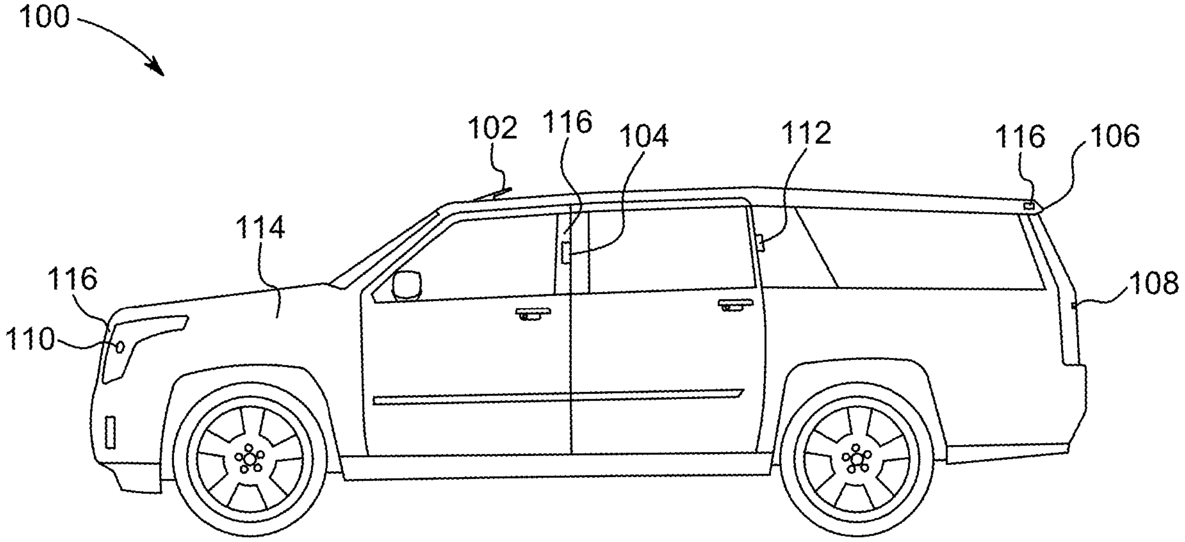
FIG. 1 is a view of an exemplary Sport Utility Vehicle (SUV) employing an embodiment of a vehicle type indicator.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Disclosed herein are devices, systems, methods and products that address many of the challenges posed by the increasing heterogeneity of the manner in which vehicles are powered. As used herein, the term "vehicle" includes a thing or device with a self-contained motor or similar apparatus that causes movement of the thing or device and which contains a source of energy. The vehicle may be used for transporting people or goods, such as those that move on land or water (on water or underwater), in the air, within the earth's atmosphere or in outer space or the vehicle may not necessarily transport anything other than the vehicle itself, such as a satellite, or a car or flying drone equipped with cameras or other sensors. The source of energy may be, by way of example, petroleum-based fuel, other type of liquid or solid fuel (such as liquified hydrogen, or propane) or may be a battery, or may be a combination thereof.

Currently there are not sufficient standards, regulations or knowledge of how non-gasoline vehicles will act during emergency situations. Moreover, as different types of energy sources are employed in vehicles (such as for example, liquified hydrogen, batteries), and the different types of energy sources are combined (multiple batteries, petroleum and batteries, hydrogen and batteries) it becomes more difficult to quickly identify the source(s) of energy employed by a vehicle. This increasing heterogeneity of vehicle energy sources increases the complexity of discerning the energy source of a particular vehicle in an emergency situation. It also results in increased complexity in regulating usage by certain vehicles in certain structures, such as a Hydrogen Fuel Cell (HFC) vehicle in a tunnel or enclosed parking structure.

Responder information, used by first responders in an accident or emergency situation, is based on data sheets and a symbol, or small sticker (ISO Standard) on a vehicle. This is not commonly used but if used may address the issue of identifying a non-gasoline engine vehicle (light or heavy duty) in daylight, assuming the vehicle is intact, and the rescue team can clearly see the marking. It does not address the situation where the marking cannot be clearly seen, such as in the dark, or if the vehicle has been heavily damaged. Also, most vehicles are not explicitly marked as to the type of power source(s) contained in the vehicle. The Allgemeiner Deutscher Automobil-Club (ADAC) has noted with respect to rescuers that "Quite often, in what little time they have, they are unable to positively identify the type or year of manufacture of the smashed vehicle. An ADAC survey has shown that rescuers incorrectly identify or fail to identify 64% of all crash vehicles." See, *The On-Board Rescue Sheet, Helping the rescuers*, FIA Foundation for the Automobile and Society, April 2010. It is well understood that delay in providing assistance to victims of major trauma can dramatically affect outcomes and speed in identifying the type of fuel source(s) used by a vehicle can therefore be a critical factor in safely attending to injured persons.

Approximately 3.4 million cars are sold in the United States per year, and the lifecycle of a vehicle style is shorter than in the past. Styling changes from year to year, or during MCR (mid cycle refresh) can dramatically alter a cars appearance in the day, and especially at night due to the popularity of radical headlight and taillight changes. For example, the 2021 BMW 540i had a refresh from the 2020 model, even though the vehicle is virtually identical to the 2020 in every way, shape and form. However, because of the current automotive trends, the taillights, headlights, daytime running lights have all been radically redesigned with no retention of any prior indication of what the vehicle is. Not only do the light patterns change, but within the same space, they "widened" the daytime running light stance, to make the car look wider. You can have the identical vehicle with completely different light patterns during the day and night. This adds to the confusion.

Turning to emerging energy sources, hydrogen as a fuel source has a number of advantages and is being implemented in consumer and commercial settings. Being highly explosive, characterized by leakage issues, and requiring storage at extremely cold temperatures and/or high storage pressure however poses a number of dangers to vehicle users, first responders and the public in general. Gasoline has a distinct smell that anyone can detect, and be alerted of a leak, and potential fire or explosion. Hydrogen is odorless and colorless. Currently, odorants are not used with hydrogen because there are no known odorants light enough to "travel with" hydrogen at the same dispersion rate. Current odorants also can contaminate the HFC, leaving no way to "mark" hydrogen for identification due to a unique or known warning smell. So, if a tank which is designed to vent its hydrogen contents, does so in an enclosed area, there is no way to detect its presence. Hydrogen is a very small molecule with low viscosity; as a result, it is prone to leakage. Additionally, hydrogen gas is highly flammable and will burn in air at a very wide range of concentrations between 4% and 75% by volume. The mixture may be ignited by spark or heat, or static. Pure hydrogen-oxygen flames emit ultraviolet light and are invisible to the naked eye. As such, the detection of burning hydrogen requires a flame detector. Hydrogen is also colorless, odorless, and tasteless, which further makes detection of a leak impossible to detect, and upon ignition, the flames will be invisible, unless they mix with a contaminant such as burning plastic, rubber, debris etc. Liquid and gaseous hydrogen also tends to cause cracking (by causing embrittlement) in certain enclosures (such as tanks and hoses and fittings), particularly those made of metal. For hydrogen as a fuel source, many of the facts are from Sweden, because the USA has very few hydrogen vehicles and stations. The U.S. data is virtually non-existent concerning these described incidents in enclosed spaces, garages, and tunnels. The foregoing characteristics can present a grave danger to the public, responders, and to property. Professional first responders, and amateur good Samaritans who know nothing about vehicles but see an injured person or persons in a vehicle, will tend to run to the vehicle, and try to comfort, remove or assist. While admirable, these good Samaritans will tend to assume the vehicle is petroleum powered or will not think of the power source given the historic homogeneity of power sources and will therefore not appreciate the dangers of a non-gasoline vehicle.

The National Alternative Fuels Training Consortium notes the difficulty in identifying an alternative fuel vehicle:

A first responder has the important responsibility of identifying whether the vehicle(s) at the scene of an incident is an alternative fuel vehicle.

This task may be difficult if the vehicle has experienced extensive body damage or has major panels blocked by obstructions, as this could make it difficult to identify the vehicle through badging. The first responder should be prepared with alternative methods of identifying an alternative fuel vehicle other than vehicle badges and labels.

These methods may include:

- badging and labels (primary means of identification but are not only recommended and are not required);
- non-standard dashboard layout and/or gauges (it should be noted that battery vehicles tend to have distinctive dashboards but hydrogen vehicles do not);
- multiple or non-standard fueling ports (hydrogen fueling nozzles are behind a fuel door and there is no visual indication unless the filling door is opened);
- special underhood cables, warning labels, or equipment; and
- external fuel tanks (usually on heavy duty vehicles and light-duty pick-up trucks).

*Methods to Identify Alternative Fuel Vehicles*, National Alternative Fuels Training Consortium, October 2019 (available at: http://naftc.wvu.edu/2019/10/09/methods-to-identify-alternative-fuel-vehicles/)

The ubiquity of gasoline powered vehicles has resulted in extensive gasoline vehicle data. Data for battery vehicles, fuel cell vehicles, hybrid vehicles (gas and battery) or other types of non-gasoline vehicles is very limited. Additionally, there is limited information for what happens when there is a fire, for example in an enclosed space, such as an underground parking garage. In this regard it should be noted that underground parking garages are typically designed to only vent a fire from a diesel or gasoline vehicle. Garages in general are constructed to take this into account.

If a gasoline vehicle catches fire, what happens when it causes a HFC vehicle to vent its hydrogen out of the vehicle and it is contained above the vehicle on the ceiling? A typical fuel cell vehicle is designed to vent its entire hydrogen content, even if there is no fire, if the temperature of the tank exceeds 110 C. What happens when an electric car then catches fire? We do not know how these various vehicles and their energy sources will play off of one another. Nor do responders know the power source of each vehicle in an accident and those in the vicinity, especially if they cannot see the vehicle (assuming they know the power source) during a period of excessive smoke, black outs, night time, or damage to a vehicle's outside structure, which may render it unrecognizable. For a gasoline fire, the firetruck's contents (such as water) may be used to extinguish the fire as soon as possible. For a fuel cell vehicle, the practice is to let the fire burn itself out, and to not extinguish it. For a battery vehicle, the practice is to contain the fire, understanding that it can take 24 hours to cool, and at any time, can re-ignite. How is a first responder to know what vehicle(s) to extinguish a fire, and what vehicles should be left to burn?

In April of 2020 the public and first responders learned a very valuable lesson. A Tesla vehicle that was incorrectly used in autopilot mode crashed off of a highway at a high speed. The vehicle burst into flames and it took four hours to extinguish the fire. It also took extraordinary amounts of water, and a large area had to be cordoned off due to the excessive heat, and the potential for spontaneous reignition. First responders, are used to a fire of a gasoline vehicle, being under control in roughly twenty minutes, using a known quantity of liquid or foam to put the fire out. The first responders, need to know as soon as possible what to plan for. Observers of the incident can be reporters to the police or authorities, by calling 911 for example. This instant "head's up" can greatly change an outcome, and preparation for an event.

As documented in Hydrogen Fuel Cell Engines and Related Technologies: Rev 0, Module 6, Fuel Cell Engine Safety, December 2001 (pp. 6-7) a radius of 1500 feet is suggested as the evacuation distance for an uncontrolled fuel cell vehicle fire. And, guidelines all say to let a fire burn out concerning fuel cell vehicles, so the goal is controlled burn out, but that is not always possible. HFC vehicles are not placed in perfect controlled venting situations during fires. So, in essence they are all by nature uncontrolled fires. Additionally, fuel tanks for gasoline vehicles were traditionally made from metal, with great heat resistant qualities. Now, 98% of all European gasoline tanks are plastic. In the USA the figure is 75%. This contributes to all fire incidents, due to the low melting point of the plastic tank, which can contribute to the fire and or ignite vehicles in the vicinity as the fuel leaks out and burns.

If hydrogen vehicles are parked next to each other and battery vehicles during a fire, one can vent, which can cause the next vehicle to catch fire and vent. This can result in a never-ending chain of ignition. Additionally, a battery vehicle could spontaneously re-ignite and cause a nearby hydrogen vehicle to vent, adding new fires, which will spread to other flammable areas. It can be a "snowball down a hill effect, constantly growing as it moves."

Tunnels present additional issues. Due to the linear issues in a tunnel, it is not always possible to address an incident in a recommended radius of rescue and fire mitigation. The vehicles on fire will be lined up in long, narrow space that could be a mile from the entrance to the tunnel. If there is smoke in the tunnel, it is impossible to figure out what vehicles in the tunnel are gasoline powered or not and thermal runaway can greatly exacerbate the issue. Each vehicle with a different fuel source, requires individual protocols on how to perform a safe rescue or safe fire mitigation procedure. Additionally, the first thoughts for firefighters, first and second responders, is a knee jerk reaction consisting of: "contain the vehicle fire (assumption of a gas vehicle) and rescue the occupants."

In the future, the needs will increasingly likely contradict the prescribed methods of rescue. If there is a possibility of a hydrogen tank explosion, who do we minimize loss of life of? Do we evacuate up to 1500 feet from the potential explosion, leaving those trapped in a vehicle to perish, or do we send multiple first responders into the potential explosion, which could result in multiple fatalities which would be in addition to the trapped occupants. As discussed above, if we know a TPRD (Thermal Pressure Relief Device) is going to vent all the contents of a vehicle's tank, then we clearly have to eliminate any flammable materials from behind and to the side of the vehicle, so it can vent and potentially burn, shooting a jet stream of flames out and in an upward direction.

The examples below are a fraction of the possible situations. Hydrogen use in railway, truck, and maritime standards are also lacking, and these are emerging applications without safety protocols, due to their nascent standing. This means that if large ships are powered by hydrogen, fueling boats will dock alongside of them and fill them. These issues have not been addressed, because they are not scaled up. The embodiments disclosed here pertain to a variety of hydrogen filling stations, and the vehicles that use.

Tunnels and bridges in the northeast United States are a particular concern for the industry, as these were designed for internal combustion engines using liquid fuels. Currently there are state and local codes in Boston, New York City, and Baltimore, in addition to those by various port authorities, that prohibit gaseous-fueled FCVs from traveling on certain bridges and tunnels within these jurisdictions (The Fuel Cell and Hydrogen Energy Association in Washington DC. October 2018). You cannot drive an FCEV in a tunnel in New York as of October 2019, because the safety systems cannot handle non-gasoline powered vehicle events. There are no such restrictions for electric, battery powered vehicles and the Tesla fire described above highlights the unique dangers. If the above-described Tesla fire occurred in a tunnel it could have been uncontainable for hours, with increased loss of life and destruction of property, potentially harming the tunnel's structure and/or electrical components.

The disclosed embodiments address these issues and provide solutions that permit safer usage of HFC vehicles in tunnels and bridges.

When you fill a HFC vehicle, you have to remove a small plastic cap, and after the fill you have to do the same. At night you may not be able to see it perfectly due to shadows. That nozzle can become so cold it could cause a thermal injury in seconds or skin could become frozen to it. Additionally, men with very large hands, or women with long fingernails may have issues taking off the nozzle and putting it back on. Vehicles and the refueling apparatus are typically designed with the average person in mind. Often, off-the shelf components are used instead of specially designed components which can render the usability less than optimal across a range of users. An HFC vehicle, as with any other non-petroleum powered vehicle employs what is to most people, a novel way to fill a vehicle. Moreover, even if a dealer explains to a new owner the details of refueling the vehicle, one of the owner's children or friends may borrow the vehicle. Also, if HFC vehicles are used as rental cars, that increases the chances of use by a person unfamiliar with the fueling practices and the possible dangers. Taken as a whole, HFC vehicles and all hydrogen powered equipment present an unknown quantity of differences and dangers which must be, and are not currently, properly addressed.

It is possible to identify an individual vehicle by using the vehicle's Vehicle Identification Number (VIN). By connecting this number to a rescue sheet database, emergency services may quickly ascertain the exact type of vehicle they will be dealing with when they arrive at the collision location. However, responders are generally unlikely to know a vehicle's VIN before arrival at the scene. Moreover, the use of VIN by a first responder is not recommended by the National Alternative Fuels Training Consortium which states that: "Identifying an alternative fuel vehicle through the vehicle identification number (VIN) is possible, but not recommended. The content of the VIN varies by manufacturer and interpreting the information given in the VIN is difficult." Methods to Identify Alternative Fuel Vehicles, National Alternative Fuels Training Consortium, October 2019 (available at: http://naftc.wvu.edu/2019/10/09/methods-to-identify-alternative-fuel-vehicles/).

First responders face serious risks to their safety as they provide life-saving services. Each year, there are an estimated 46,000 crashes; 17,000 estimated people injured; and nearly 150 fatalities involving emergency response vehicles (ERVs), which include law enforcement, fire, and emergency medical services vehicles. The above data is historical and based on gasoline vehicles, not on the introduction of HFC vehicles and other alternative fueled vehicles.

Currently manufacturers have emergency response guides, which only point to small commonly known vehicle name plates, which are small, and identical to similarly named cars. These name plates typically appear on the rear of the vehicle above the bumper. For currently available vehicles the name plate may indicate the vehicle model as "Clarity" or "Accord". Such name plates may not be visible if there is no light, if the vehicle was hit from behind, or if another vehicle is parked directly behind it. Currently about 256 car names are used today. These names are constantly changing as names are added, and names are dropped. For example, in 2019 Hyundai introduced models named Palisade, Venue, Ioniq, in the USA. However, if you count a model like the Hyundai Tucson as a continuous model by name, that is true, however for 2020 the car looks completely different, yet retains the same name. That exacerbates the confusion for the quick identification of a vehicle. Concerning the 2020 Ioniq line, the same vehicle comes in three different variations. You can only tell the difference by the small name plate. The versions are: Ioniq Hybrid, Ioniq Electric, Ioniq plug in hybrid.

Vehicle manufacturers typically provide emergency response guides for vehicles that identify risks associated with the vehicle and provide guidance for emergencies. For example, the Hyundai Tucson Fuel Cell Emergency Response Guide 2014 provides the following:

- Direct contact with any electrically-charged high voltage component can cause serious injury or death.
- Hydrogen gas is non-toxic, odorless, tasteless, and colorless.
- However, like other fuels, hydrogen is flammable and explosive. Compared to gasoline, for example, when mixed with air, hydrogen has a much larger range of flammability, and its explosive range is also much larger.
- Pure hydrogen-oxygen flames emit ultraviolet light and are invisible to the naked eye. As such, the detection of burning hydrogen requires a flame detector.
- There must be no ignition sources around the vehicle. For example, exposed flame, sparks, electrostatic discharge or hot surfaces that could cause hydrogen gas to ignite.
- Caution labels for hydrogen are attached to the hydrogen storage system components. The hydrogen storage system consists of two separate tanks that are interconnected and filled with hydrogen gas. Each tank is made of an aluminum cylinder wrapped in carbon fiber. The cylinders contain hydrogen gas under high pressure. Serious injury or death can result from improper installation, lack of maintenance, or over pressurization. Do not attempt to remove the fuel tanks or any of its fittings from the vehicle. The tanks may contain residual flammable gas under pressure which could cause a fire or explosion.
- On the front grille is the Hyundai logo, a slanted, stylized 'H' with a blue background. Note that after a vehicle crash, some of the identifying markings may become hidden from view. Always be sure to inspect all around the fuel Cell vehicle in order to fully.

Note, that the H Logo mentioned above is the same size and shape of the H logo on any Hyundai Tucson. During an accident, the grille may be damaged. The H logo does not light up and is made of the same plastic used on the non-fuel cell counterpart vehicle. The Tucson as described has a

- Hydrogen Gas Leak Warning Lamp: This warning light illuminates: 'H2' when hydrogen leakage is detected in the vehicle. If the warning light continuously remains on when the vehicle is in 'READY' state, or comes on while driving, this indicates that there may be hydrogen leakage. If this occurs, turn off the vehicle and have the vehicle inspected by an authorized Tucson fuel cell dealer.

Note that Hyundai supplies the leak information as a warning light, only to the driver inside the vehicle. The information is not outside of the vehicle to notify the public or first responders if the vehicle is leaking hydrogen. The Hyundai documentation notes that "External stickers and badging will usually be the first indicator, but it often can be hidden by damage caused in a crash." Moreover, such stickers are not always used.

The Tucson Fuel Cell also has two batteries-one for the vehicle's power, and one in the trunk, which looks like a conventional battery. Gasoline vehicles historically have had one battery, and a first responder unfamiliar with this type of vehicle, will assume it will only have one battery in one location, not two in two different locations. One at the back and one at the front. Additionally, the batteries each serve different purposes.

By way of another example, the Emergency Response Guide/Manual from a 2016 Hyundai vehicle provides the following:

- Before any type of emergency service is performed on this vehicle the high-voltage system must be shut down. Wait 5-10 minutes after shut down to allow high-voltage capacitors to discharge sufficiently. Even after the high-voltage system has been shut down and discharged, all high-voltage components should be treated as if they are still energized. Failure to shut down and disable the high-voltage system prior to emergency operations can result in serious injury or death.

Due to the high voltage system of the Fuel Cell Vehicle, Hyundai states that you must wait between 5-10 minutes before attempting emergency services on the vehicle. That can delay rescue time and hence can delay delivery of urgent care that may be required by an individual suffering from major trauma. The above-noted 2016 Hyundai manual further states:

- Do not attempt to put out a hydrogen gas fire. Instead, allow the fire to burn until the hydrogen gas is depleted (about 5 minutes). Note that pure hydrogen flames are nearly invisible; you may see colored flames if other parts of the vehicle are burning.
- If the temperature near the safety valve located at the rear under vehicle is over 110° C. caused by a fire or other reasons, the safety valve will open to vent hydrogen gas. Venting the hydrogen gas makes a loud noise because the venting speed is very fast. Stay well away from the vehicle. This jet stream of hydrogen gas could ignite.
- If the high voltage battery module located underneath the center of the vehicle is either involved in fire or at risk of catching fire, certain additional precautions must be taken in regards to the high voltage battery system. Note the following when conducting fire fighting operations on a Tucson hydrogen fuel cell vehicle: Lithium-ion Polymer batteries contain gel electrolyte that can vent, ignite, and produce sparks when subjected to temperatures above 300° F. The lithium-ion polymer batteries may burn rapidly with a flare burning effect. A burning battery may release hydrogen fluoride, carbon monoxide, and carbon dioxide gases. Be sure to have adequate full face protection with a self-contained breathing apparatus and full protective gear.
- During overhaul operations it is important for responders to remember the dangers that are still present, even after a fire has been extinguished. Just as during a fire, the same dangers exist. They include, but are not limited to: Harmful gasses, Reignition of fire, Electrical Burns, Shock, or Electrocution.
- Emergency Procedures—Specific types Response First Aid for Electrolyte Exposure The Tucson Hydrogen Fuel Cell battery module is a self-contained, sealed unit and poses no electrolyte contamination hazards under normal conditions. It is only under the rare instance of battery damage that the gel electrolyte would be exposed and a person could come in contact with it. Follow these guidelines for electrolyte exposure. If a victim has been exposed to electrolyte, complete these steps first: Move victim to fresh air. Apply artificial respiration if victim is not breathing. Administer oxygen if breathing is difficult, Remove and isolate contaminated clothing and shoes. Ensure that other emergency responders are aware of the materials involved and take precautions to protect themselves. Then treat the victim according to his/her path of exposure: [Absorption]—Eye Contact: Rinse eyes with water for 15 minutes. —Skin Contact: Wash area thoroughly with soap and water.

[Inhalation]—Remove the victim and leave the area immediately to avoid further exposure. [Ingestion]—Compel the victim to drink milk or water and induce vomiting."

Hyundai clearly states that even after the visible fire and incident may be over and look like it is not a danger, it is. This is very different than a conventional gasoline vehicle, and the fuel cell's battery is highly toxic during in a malfunctioning state.

The "2017 Honda Clarity Fuel Cell Emergency Response Guide" highlights are below:

"High-Voltage Lithium-Ion Battery In addition to a 12-volt battery, the Honda Clarity Fuel Cell has a lithium-ion battery (drive battery) with a nominal maximum voltage of 346 volts. Housed in a waterproof case, the lithium-ion battery is stored under the floor in the center of the vehicle. This means that the lithium-ion battery body is normally hidden from view."

The Clarity differs from the Tucson, because it has the normal looking 12 Volt battery in the front of the vehicle under the hood. This could signal that the vehicle is a conventional gasoline vehicle during a smoke-filled rescue or at night. The untrained rescue individual may assume, correctly that almost all vehicles have one battery. The visible battery under the hood can be disconnected, but that does not disconnect the 346-volt battery that is not visible which could cause death or serious injuries. The Honda Clarity Owner's Manual notes the following:

Hydrogen Sensors In addition to the safety valves, four hydrogen sensors are located on the vehicle. If a potentially hazardous leak is detected, the system controller will automatically stop the flow of hydrogen from the tank. A message Hydrogen Leak Detected."

Lithium-ion Battery Fumes or Fire A damaged high-voltage lithium-ion battery can emit toxic fumes and the organic solvent used as electrolyte is flammable and corrosive, so responders should wear appropriate personal protective equipment. Even after a lithium-ion battery fire appears to have been extinguished, a renewed or delayed fire can occur. The battery manufacturer cautions responders that extinguishing a lithium-ion battery fire will take a large and sustained volume of water. Responders should always ensure that a Honda Clarity Fuel Cell with a damaged battery is kept outdoors and far away from other flammable objects in order to minimize the possibility of collateral fire damage should the battery catch on fire.

Lithium-ion Battery Fluid Avoid contact with the high-voltage battery fluid. The high-voltage battery contains a flammable electrolyte that could leak as a result of a severe crash. Avoid any skin or eye contact with the electrolyte as it is corrosive. If you accidentally touch it, flush your eyes or skin with a large quantity of water for at least 5 minutes and seek medical attention immediately, Electric Shock: Unprotected contact with any electrically charged high-voltage component can cause serious injury or death. Receiving an electric shock from a Honda Clarity Fuel Cell, however, is highly unlikely because of the following: Contact with the battery module or other high-voltage components can only occur if they are damaged and the contents are exposed, or if they are accessed without following proper precautions. Contact with the electric motor can only occur after one or more components are removed. The high-voltage cables can be easily identified by their distinctive orange color, and contact with them can be avoided. If severe damage causes high-voltage components to become exposed, responders should take appropriate precautions and wear appropriate insulated personal protective equipment." The high voltage system of the Fuel Cell is unlike a normal gasoline powered vehicle.

Emergency responders should also know that hydrogen flames are invisible. In addition, hydrogen burns very quickly and radiates less heat than gasoline or other fuels." The public, and samaritan responders have no experience in experiencing a fire that does not smell or is visible. Clear warnings, systems and education are vital.

Be aware that when rolling a Honda Clarity Fuel Cell with the front (drive) wheels on the ground, the electric motor can produce electricity and remains a potential source of electric shock even when the high-voltage system is turned off." Meaning, you can roll or rope tow the vehicle, and it can produce electricity, complicating any potential incidents after an assumption that the vehicle is now safe and disabled.

The Clarity does not have a tow hook at the rear, like conventional vehicles. If the car has to be removed from an area, by being towed from the rear, it is not possible. That further complicates rescues.

Gas vehicles introduce new dimensions with regard to incident outcomes in terms of damage and harm caused, i.e. explosions, in terms of either pressure vessel explosion, BLEVE (Boiling Liquid Expanding Vapor Explosion) or ignition of gas-air mixtures. In addition, there is the risk of people being hit by a jet flame, and this is higher in tunnels, as the incident outcome in terms of damage and harm caused is most often the result of a collision. In garages, people generally have sufficient time to evacuate prior to a fire causing a jet flame or explosion. A jet flame can, however, increase the risk of fire propagation to adjacent vehicles in garages, where cars are often parked close to one another. Explosions generally do not have any serious effect on the structure of a tunnel, as the amount of gas is too small in relation to its size and load-bearing capacity. In underground garages, however, the risks posed by gas vehicles are more critical. The likelihood of a container rupture as a result of a fire cannot be ignored, the possibility of production errors and flaws missed by inspections cannot be eliminated, and even a container that fulfils all of the requirements placed on it and passes all of the relevant tests can explode during a real fire. The incident outcome of such a scenario relates to damage to property, firefighters, and individuals that are in, and possibly above, the garage.

HFC vehicles and hydrogen trucks are not allowed in the Chunnel connecting the UK to France. Why? Proof that the public, building planners, inspectors and the government is not convinced of the safety or rescue protocols. The Chunnel is quite long (over 31 miles). Yet even in New York's much shorter tunnels (less than 2 miles) HFC vehicles are also not allowed. This is an acknowledgement of the lack of understanding of the risks, dangers and differences from gasoline powered vehicles.

Often standards are reactionary, not proactive. It is vital to have every safety measure in place before it is scaled to its potential, effectively saving lives, of passengers and first responders. Autonomous vehicles may become a significant portion of the segment and they may be powered by hydrogen or non-traditional gasoline powered vehicles. The same safety measures must be enacted, even if there is not a traditional driver. That is irrelevant for many safety situations, meaning the autonomous vehicle is designed to carry passengers.

Disclosed herein are visual and/or acoustical indicators, for status and safety on Fuel Cell Electric Vehicles (FCEVs) (sometimes also referred to as Hydrogen Fuel Cell (HFC) vehicles) and all hydrogen, battery, gasoline, hybrid and non-gasoline powered vehicles, including passenger vehicles, commercial vehicles, airplanes, trucks, trains, busses, etc. The indicators and alerts' data can be collected from a wireless transmission of the vehicle QR chip, bar code, etc., to the rescue team. The information can be provided from the vehicle when the vehicle enters the garage, is parked in the garage, or upon entry to a tunnel or any other area where multiple cars are located or stored. These alerts, indicators and warnings will aid in rescue operations, and information as to what type of a powered vehicle is in the vicinity. The disclosed embodiments pertain to vehicles of all types to have a clear visual indicator indicating, such as to a first responder, the type of fuel used. "B" Pillars of vehicles, and the center top portion of a windshield, and the center top portion of a rear window, are generally intact during and after an accident or event. A visual indicator should be visible in those areas, stating the type of fuel by color, during an event, by rapidly blinking, and post event by remaining solid in the color denoting the fuel source. Additionally, a hydrogen powered vehicle can have an additional color indicator, declaring that the hydrogen has been fully vented, and the vehicle is safe to approach. In one embodiment, the hydrogen vehicle also has a visual and acoustical warning separate from the aforementioned indicators, detected by the tank of a pending venting situation. The status indicators can be visual and/or acoustical, and also may be sent to user's mobile phones, and station operators. The status alerts can also be sent wired or wirelessly to remote locations, such as to the fire department or other emergency services. The acoustical warnings can have a pre-determined pattern of choice. Meaning, there is a very recognizable acoustical signature of a truck's beeps when it backs up. This particular noise signature can be introduced by a manufacturer or added later if a particular standard is agreed upon. The noise signature, light pattern(s), brightness and flashing characteristics may each be changeable across a range to permit changeability and a variety of choices.

The disclosed system may be used for any future products, systems or networks that could present any type of danger, where the public or first responders need status and safety information. The disclosed system in part or in its whole has wide implications for aviation, naval and marine applications. In the future we will have non-traditional powered airplanes, ships, submarines, tanks, traditional gas station, an LP fueling station, a liquid hydrogen station, a nuclear reactor, a power generating system based on water current like the Hoover Dam, any equipment that may be at an airport, naval yard, train station, depot, home furnace, home generator, medical oxygen farm, etc.

It is vital that the public and responders evacuate an area if a venting of the tank will occur. The colors and sounds in the disclosed embodiments can be any hue, intensity, area covered or pitch (constant sound, beeping, intermittent, siren like, etc.). The system can also alert drivers, passengers, first responders, the public, etc. on their smartphones, or send out a tone like the known "Amber Alerts" or Emergency Notification built into smartphones today. The alerts may also be provided programmatically to navigation applications or other applications (such as Waze) to provide real time information, by way of text, icons, or other graphical or visual indicators that are automatically loaded onto, for example, a viewer's map.

The sound components of the system can be vital for those with visual impairments, or if a vehicle is in a danger mode, but visually blocked by another vehicle or obstacle. For example: a Toyota Murai FCEV type vehicle may be venting and about to cause a disastrous fire, but the warning light may not be visible if a large sport utility vehicle, is parked in front of it or to the side of it. This situation can also occur if the vehicle in question is parked on the side of a building or parked on a street when a delivery truck could block the ability to see the vehicle and it's light The disclosed embodiments help solve the confusing incidents noted above, with information that is clear and universally known and accepted. The disclosed embodiments use known warning indicators that the public is familiar with, such as flashing lights, sirens, acoustical alerts, etc. The information that is vital also includes gathering information, prior to an incident. The vehicles in a garage, tunnel or enclosed area need to be pre-identified. Meaning, that there must be an electronic or paper record of what types of vehicles are in the confined area. This can be done by scanning a vehicle's license plate, if that data exists, a VIN, a bar code, QR or any type of code or identifier that is in use now or in the future. Additionally, the information can be gathered passively, using the technology of the commonly used EZ-Pass for collecting tolls. The type of vehicle can be part of the transfer of information along with the toll. An RFID (Radio Frequency Identification) chip or the like, can transmit the information, as a vehicle enters a parking facility or tunnel. If there is an incident, the garage, tunnel or other contained structure can have a visual indicator that is visible to the public and first responders, alerting of a potential issue. The types of vehicles can be shown by signage, words, acoustical alerts, or by different colored lights clearly visible and near the points of entry or exit. While hydrogen vehicles are in limited numbers in the USA, China and Korea are rapidly pushing the hydrogen community forward. We must anticipate the global needs, and the public's safety. One hydrogen vehicle in one underground parking structure, can potentially destroy a building harming and killing many civilians and first responders. Prevention is far more effective, than dealing with the injuries. We must be prepared, with easily and rapidly understood measures to ensure everyone's safety.

The system for trucks, trains, buses, and all heavy equipment where the power source (cab of a truck) may be separate from the rest of the vehicle, meaning the attachable trailer, can be done wirelessly. The illuminated indicators can be self-powered and be attached to any desired points on the trailer or train's compartments. The light can be attached by magnet, hook, strap, etc. It can be self-powered by a battery or have a dedicated charging source in the truck's cab or exterior. The warnings can also be available at the hydrogen station, where they can be recharged, then swapped after a fill. These warning indicators can contain a sound component. As the hydrogen economy grows, we may see hydrogen powered helicopters and airplanes. The same system applies to them. Readily visible on all sides, with an acoustical alert.

Another alternative is to have the visual indicator on the roof, perhaps by the GPS antenna or area. The GPS antenna, which in BMWs for example looks like a shark fin, at the rear of the top of the roof, located near the rear window. The "shark fin" is raised, visible, and it has wires going from the car's electronics going to it. Adding a light may be accomplished by running an additional wire to the exterior "shark fin" and having a visible opening with an LED or bulb that is powered and visible. Rarely are roofs destroyed in common car crashes. The back, front and sides are the most common areas of impact. The roof is only affected in a roll over situation or where a car would underride a truck's rear trailer. Those incidents are a miniscule fraction of all vehicular accidents. The roof is the most logical, visible and highest point of the vehicle, and can be clearly seen. Think of truck or truck trailer lights at the top of the cab and the trailer. The visual indicator in this position, has the clear advantage of being seen from any vantage point. It offers 360% coverage. If FCEVs and non-traditional gasoline powered vehicles can prove their safety, the whole non-traditional gasoline powered vehicles segment can grow. The visual indicator may be located in the third brake light area in the rear windshield of a vehicle. It should be understood that such an arrangement can limit rearward visibility. The backup battery as described herein also ensures that the sound and light components will still be functional in case of a battery fault in the main system of a car, building, garage, etc.

The disclosed embodiments also address vehicles on the road or parked in the same manner, meaning that the vehicles can be scanned by QR chip, bar code or the like to ascertain the fuel source that powers the vehicle. If the vehicle's electronics signal that an event is likely (pre-accident technologies) or is happening, the vehicle will emit a sound alerting that an incident may occur, is occurring and when it is safe to approach said vehicle.

Vehicle to Vehicle (V2V) communication, can be employed to send a wireless signal from one vehicle to another, alerting of the danger. This technique makes the cars interact with each other, and provide additional safety warnings in a timely manner, potentially reducing loss of life, injury and destruction of property. A user, bystander or first responder does not have to witness the event, the car can broadcast the event and the status to other cars in the vicinity, which can set off a series of warnings. As cars become more connected, one car in the middle of a tunnel can send the signal to all of the cars in the tunnel and surrounding areas. This can greatly aid in determining the nature of the event(s). In certain embodiments, the light pattern and sound signature of the warnings can transmitted to all vehicles, buildings, first responders in a predetermined radius.

Approaching a vehicle is a vital and often undiscussed and unaddressed issue. History has taught us that once a vehicle fire is put out on a gasoline vehicle, it is assumed to be safe. Battery vehicles are not safe for hours or days, due to the excessive heat and re-ignition possibilities. A hydrogen vehicle may look safe, but if the tank becomes hotter than 110 C it will self-vent and could create a jet fire if there are sparks or flames nearby.

The disclosed embodiments also address the fact that there are no required labels or indications of what fuel powers the vehicle. There are guidelines that are not laws, that must be followed. The disclosed embodiments address vehicles of all types to have a clear visual indicator telling a first responder the type of fuel used. It is vital that the public and responders evacuate the area if a venting of the tank will occur. The colors and sounds can be any hue, intensity, area covered or pitch (constant sound, beeping, intermittent, siren like, etc.). Additionally, the alert is vital in such situations as multi-car/truck accidents on interstates. Cars and trucks routinely pile up due to fog or ice. The cars are so densely packed together, it is impossible to tell what kind of car it is. It could be hydrogen, gasoline, battery, etc. All cars require different rescue situations as discussed. In one embodiment, the the visual indicator is positioned on the roof area. Commonly there are GPS antennas or areas at the rear of the roof by the center high mounted third brake light. In multi-car accidents or in tunnels, the roofs are always visible. Headlights break in accidents, and front to rear accidents are most common, which renders a headlight warning useless. It can't be seen since the bumper of one car is slammed against the bumper of another. If it is not feasible due automakers desires, the illuminated indicator could be contained within the center high mounted third brake light.

The information can also be transmitted to other vehicles, with or without drivers. Autonomous vehicles may play a dominant role in the future, and the occupants must know where the accident is, and what is the safest way to exit to safety, to avoid a fire or hydrogen venting situation. It can take the form of an alert in the in-cabin screen and or an audible alert, using a recorded voice or any other type of warning. Vehicles will be connected via Bluetooth, WIFI or IOT (The Internet of Things) or any other future communication methods. This system can be accessed remotely by emergency responders, to guide the occupants.

In one embodiment, identification of the vehicle and of the model may be made via a database using the license plate, the VIN number, an automatic emergency call system (e.g. e-Call) system or other identifiers (e.g. bar code or QR code). For example, the VIN may be provided via the embodiments disclosed herein as an identifier for the vehicle in question. The VIN may then be used to retrieve information from a database regarding the vehicle and in particular the type(s) of energy source(s) it employs. In other embodiments, the license plate number may be used in a similar manner.

The disclosed embodiments may also be useful for trucks that transport new vehicles that have different power sources, or on ships that carry a great number of new vehicles, that may all have different power sources, be it gas, hydrogen or hybrids. Toyota may ship all three types of vehicles together or store them in lots after they are produced or waiting to be sold. The storage area could also be a car dealership, or outdoor mall parking area. These alerts and warnings will aid in rescue operations, and information as to what type of a non-gasoline powered vehicle is in the vicinity. Any congested area of vehicles presents a rescue danger, especially when the vehicles are very close in proximity to each other. Sports stadium lots are filled with vehicles, and different types of vehicles (gas, hydrogen, hybrid) are always parked in different areas. As the hydrogen economy develops, it is vital to have uniform visual and acoustical indicators, as well as instantly recognizable symbols, colors, and ways of notification. For commercial trucks, the cab is where the power is generated by hydrogen and electricity, and all non-gasoline powered methods. The trailer hooked to the truck does not generate power but must have the same visual and acoustical indicators as the described passenger vehicle. An illuminated light should be at the sides, back and top of the trailer. The same applies to trains. The power source is located at the front of the train, but each section must have uniform warnings. Buses, trains, trucks, etc., all carry greater amounts of hydrogen, and therefore can cause more damage if there is a fire or venting situation. In addition to the foregoing, vehicles are also often displayed inside buildings in areas of high pedestrian density such as shopping malls, airports, sports stadiums and train terminals. There are far more people likely to be in the vicinity of such vehicles than on a road.

The system for trucks, trains, buses, and all heavy equipment where the powersource (cab of a truck) may be separate from the rest of the vehicle, meaning the attachable trailer, can in some embodiments be implemented wirelessly. The illuminated indicators can be self-powered and be attached to any desired points on the trailer or train's compartments. The light can be attached by magnet, hook, strap, etc. It can be self-powered by battery or have a dedicated charging source in the truck's cab or exterior. The warnings can also be available at the hydrogen station, where they could be recharged, then swapped after a fill. These warning indicators can contain a sound component. As the hydrogen economy grows, we may see hydrogen powered helicopters and airplanes. The same system applies to them-readily visible on all sides, and also with an acoustical alert. The indicators can be located anywhere on a vehicle, including in the third brake light mounted above the rear window, or on the exterior portion of the rear-view mirror. Currently many vehicles such as BMW use imbedded turn signal indicators in this area.

The disclosed embodiments help solve these confusing incidents, with information that is clear and universally known and accepted. It uses known warning indicators that the public is familiar with, such as flashing or solid "lights", sirens, acoustical alerts, etc. The visual or audible indication may provide information regarding a variety of relevant facts about the vehicle such as whether the vehicle is in the process of venting its tanks (e.g. hydrogen), the vehicle is on fire, if the fuel tank has been breached, and/or the number of belted occupants in the vehicle. There may be multiple indications such as more than one visual indication and/or more than one audible indication and combinations thereof.

Vehicles in a garage, tunnel or enclosed area need to be pre-identified, meaning that there must be an electronic or paper record of what types of vehicles are in the confined area. In one embodiment this can be done by scanning a vehicle's license plate, a VIN, a bar code, QR code, windshield mounted registration sticker, or any type of code or identifier that is in use now or in the future. Additionally, the information can be gathered passively, using the technology of the commonly used EZ-Pass for collecting tolls. In its most rudimentary form, the attendant can manually record the vehicle, and keep a record for first responders, and manually produce the illuminated and or sound component. The type of vehicle can be part of the transfer of information along with the toll. An RFID chip or the like, can provide the information, as a vehicle enters a parking facility, tunnel, bridge or other structure that accepts a vehicle. The information may be actively transmitted or may be provided upon query or other stimulus by an electronic signal. Mounted upon or disposed within the structure is a vehicle identification unit that includes a receiving unit that receives an electronic signal from a vehicle entering the structure. The electronic signal is encoded to contain information identifying one or more energy sources used by the vehicle. The vehicle identification unit also includes a processing unit that processes the electronic signal to generate identification data that identifies for the vehicle the one or more energy sources used by the vehicle. A storage unit is employed to store the identification data. The processing unit executes instructions that cause it to compare the identification data to structure permission data to generate a vehicle entry indicator that indicates whether the vehicle may enter the structure. The structure permission data is generated in advance to identify which types of vehicles are permitted to enter the structure. For certain structures only limited types of vehicles may enter the structure. For other structures a wide variety of vehicles may be permitted to enter the structure. In some instances, the types of vehicles that are permitted to enter a structure may vary according to various factors such as time of day, or traffic density. The vehicle identification unit also includes a transmission unit that transmits to the vehicle an electronic signal that indicates to the vehicle whether it may enter the structure. In one embodiment, the receiving unit receives the electronic signal from the vehicle in response to a vehicle query signal generated by the processor and transmitted by the transmission unit. Energy from the vehicle query signal activates a chip in the vehicle identification unit, which modulates the energy with the desired information, and then transmits the electronic signal back toward an antenna/reader in the vehicle identification unit. In one embodiment, the vehicle query signal is transmitted periodically by the transmission unit in the form of a polling signal that causes vehicles equipped with appropriate capability to generate an electronic signal for transmission to the vehicle identification unit to identify the vehicle. In another embodiment, the vehicle transmits, on its own initiative without request by the polling signal, the electronic signal that identifies the vehicle. In another embodiment, the vehicle identification unit may in addition to the foregoing or alternatively have a scanner that visually scans a bar code or QR code placed on the vehicle to identify the type of vehicle. In any of the foregoing embodiments the information provided about the vehicle may include information other than information that identifies the types of energy source(s) employed by the vehicle.

If there is an incident, the garage, tunnel or other contained structure can have a visual indicator that is visible to the public and first responders, alerting of a potential issue. The visual indicator disclosed herein may be combined in one embodiment with a sound component. In such an embodiment, the type of vehicle is shown by signage, words, acoustical alerts, or by different colored lights clearly visible and near the points of entry or exit. Any known visual indicators can be used. The indicator "lights" can be solid, flashing, a rope fashion, a ticker tape fashion, that displays words, strobe lights, rotating lights, flashing lights, police lights, general illumination of the area, increased illumination of the area (if the area currently has illumination, like a garage ramp or tunnel has). The illuminated area or "light" can be color coded for each type of vehicle.

Alternatively, the illuminated area can make the "H2" symbol visible, which stands for hydrogen. The same for hybrid, gasoline, "CNG" compressed natural gas, etc. For battery powered vehicles the lightning bolt symbol may be used. In essence any information transmission sign, symbol, color or word may be used for each type of vehicle. The sound component may also be associated with the type of fuel. For example, a gasoline powered vehicle may produce one loud tone, while the acoustical tone for a hydrogen vehicle, may be one long beep, then two short beeps, followed by a long beep. This would be useful as an alternative warning if the visual indicators cannot be seen, due to excess smoke, or destruction of the area where the visual indicator may be. If the indicator is blocked, for example: a tall fire truck, the acoustical component may be the only information available for the first responders, or public.

The alert and information can take the form of illuminating the dispenser as a whole, the "island" of fueling dispensers, the roof above the dispensers, the entry sign to the station or the typical "house" that has the attendant, and soft drinks, and bathrooms. The alert must keep individuals and cars entering a station where there is a malfunction. There must be a visual and or acoustical alert that warns or blocks others from entering the danger zone.

The disclosed embodiments also address vehicles on the road or parked in the same manner. Meaning that the vehicles can be scanned by QR chip, bar code or the like to ascertain the fuel source that powers the vehicle. If the vehicle's electronics signal that an event is likely (pre-accident technologies) or is happening, the vehicle will emit a sound alerting that an incident may occur, is occurring and when it is safe to approach said vehicle. Approaching a vehicle is a vital and often undiscussed and addressed issue. History has taught us that once a vehicle fire is put out on a gasoline vehicle, it is assumed to be safe. Battery vehicles are not safe for hours or days, due to the excessive heat and re-ignition possibilities. A hydrogen vehicle may look safe, but if the tank becomes hotter that 110 f it will self-vent and could create a jet fire if there are sparks or flames nearby. Large areas need to be cleared due to the dangers as stated earlier concerning alternative fuel vehicles. If there is a fire in a building on a street, the rescue teams need to know what vehicles are near the fire. A QR chip has a great advantage, because the information is immediate and readable from a user setpoint on a vehicle. A bar code, license plate and the like can perform the same functions. Some on street or garage parking areas use a ticketless system. The car is parked in said zone, and the driver, using a parking app, buys the time desired. No ticket is posted on the vehicle, but the information such as the make, model, color and license plate are stored. This information could be used to determine what vehicles are in the area.

The information can also be transmitted to other vehicles, with or without drivers and to computerized devices in the vicinity. Autonomous vehicles may play a dominant role in the future, and the occupants must know where the accident is, and what is the safest way to exit safely, to avoid a fire or hydrogen venting situation. It can take the form of an alert in the in-cabin screen and or an audible alert, using a recorded voice or any other type of warning. Vehicles will be connected via Bluetooth, WiFi or IOT (The Internet of Things) or any other future communication methods. This system can be accessed remotely by emergency responders, to guide the occupants. For individual passenger, driver driven cars, the alert and guidance can appear on the IP (Instrument Panel), Navigation screen or in the "Head's Up" display. It will alert the driver as to how to exit the vehicle and the path to take, if it is safe to exit the vehicle. If it is not safe to exit the vehicle, the responders can communicate vocally, through an acoustical alert, or through any display system that they should remain in the vehicle, until rescued or it is safe to exit. Additionally, the information described above may be provided to the mobile device of a responder in the vicinity of the vehicle(s) in question. Currently, auto makers like BMW and Mercedes have SOS buttons that call a call center to assist when there is a crash or be notified when a vehicle's airbag goes off in an accident. However, the above uses for two-way transmission of information have not been used as described herein in a manner to benefit passengers, the public and all first and secondary responders.

The status indicators can be visual and/or acoustical, and sent by any known means, today or in the future. For example, "Google Glass" is a "Head's Up" type message transmission into a normal looking pair of glasses. Although it is not widely used, it may be in the future. The emergency team could send the information directly to those who need guidance, warnings, or directions like a vehicle's navigation system. The path to safety can also be directly sent to the vehicle, in a navigation style message, or to the user's smartphone. It could open up Google Maps, and seamlessly give the occupants clear directions as they leave the vehicle, and have a portable, lighted path to safety. The emergency guidance can be programmed to turn the flashlight feature of the phone on, lighting the path below, while having the path on the screen of the phone. This can be done automatically, since during emergencies it may not be easy for those seeking safety to spend time opening the alert and turning on the flashlight feature. The goal is to clear the area as soon as possible, and in the easiest way possible.

Hydrogen use in railway, truck, and maritime standards are lacking, and these are emerging applications without safety protocols, due to their nascent standing. Meaning, once large ships powered by hydrogen, fueling boats will dock alongside of them and fill them. These issues have not been addressed, because they are not scaled up. A machine is defined as a car, truck, ship, drone, bus, dump truck, railroad car, autonomous vehicle, submarine (not submerged or submerged for a fill) boat, moving crane, subway car, etc. The specific applications are unknown, as the hydrogen economy is perpetually expanding to non-traditional FCEVs and trucks. Fuel cell ferries are being planned to be in operation by 2021. Hundreds of unprotected passengers aboard, and outside on deck. Hydrogen fueling must be located at a dock, where the boat is or remotely by a filling ship that pulls alongside the vehicle. The entire ship is treated like a dispenser. It is a unit that dispenses hydrogen using a hose and connector. The "dispenser" does not have to take the traditional form as a typical gas station. The ability to make on demand hydrogen at any location exists today. It is not scaled up to be widely used, due to ongoing development, and cost factors. Once it is known art for filling ships, trucks, trains, etc. The definition of "hydrogen dispenser" as used herein, is the self-generating equipment treated as a dispenser, since it will function as such.

The components employed may consist of sensors that are well known, inexpensive, proven and readily available. For overheat situations, like fire, or elevated temperatures, the heat sensor transmits the information to a power source wired or wirelessly (Bluetooth, WiFi, IoT, etc). The power source and "brain" then send out the acoustical and or visual alert to the sound producing component and the visual alert medium (laser, fiber optic line, LED, bulb, light guide, etc.). The alert can be performed wirelessly or hard wired into a car's electronics. The alert system in a vehicle can be wired into the current battery or have a dedicated battery pack, or on demand power generating equipment.

Concerning the vehicle and its warnings as disclosed, it could be an acoustical warning, tied to the vehicle's current horn. The illuminated indicator could be in any light producing area, meaning the brake light area, the license plate lights, the side marker lights at the front or rear, or in the center high mounted rear brake light. Another embodiment is to have a visual indicator at the top of the continuous side of the A, B, C, or D pillar of the car or truck. Ideally it would be visible at the top of the pillars, because in multi-car pile ups, it would aid in recognition. The B pillar for example, usually remains intact in most accidents, so it may be a preferred embodiment. In larger three row SUV's like the Cadillac Escalade, the C pillar may have a second indicator, near the rear occupant's head. This provides a secondary alert zone, where passengers may be in the vehicle. A variety of techniques may be employed to determine when to cause the various indicators on a vehicle to indicate an accident. For example the deployment of an airbag may be used to initiate the indicators. Other techniques may also be employed such as if the vehicle is detected to be in a spin or if a collision is detected. These are only examples and a variety of other techniques and criteria maybe employed to determine when to cause the indicator(s) to indicate a problem.

Another alternative is to have the visual indicator on the roof, perhaps by the GPS antenna or area. The GPS antenna, which in BMWs for example looks like a shark's fin at the rear of the top of the roof, located near the rear window. The "shark's fin" is raised, visible, and it has wires going from the car's electronics going to it. Adding a light is simple, it simply requires running an additional wire to the exterior "shark's fin" and having a visible opening with an LED or bulb that is powered and visible. In pickup trucks, like the RAM 2500 a popular option is the clearance lamps. They are a series of small yellow illuminated areas above the windshield. These clearance lamps can serve the dual function, as described, to present visual indicators. Some vehicles, like the 2019 GMC Yukon have the GPS antenna above the front windshield, on the roof. A retrofitted system can easily be achieved with vehicles that already have the illuminated clearance lights, located above the front windshield. The amber light can be reprogrammed to add a flashing mode, to indicate a malfunction or dangerous situation, or replaced to enhance visibility and add different colors to make the status of the vehicle better understood. Meaning during the day, these clearance lights are usually not on. They are turned on at nighttime. They could be turned on during the day, to transmit status. The simple result is taking a pre-wired, illuminated area that is not in use, during the day, and making it useful for an added purpose.

Rarely are roofs destroyed in common car crashes. The back, front and sides are the most common areas of impact. The roof is only affected in a roll over situation or where a car would underride a truck's rear trailer. Those incidents are a miniscule fraction of all vehicular accidents. The roof is the most visible and highest point of the vehicle and can be clearly seen. Think of truck or truck trailer lights at the top of the cab and the trailer. Clearly, the advantages are an improved sightline in a tunnel or garage where cars can be parked front to back, and side to side with little room between them. A traditional placement by a taillight can be too low to see, in this situation. The visual indicator in this position, has the clear advantage of being seen from any vantage point. It offers 360% coverage.

Concerning identifying what vehicles are currently in a tunnel or enclosed or underground parking area, or for that matter a congested commuter parking lot, or the parking lot of a football stadium-upon entry to the area, the vehicle is scanned by a bar code reader, license plate reader, registration sticker, "EZ Pass type device (which is in use in many airport garages) QR code, chip or any other identifying means. If the garage is "low tech" the vehicle operator can manually punch in the information, before getting the parking ticket. These aforementioned devices are known art, reliable and inexpensive. The gathered information can be stored at the entry and or exit area, transmitted wirelessly, or by internet connection to a central location, such as an office. Sensors in the area will detect the heat or fire, and this stored information then becomes vital for rescue efforts. The sensor of heat, fire or explosion in one version is the human observer. Sometimes humans can see smoke, flames, feel explosions faster than sensors. The attendant then can print the list for first responders, or transmit it wirelessly, or via email or any other server. In one embodiment the information gathered from the sensors, or humans in the area would illuminate an alert, and/or produce a sound component. The components in certain disclosed embodiments consist of sensors that are well known, inexpensive, proven and readily available. For overheat situations, like fire, or elevated temperatures, the heat sensor transmits the information to a power source wired or wirelessly. The power source and "brain" then send out the acoustical and or visual alert to the sound producing component and the visual alert medium (laser, fiber optic line, LED, bulb, light guide, etc.). The alert can be performed wirelessly or hard wired. For parking facilities or tunnels the system can be installed when built or easily retrofitted, by using any of the aforementioned components.

The system can be seen as a whole, or it's parts can be taken as needed for status, safety, etc. Meaning, that if there is a specific area for battery vehicles in a garage, the battery status, warnings, etc., may only be needed, if there are no FCEVs in the area. The garage structure may only wish to use the QR code, or bar code to make a list of the vehicles contained in the garage to be given to first responders if there is an incident. The information may be all the owner of the structure desires. The owner may not want a visual or acoustical indicator outside of the structure, for fear of panic, from the public's perspective.

Hydrogen as a fuel presents uncountable differences and additional hazards that gasoline or diesel does not experience. Back-to-back fills at a hydrogen station can alter the dynamics, pressures in the storage tank, and vehicle tank can present challenges, rubber seals, and hoses are subject to greater pressure and colder temperatures. The pre-cooled hydrogen goes through a fueling hose at roughly −40 to −50 C. Gasoline may be delivered from a dispenser to a vehicle at ambient temperatures, while a hydrogen station's hose can have it contents be −40 and deliver them when it is 106 Fahrenheit. The thermal differences take a toll on the equipment which could lead to premature failures. Human error (such as not tightening a bolt) has already lead to an explosion in a hydrogen fueling station. Because hydrogen performs differently, the leak presented a force that set off vehicles air bags in the vicinity. Enough real world incidents to safely predict all parameters have not yet occurred. By way of example, a hydrogen vehicle being fueled during a monsoon in Miami, Florida, where it is 102 F and humid, may be very different that a fill in a blizzard in Alaska. Sensors, networks and other types of wired and wireless communications can fail due to moisture, heat, freezing and rapid temperature changes. Areas such as in Connecticut may have a summertime high of 98 F and a wintertime low of −6 F. We do not have sufficient data as to how these systems of communication between the vehicle and the dispenser will function properly. We also assume that the vehicle has not been damaged, or improperly repaired before it is filled. Many substandard repairs to engines and fueling lines occur at repair facilities, exponentially increasing the likelihood of a leak, explosion, fire, etc. If there is a break away situation where a hose is severed from the handle or vehicle, the remaining material in the hose can cause an instant thermal injury to one's hand, face, neck, eye or foot. The dispenser is designed to stop the fueling process during a "break away" situation (meaning if someone forgets to disconnect the handle from the vehicle and drives away) but there is no measure to stop the cooled hydrogen in the hose at the time. That is simply dispersed into unknown areas.

In certain embodiments described herein, each component is self-sufficient, and has a backup source of power. This disclosure describes need for a comprehensive, inclusive and a series of independent warning systems that will mitigate unnecessary loss of life, injury and property damage, by being reliable, and instantly understood by all.

The disclosed visual indicator may have potential challenges on boats, jet skis, ships, hovercraft, or on snowmobiles. Speedboats have low profiles, and the salt spray can create a white film covering the light, limiting its ability to be seen. The same can be an issue with snowmobiles. Snow can gather on the light, and if the snowmobile has been in an event, and lands on its side or in a large snow bank, the sound component may be the only useful means of a warning. Obviously both the acoustical and visual warnings are desired, but they can perform the same functions of a warning in unique and different ways. The acoustical combined the visual warnings creates a comprehensive and all-inclusive warning system. Currently fueling station to vehicle communications are not pervasive, standardized or reliable. This type of communication is being discussed, but not currently in general use, and may not be, due to the cost of such systems. Even if these systems are perfected in a few years, their costs would likely be too great for an average fueling station owner to absorb.

Additionally each state in the United States for example may have it's own unique set of rules for fueling and re-fueling. For example: a vehicle owner is allowed to fill a vehicle at a "self-service" station in New York, but a mile away, in New Jersey, the owner is forbidden by law to fill a vehicle. This patchwork of rules creates its own set of known issues. The owner of the vehicle may know how to properly fill their vehicle due to experience or reading the manual. The station attendant in new jersey, may not be trained on how to fill a vehicle properly. The attendant is in all likely hood has not been to training courses, read manuals, or have been properly instructed. Often these employees have no training because they are often entry level jobs, requiring no skills in the art of refueling protocols. There may be language barriers and there may be lack of respect for the owner's vehicle and for the station's property. The owner of a vehicle may carefully connect the refueling handle to his or her car, making sure that the connection is correct, and that they do not drop the fueling handle, as to damage it, their car or injure a foot for example. The employee of the station that requires an attendant to fill the vehicle, may be careless, distracted or not realize or respect the property of the employer or customer. This repetitive carelessness can create very dangerous situations. The repeatedly dropped refueling handle will be damaged, may leak or not seal properly to a vehicle, creating a greater chance of a fire of incident. The attendant may bang the nozzle into the fueling receptacle so often that the end of the vehicle's connector had indentations. They may attach it in a violent and abusive manner and may do the same at the end of the fill. This repetitive abuse can cause unknown perpetual incidents. Standards are written to be followed, and data is derived from the intended design. This is just one example of potential source of perpetual issues concerning fueling and refueling.

Standards and data for usage and testing in a variety of areas are lacking, including, testing of equipment and data on the usage in the field of dispensers, breakaways (or drive away events), tank pressure testing for optimal fill results, effect of back-to-back refueling, lifecycle of hoses and related components, nozzles, coupling of nozzles with different flow rates, connection hardware, or wired, wireless, or any other means of communications between the dispenser and the vehicle. The breakaways or drive-aways, are well known in the field and function as intended. However, with hydrogen fueling there is no agreement of force of separation (666 newtons to 2000 newtons) and there are documented issues where the breakaway occurred from an attendant dropping a fueling handle. There is also documentation where a customer drove off, with the nozzle in the vehicle, and the fueling hose got caught on the dispenser and pulled the fueling dispenser out of the housing, creating a very dangerous situation. There is currently little agreement among the suppliers of the hydrogen, the suppliers of the components and the automakers. ISO (The International Organization for Standardization, which represents 164 member countries, CSA (Canadian Standards Organization) and SAE (Society of Automotive Engineers) and regulatory and standards bodies from up to 164 individual countries, like AFNOR from France, for example, all come together with global experts and are currently trying to gather the disparate information, and data, with no clear direction to harmonizing the directions. An example of this alarmingly dangerous, and life-threatening situation, is that the largest supplier of fueling nozzles, hoses, and handles, has fittings that do not allow low flow equipment to be used for heavy duty use. They prevent bursting and dangerous malfunctions by making the connections different, however only on some parts, and are working towards full protection. Another global supplier has no such safeguards in place and all components are fully interchangeable. Meaning a hose designed for 35 megapascals, can be swapped for use in a 70 megapascal application, creating unforeseen issues, which could lead to bursting, fires, explosions, etc. Furthermore, there is no way to immediately tell what the combination of components are at a fueling station. Marine, Industrial, rail, motorsports, including motorcycles, ATV's, jet ski and any other form of transportation, for leisure or commerce have not been standardized or even have working drafts to achieve such goals.

Among the many issues that exist: (i) common universal language to describe the issues and standard is not agreed upon. (ii) Lack of coding of the nozzles which include: H25, H35, H35HF, H50, H70, etc. HF designates high flow, which increases all stress parameters, making them more susceptible to issues. In the future the industry will focus on high flow fills and begin to retrofit many older designs. The retrofit parts are often not compatible or suitable. It was disclosed that many non-high flow hoses can be used with high flow equipment causing alarming issues, safety wise and overall failure issues. (iii) Some dispensers have data interfaces, and some vehicles do also. However, in any scenario a vehicle with a data interface, may be filled at a station without a data interface, rendering it useless. And the fueling station may have a data interface, but not communicate with a vehicle that lacks one. And there is no standard for the data interface, if it will actually be implemented to scale and what information or actions it may set in motion. (iv) A nozzle designed for a data interface, can be swapped with a nozzle that was not designed for a data interface. The station owner will not be able to execute or observe any data, since the owner may not know that issue is retarding communication. It is not obviously different and fits perfectly like the correct one. (v) Compatibility testing is currently being discussed, with no globally agreed up standards in place. (vi) Breakaway separation: that is when the hose disconnects from the fueling handle if there is an accidental drive off by a driver after executing a fill but not removing a handle. With traditional gasoline or diesel dispensers, this is well known, and effective. The reason is that gasoline is delivered at ambient temperature, not severely pressurized, flows normally through a standardized hose, into a vehicle. The gasoline is stored as a free-flowing liquid in a car's tank. With a hydrogen dispenser, you have a storage tank above or below ground, that pre-cools the hydrogen to −40 to −50 C, distributes it at 35 to 70 Bar, and pressure fills a tank or three in a vehicle. The parameters for issues are unforeseeable. What will happen if the storage tank of the dispenser produces hydrogen that flows to the vehicle at −60 or −30? How will that affect the dispenser unit, the hose and the vehicle. What will the additional 10 C do to the hoses, fittings, handles, etc. Will the vehicle nozzle reject the added pressure and kick back the hydrogen on to the customer filling the vehicle? Will the hose burst, showering the user with −60 C hydrogen? We simply do not currently know. (vii) Currently breakaway separation (or "drive away separation) is 667 Newtons. Proposals and usage are documented at 1000 Newtons. 1300-2000 Newtons of force are also being discussed. There is no current agreement as to what force to choose. There have been documented incidents where the separation happened at the wrong time or because the hose was caught on a part of a dispenser or the hose became wrapped around itself. Violent drops can mimic break away situations, spraying the hydrogen causing severe injuries or violent fires and explosions if the user is smoking. Tests typically occur at ambient temperatures in controlled environments without deviating improper human behaviors which occur with frequency. We have all seen consumers fill their gasoline vehicles while smoking. We have also experienced consumers twisting hoses when putting them back in the fueling receptacle. When you go to fill your vehicle, it will often leave the cabinet with force and twist about. Additionally, some hoses are constantly tugged on by consumers who do not pull their cars close enough to the fueling dispenser and tug on the handle and hose to reach the vehicle. Consumers give little thought to hoses breaking or handles separating. One documented incident involves a Shell station in Germany. The Shell station performed as designed, the customer and the surrounding individuals did not. These events are unforeseen, and can cause fires, burns, loss of life and massive destruction. The Shell incident as it occurred:

A woman pulled into a hydrogen fueling station. She got out of the car to purchase a beverage at the station. The passenger in the other seat moved to the driver's seat and initiated a fill by inserting the filling nozzle to the vehicle fuel receptacle. He then moved back to the passenger seat. The woman approached the car, go in, assumed the fill was complete because her fellow traveler was back in the passenger seat and drove away. She was unaware that the fill was in process, and the hydrogen handle was still attached to the vehicle. The hose separated from the handle, sprayed hydrogen, which did not injure anyone, fortunately. Three individuals ran to her car each trying to remove the fueling handle. Each suffered a severe burn from the cold metal. They were unaware that the handle being attached was not a grave danger, nor were they aware of the cold temperature the handle became due to the separation. Three ambulances came to ferry each panicked bystander to receive wound care. This disclosed vehicle indicator addresses human error, based on a need for immediate action in a clear defined way at the time of the incident.

The vehicle indicator disclosed herein provides the simplest, easiest, implementation of a vitally necessary safety warning, alert on both the fueling dispenser and the vehicle, with the ability to be implemented immediately, using known components in a new way. Previous examples of streamlined and instantly usable safety measures which have saved countless lives have been the third center rear brake light, DRLs (Daytime Running Lights) and in the world of motorsports, the HANS Device. It is a brilliant brace that keeps racers heads in alignment during a crash. The head cannot violently be thrown forwards or to the side. Crashes of F1 cars can occur at excess of 200 MPH, while the fastest F1 attained a clocked speed of 256 MPH. Often these crashes result in violent spins into embankments, roll over and catch on fire. Romaine Grosjean, was involved in such a crash, and managed to crawl out of his vehicle which was on fire and survive, intact barring some burned skin. Simple, and highly effective measures saved his life. Other examples include the roll bar, which does not allow the car to collapse on him when it is upside down, fire resistant clothing, state of the art helmets and the simple HANS brace.

The disclosed embodiments may be better understood by way of the accompanying figures which are described below with reference to the designated alphabetical references in the figures.

FIG. 1 shows a view of an exemplary Sport Utility Vehicle (SUV) 100 employing an embodiment of a vehicle type indicator. A visual indicator 102 is located on the GPS antenna which is mounted on the roof of the vehicle toward the front in the vicinity of the windshield. Another indicator 104 is positioned at the B pillar of the vehicle 100. This offers the advantage of the indicator being in the same area as the driver's head. After an accident, first responders and the public immediately look for the occupant, and the indicator 104 is adjacent to the area. Another indicator 106 is positioned at the rear of the vehicle toward the upper area of the rear window, and in certain embodiments near the area where the roof of the vehicle meets the tailgate/rear window area. In some embodiments the indicator 106 may be positioned upon or within the third brake light area. The indicator 106 may take the form of an Organic Light Emitting Diode (OLED) painted surface, anywhere on the structure, to allow it to light up in any color. In such an embodiment, the entire painted surface may light up in any way, shape, color, or pattern or a combination thereof. Another indicator 108 is positioned in or around the taillight area. Another indicator 110 is positioned in or around the headlight area. In a larger SUV such as the SUV 100 which may have three rows of seats, the C pillar may have an associated indicator 112, near the rear occupant's head. This provides a secondary alert zone, where passengers may be in the vehicle. A battery 114 is also employed to provide energy as a backup source in case of loss of power from the main vehicle battery and/or motor. A horn 116 or acoustic indicator may provide a distinctive tone such as three short beeps followed by three long beeps. A visual indicator 118 may be located in the third brake light.

Figure 2A:
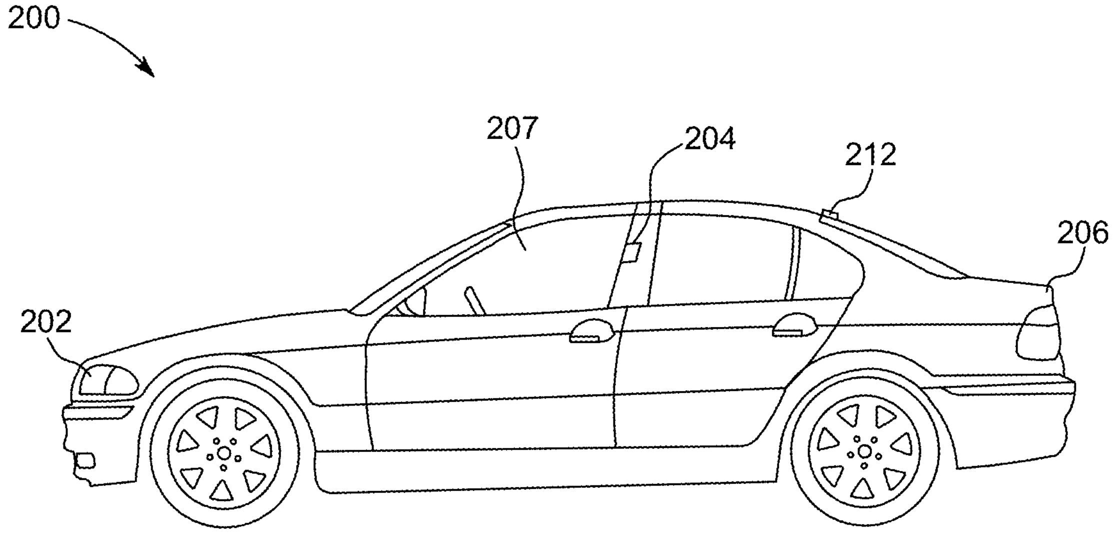
FIGS. 2A, 2B and 2C are respectively, a side view, front view and top view of an exemplary sedan type vehicle employing an embodiment of a vehicle type indicator.
Figure 2B:
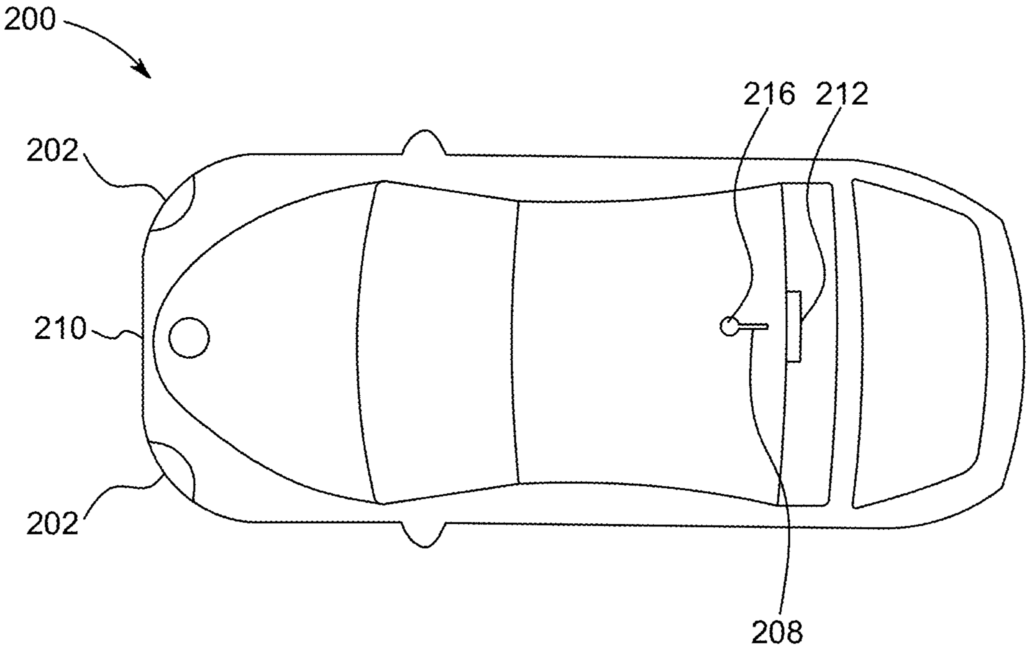
Figure 2C:
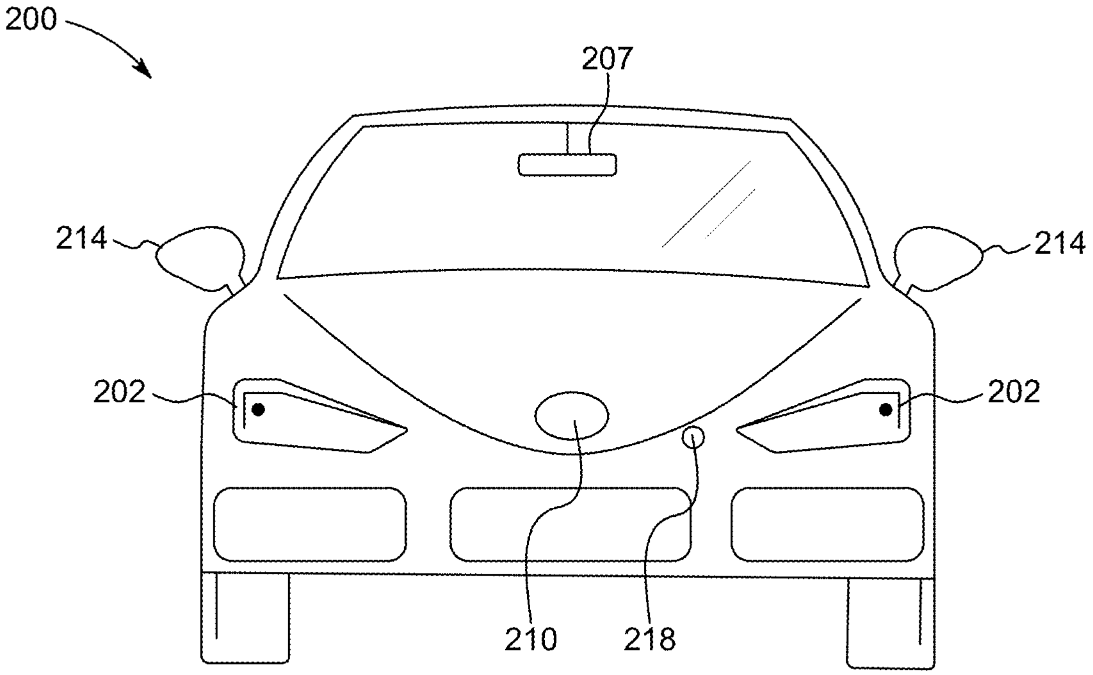

FIGS. 2A, 2B and 2C shows respectively, a side view, front view and top view of an exemplary sedan type vehicle 200 employing an embodiment of a vehicle type indicator. The vehicle 200 has a visual indicator 202 positioned in the headlight housing, and indicator 204 in each B pillar and one or more indicators 206 in the taillight housing. The vehicle 200 also has an indicator 207 positioned in the rearview mirror, which may face the front as well as the cabin, to inform occupants. The vehicle 200 also has an indicator 208 positioned in the GPS roof mounted antenna area and an indicator 210 positioned where the manufacturer's badge may be, such as in the center of the hood toward the front edge, or in the vehicle's grill. Another indicator 212 is positioned in the third brake light mounted above the rear window and there is an indicator 214 on the exterior portion of each rear-view mirror. In some embodiments that use turn signal indicators in the side rear-view mirror the indicator 214 may be integral with the turn signal. A battery 216 is also employed to provide energy as a backup source in case of loss of power from the main vehicle battery and/or motor. A horn 218 or acoustic indicator may provide a distinctive tone such as three short beeps followed by three long beeps.

Figure 3:
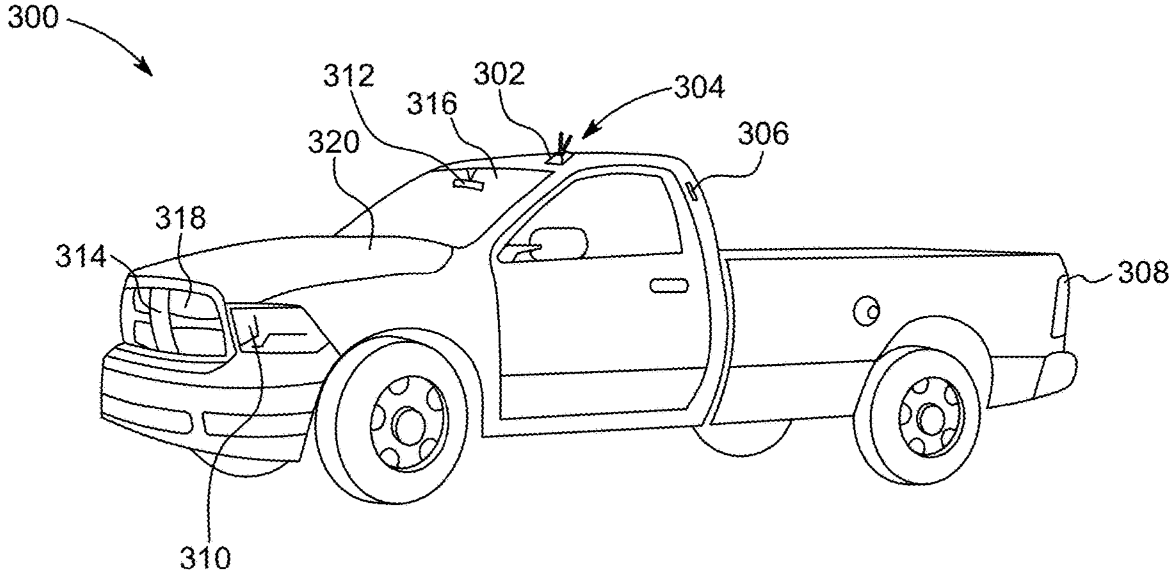
FIG. 3 is a view of an exemplary pickup truck employing an embodiment of a vehicle type indicator.

FIG. 3 shows a view of an exemplary pickup truck 300 employing an embodiment of a vehicle type indicator. An indicator 302 is positioned on the top, side or any area of a GPS roof mounted antenna. By way of example, GM vehicles have their antennae in this position above the driver's head. Others like BMW have them at the rear of the roof. An indicator 304 is positioned in the form of a light at the top of the antenna. An indicator 306 is positioned at the "B" pillar of the truck. In the overwhelming majority of accidents this area is still intact, unlike the front or rear bumper. An indicator 308 is positioned in the taillight housing. An indicator 310 is positioned in the headlamp housing. An indicator 312 is positioned on the reverse or front side of the rear-view mirror. This is another area that remains intact during crashes, and can warn those in front of the vehicle, and those in the cabin with different colored indicators. An indicator 314 is positioned in the grille. An indicator 316 is integrated with the vehicle's emergency communication system (such as "SOS" Onstar by General Motors), or any other external way of communicating with the vehicle. It may play a recorded message, may be a human operator or a general warning. The operator may give the passengers directions, and information. An indicator 318 is also positioned in the front grill of the vehicle 300.

Figure 4:
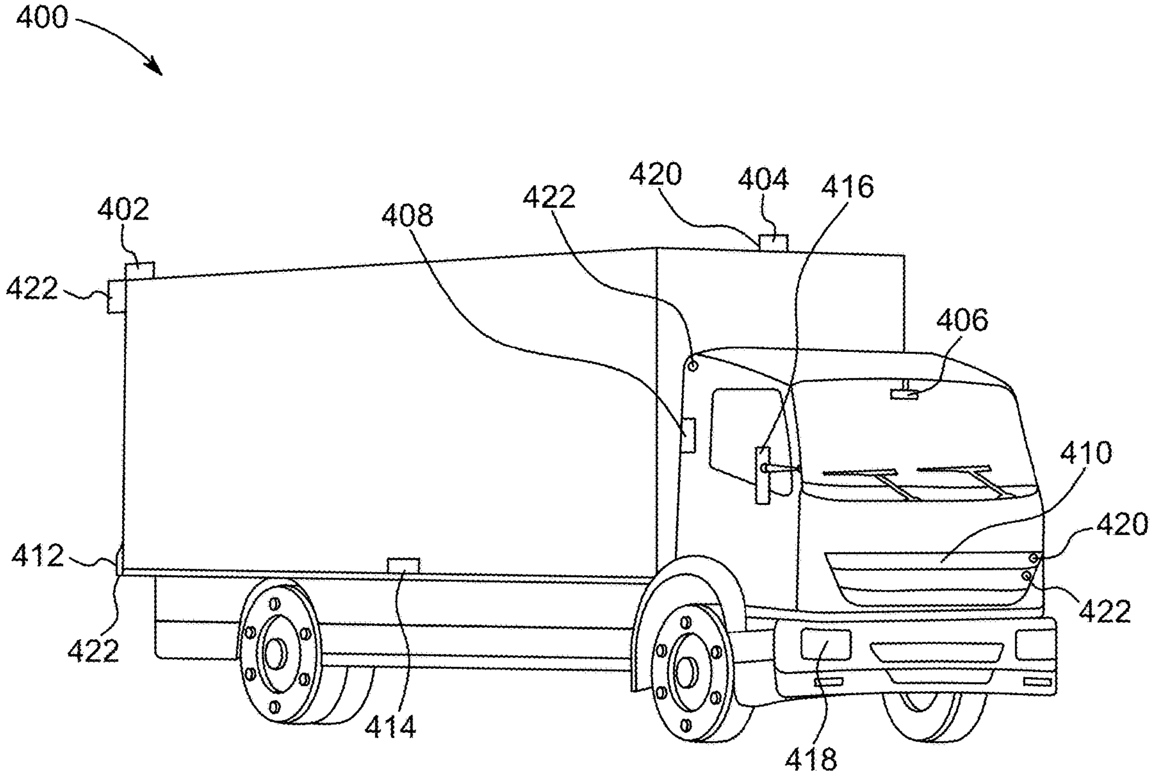
FIG. 4 is a view of an exemplary panel type truck employing an embodiment of a vehicle type indicator.

FIG. 4 shows a view of an exemplary panel type truck 400 employing an embodiment of a vehicle type indicator. An indicator 402 is positioned at the top of the truck in the rear and is either integrated with or is in the vicinity of the vehicle clearance light. The indicator 402 may take the form of an Organic Light Emitting Diode (OLED) painted surface, anywhere on the structure, to allow it to light up in any color. In such an embodiment, the entire painted surface may light up in any way, shape, color, or pattern or a combination thereof. An indicator 404 is positioned at the top front of the truck 400 and is either integrated with or is in the vicinity of the vehicle clearance light. An indicator 406 located, on, around or in a rearview mirror. An indicator 408 is positioned on the cab of the vehicle. Such vehicles may operate with only a cab, and not the box type storage container. An indicator 410 is positioned in the front grille. An indicator 412 is positioned at the rear by the loading platform. An indicator 414 is positioned at each side of the vehicle and an indicator 416 is positioned on each exterior side view mirror. Also, an indicator 418 is positioned in the headlamp housing area or around it. A battery 420 is also employed to provide energy as a backup source in case of loss of power from the main vehicle battery and/or motor. A horn 422 or acoustic indicator may provide a distinctive tone such as three short beeps followed by three long beeps.

Figure 5:
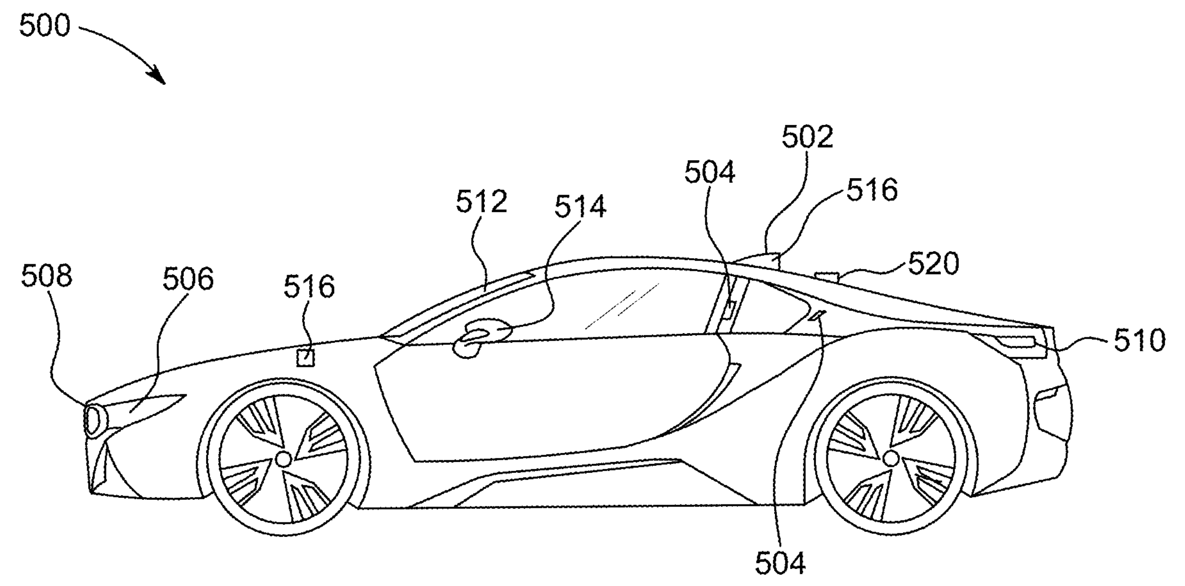
FIG. 5 is a view of an exemplary sports car employing an embodiment of a vehicle type indicator.

FIG. 5 shows a view of an exemplary sports car 500 employing an embodiment of a vehicle type indicator. An indicator 502 is positioned in the "shark's fin" GPS antenna on roof of the vehicle toward the rear of the vehicle near the upper region of the rear window. The indicator 504 is positioned at each B pillar, an indicator 506 is positioned in the headlamp area and an indictor 508 is positioned in the front grille. An indicator 510 is positioned in or around the tail lamp area and an indicator 512 is positioned in on or around the rearview mirror which could be front or rear facing. The indicator 510 may take the form of an Organic Light Emitting Diode (OLED) painted surface, anywhere on the structure, to allow it to light up in any color. In such an embodiment, the entire painted surface may light up in any way, shape, color, or pattern or a combination thereof. Also, an indicator 514 is positioned on the outside area of the turn signal area on the rearview mirror. A battery 516 is also employed to provide energy as a backup source in case of loss of power from the main vehicle battery and/or motor. Another visual indicator 520 may be positioned in the third brake light of the vehicle.

Figure 6:
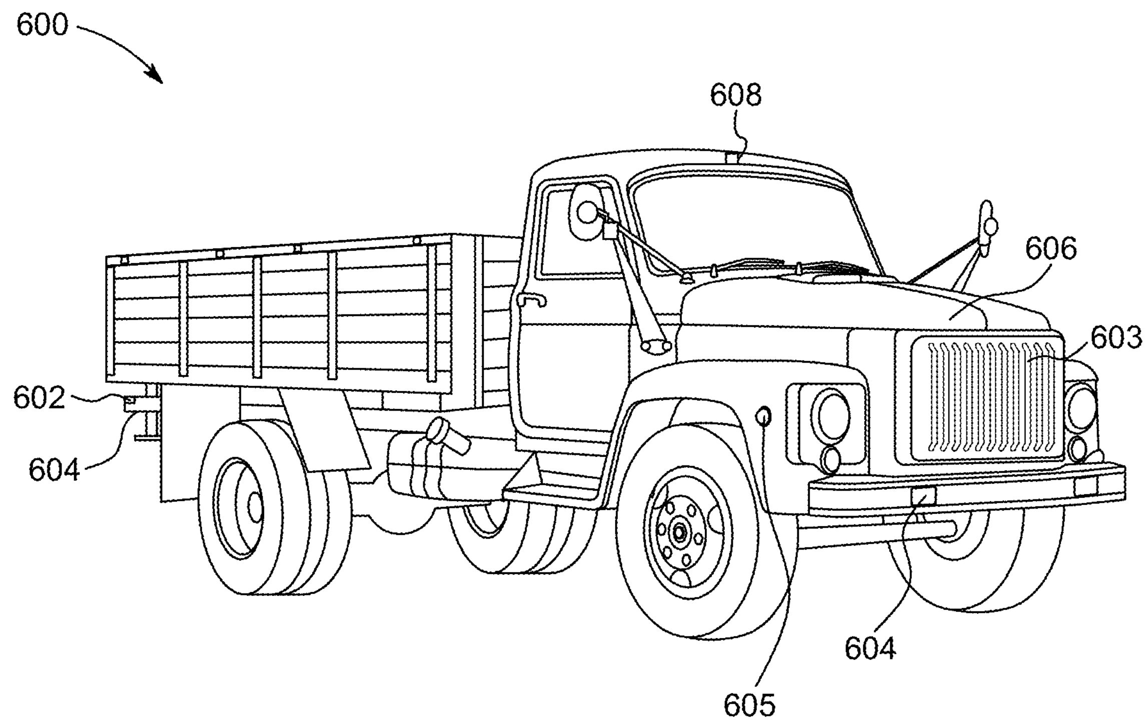
FIG. 6 is a view of an exemplary commercial type truck employing an embodiment of a vehicle type indicator.

FIG. 6 is a view of an exemplary commercial type flatbed truck 600 employing an embodiment of a vehicle type indicator. One or more indicators 602, 604 are positioned at the rear and front bumpers, respectively, and may be integrated with lamps or turn signals integrated into the respective bumper. An indicator 603 is positioned in the front grille and an indicator 605 is positioned on each fender of the vehicle 600. An indicator 606 is positioned on the front center of the hood and an indicator 608 is positioned on the roof, here toward the front of the roof in the vicinity of the windshield.

An indicator 402 is positioned at the top of the truck in the rear and is either integrated with or is in the vicinity of the vehicle clearance light. An indicator 404 is positioned at the top front of the truck 400 and is either integrated with or is in the vicinity of the vehicle clearance light. An indicator 406 located, on, around or in a rearview mirror. An indicator 408 is positioned on the cab of the vehicle. Such vehicles may operate with only a cab, and not the box type storage container. An indicator 410 is positioned in the front grille. An indicator 412 is positioned at the rear by the loading platform. An indicator 414 is positioned at each side of the vehicle and an indicator 416 is positioned on each exterior side view mirror. Also, an indicator 418 is positioned in the headlamp housing area or around it.

Figure 7:
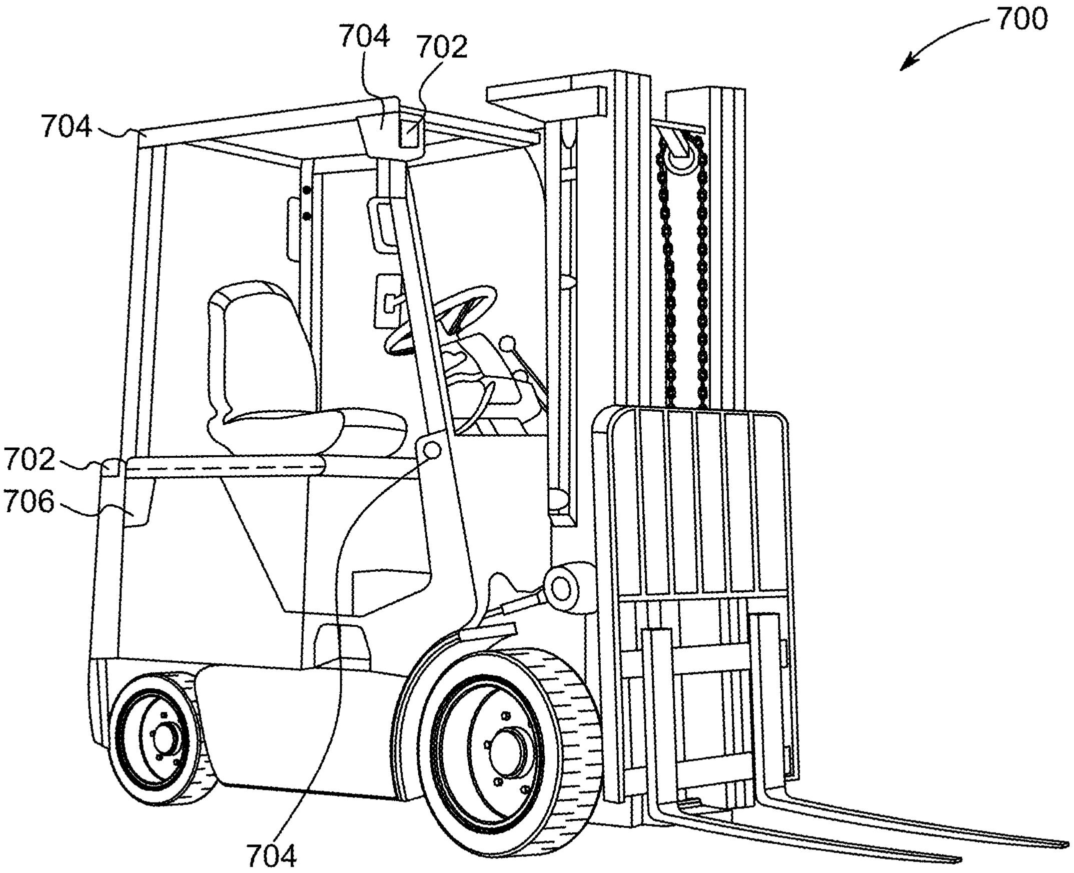
FIG. 7 is a view of an exemplary commercial type loader employing an embodiment of a vehicle type indicator.

FIG. 7 is a view of an exemplary commercial type loader 700 employing an embodiment of a vehicle type indicator. An acoustical indicator 702 is positioned on a frame of the loader, and here the indicator 702 is positioned on an upper portion of the frame. A visual indicator 704 in the form of a light is also positioned on the frame of the vehicle, here also on an upper portion of the frame. A battery 706 is also employed to provide energy as a backup source in case of loss of power from the main vehicle battery and/or motor.

Figure 8:
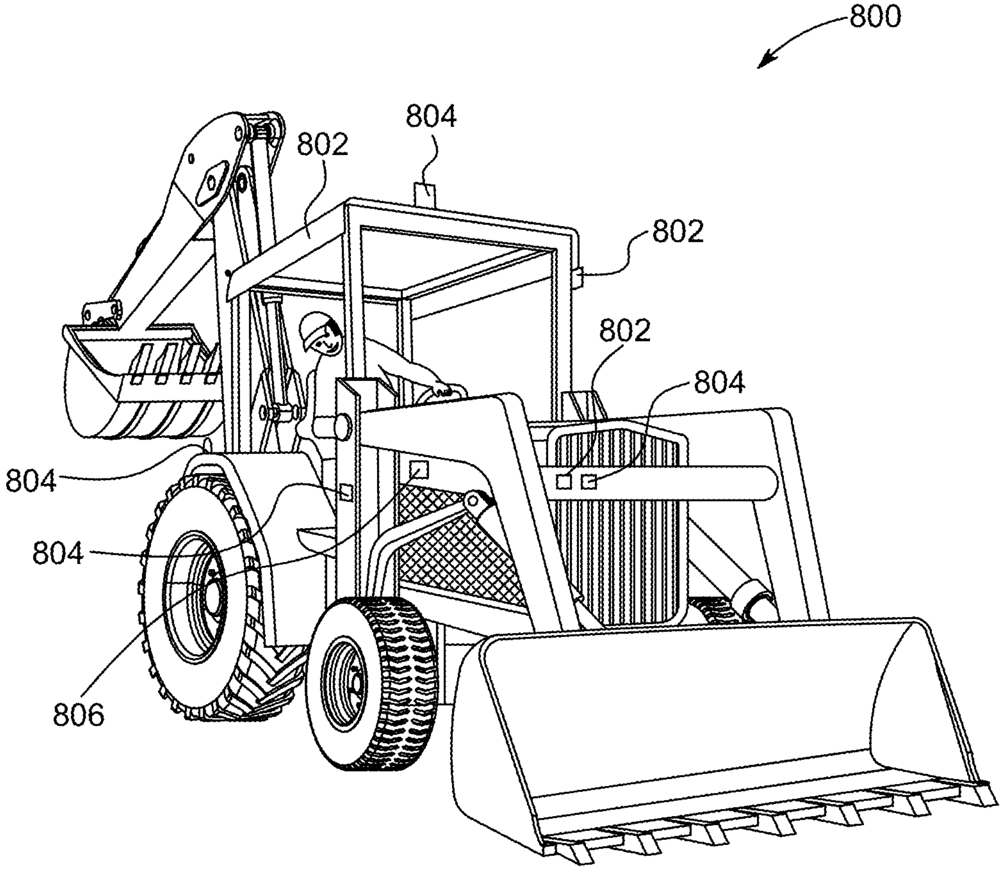
FIG. 8 is a view of an exemplary commercial front-shovel type tractor employing an embodiment of a vehicle type indicator.

FIG. 8 is a view of an exemplary commercial front-shovel type tractor 800 employing an embodiment of a vehicle type indicator. A visual indicator 802 may take the form of an Organic Light Emitting Diode (OLED) painted surface, anywhere on the structure, to allow it to light up in any color. In such an embodiment, the entire painted surface may light up in any way, shape, color, or pattern or a combination thereof. An audible indicator 804 is also employed and may be positioned in a variety of locations on the vehicle 800. A battery 806 is also employed to provide energy as a backup source in case of loss of power from the main vehicle battery and/or motor.

Figure 9:
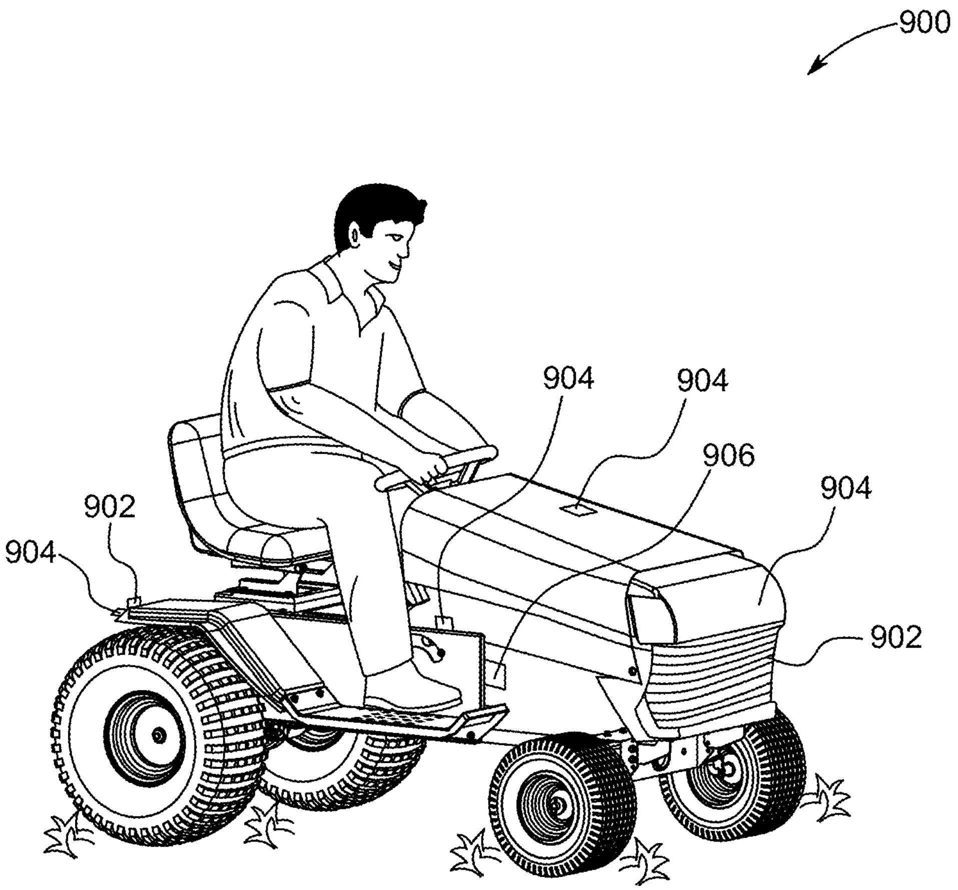
FIG. 9 is a view of an exemplary riding lawn tractor employing an embodiment of a vehicle type indicator.

FIG. 9 is a view of an exemplary riding lawn tractor 900 employing an embodiment of a vehicle type indicator. One or more audible indicators 902 are employed. Here one audible indicator 902 is positioned at the front of the tractor 900 in or around the front grille and one is positioned at the rear of tractor. One or more visual indicators 904 are employed, with one positioned in or around a front light of the tractor and another positioned in or around a rear light. A battery 906 is also employed as a backup source in case of loss of power from the main vehicle battery and/or motor.

Figure 10:
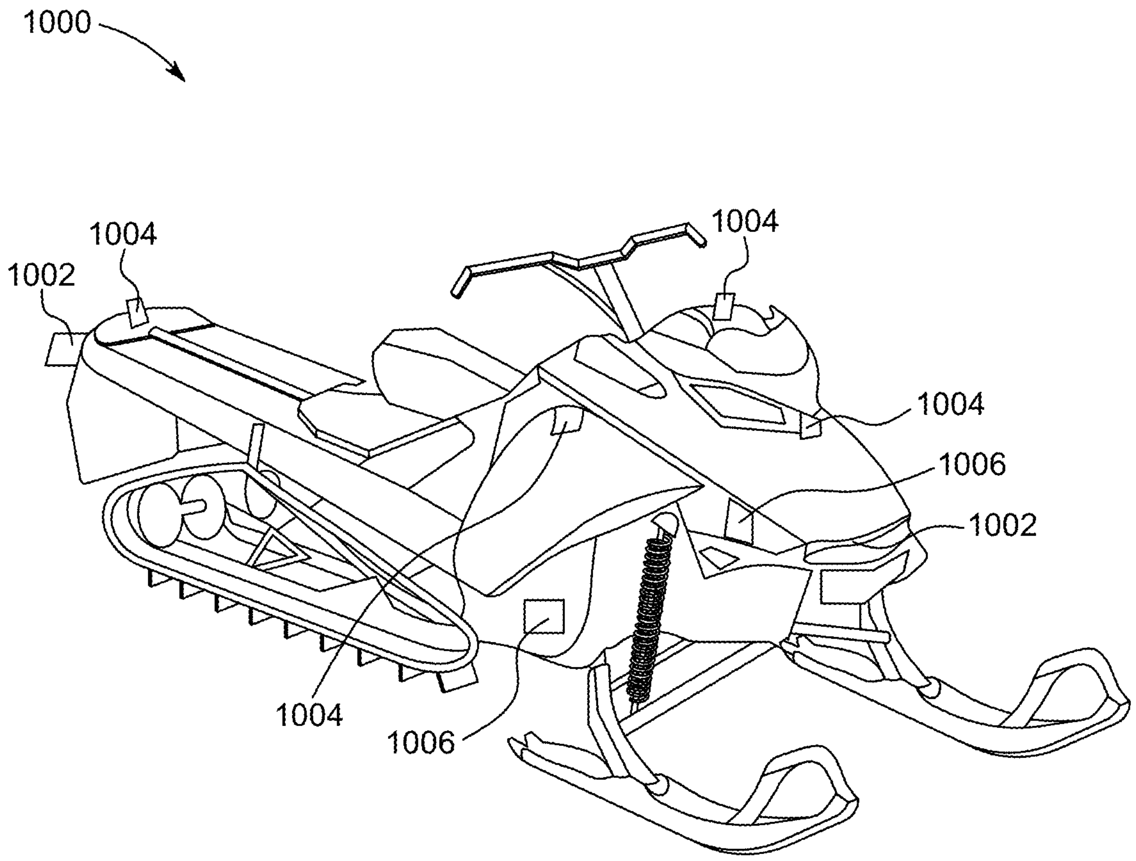
FIG. 10 is a view of an exemplary snowmobile employing an embodiment of a vehicle type indicator.

FIG. 10 is a view of an exemplary snowmobile 1000 employing an embodiment of a vehicle type indicator. One or more audible indicators 1002 are employed. Here one audible indicator 1002 is positioned at the front of the snowmobile 1000 and one is positioned at the rear. One or more visual indicators 1004 are employed, with one positioned in or around a front light of the snowmobile and another positioned in or around a rear light. A battery 1006 is also employed as a backup source in case of loss of power from the main vehicle battery and/or motor.

Figure 11:
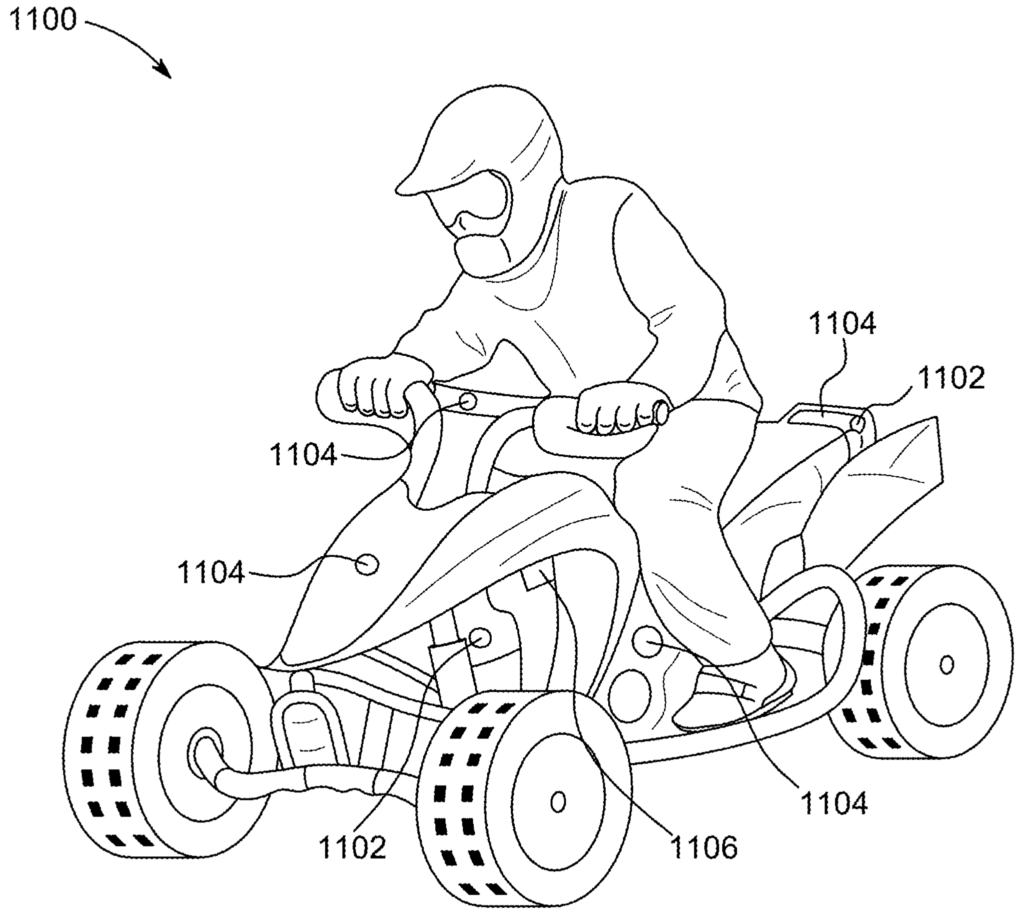
FIG. 11 is a view of an exemplary four-wheel all terrain vehicle employing an embodiment of a vehicle type indicator.

FIG. 11 is a view of an exemplary four-wheel All-Terrain Vehicle (ATV) 1100 employing an embodiment of a vehicle type indicator. One or more audible indicators 1102 are employed. Here one audible indicator 1002 is positioned at the front of the ATV 1100 and one is positioned at the rear. One or more visual indicators 1104 are employed, with one positioned in the front, and perhaps in or around a front light of the ATV and another positioned in or around a rear light. A battery 1106 is also employed as a backup source in case of loss of power from the main vehicle battery and/or motor.

Figure 12:
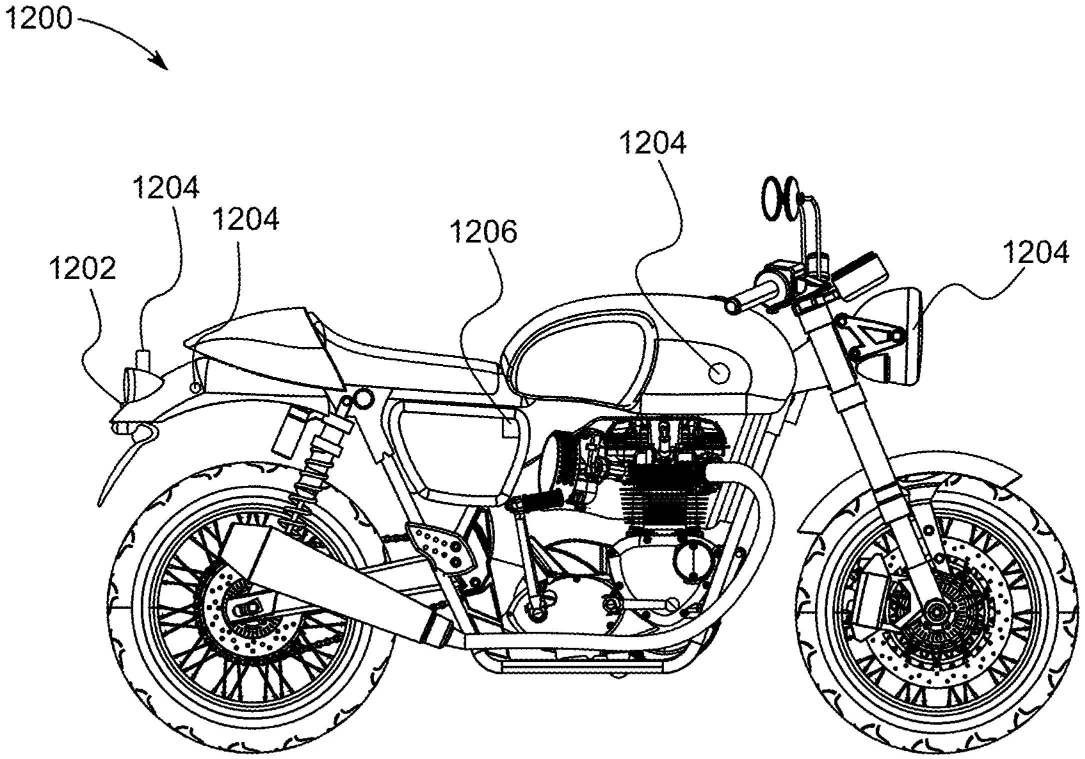
FIG. 12 is a side view of an exemplary motorcycle employing an embodiment of a vehicle type indicator.

FIG. 12 is a side view of an exemplary motorcycle 1200 employing an embodiment of a vehicle type indicator. One or more audible indicators 1202 are employed. Here one audible indicator 1202 is positioned at the rear of the motorcycle 1200. One or more visual indicators 1204 are employed, with one positioned in the front, and perhaps in or around a front light of the motorcycle, another positioned in the center such as on each side of the fuel tank, and another positioned in or around a rear light. A battery 1206 is also employed as a backup source in case of loss of power from the main vehicle battery and/or motor.

Figure 13:
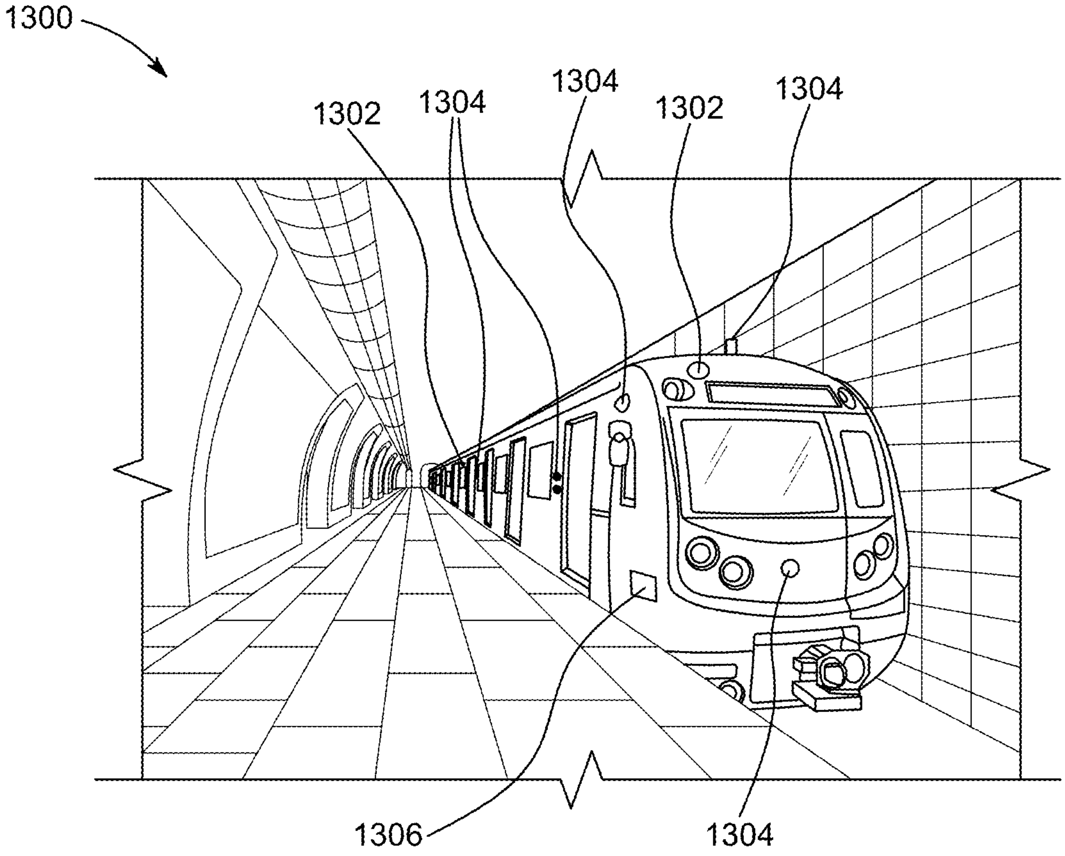
FIG. 13 is a view of an exemplary underground subway type train employing an embodiment of a vehicle type indicator.
Figure 14:
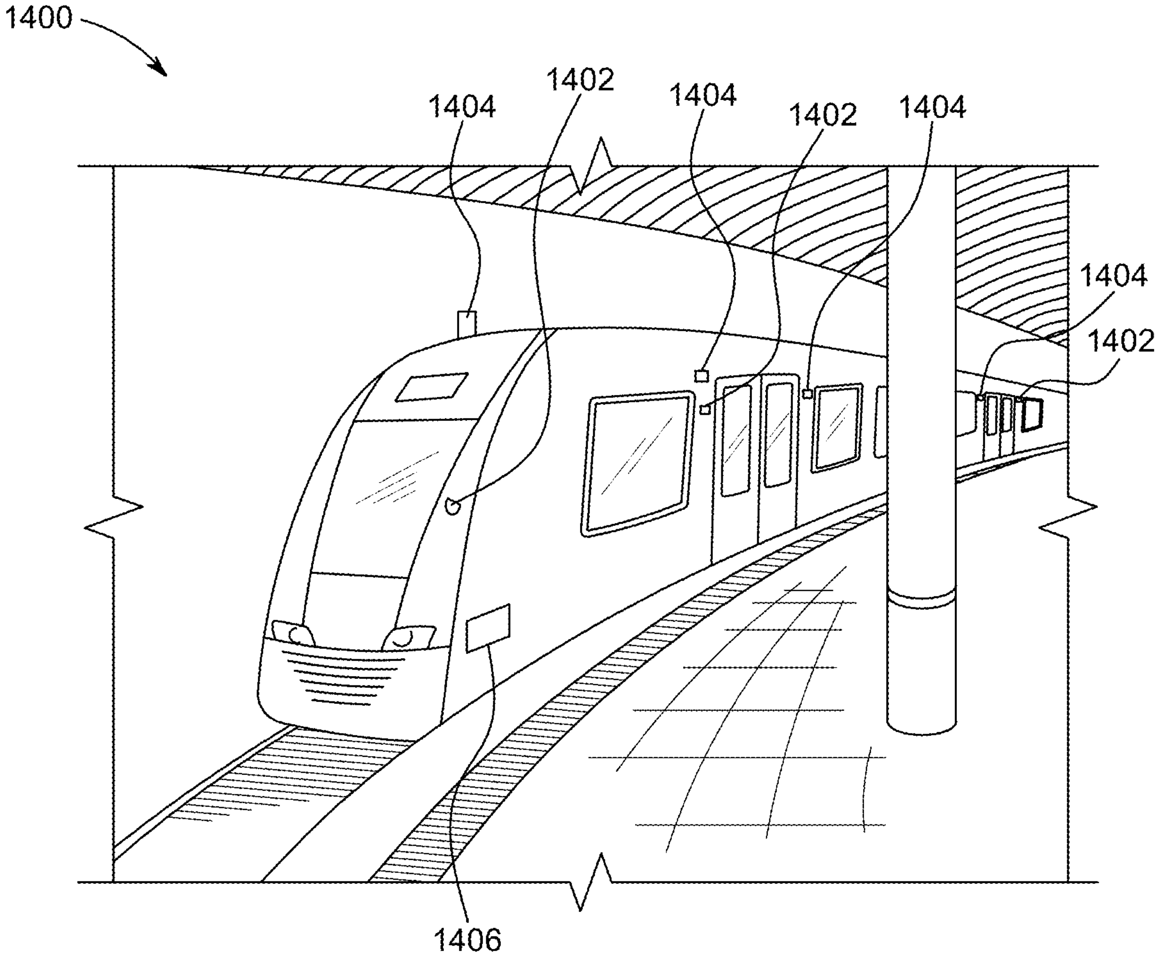
FIG. 14 is a view of another exemplary underground subway type train employing an embodiment of a vehicle type indicator.
Figure 15:
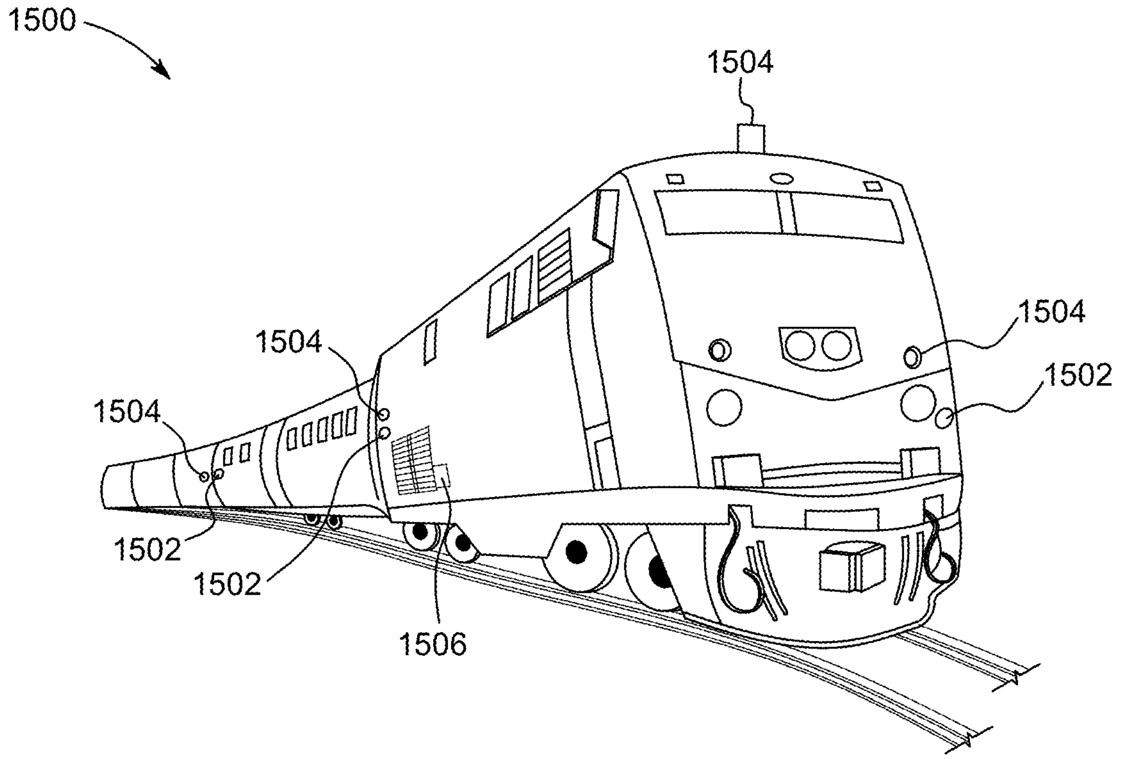
FIG. 15 is a view of an exemplary above-ground type train employing an embodiment of a vehicle type indicator.

FIG. 13 is a view of an exemplary underground subway type train 1300 employing an embodiment of a vehicle type indicator. FIG. 14 is a view of another exemplary underground subway type train employing an embodiment of a vehicle type indicator. FIG. 15 is a view of an exemplary above-ground type train employing an embodiment of a vehicle type indicator. For such large vehicles a number of visual indicators 1302/1402/1502 are employed, with one or more on each car of the train and preferably on an upper portion to increase visibility. A number of acoustical indicators 1304/1404/1504 are also employed with one or more on each car of the train. One or more batteries 1306/1406/1506 are also employed as a backup source in case of loss of power from the main vehicle battery and/or motor.

Figure 16:
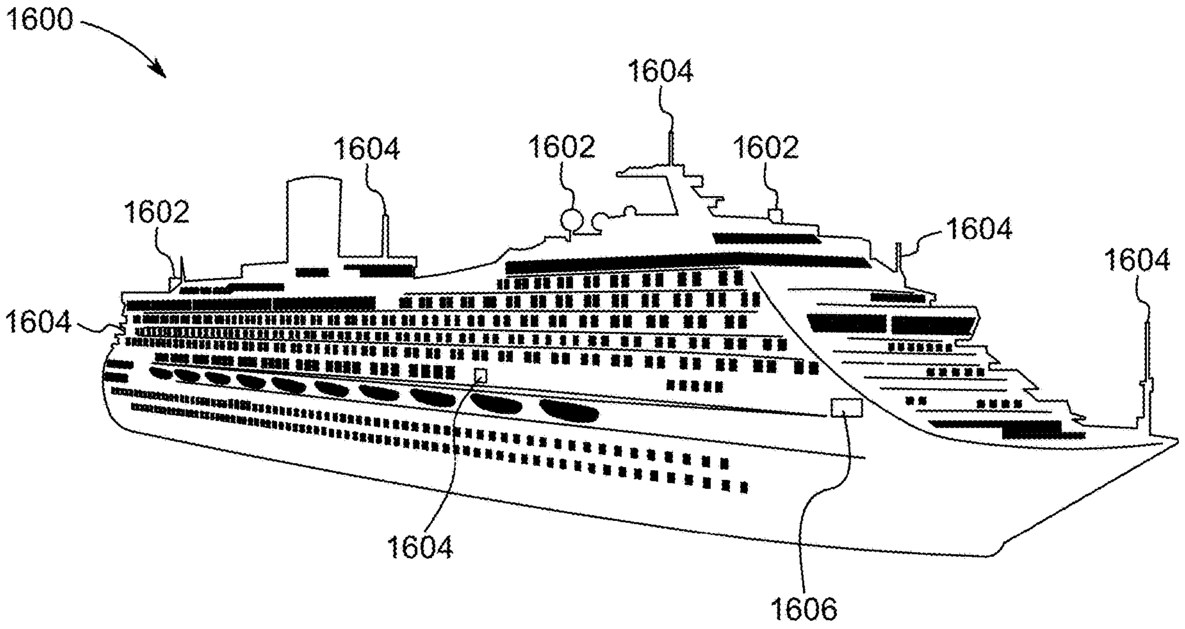
FIG. 16 is a view of an exemplary passenger type ship employing an embodiment of a vehicle type indicator.

FIG. 16 is a view of an exemplary passenger type ship 1600 employing an embodiment of a vehicle type indicator. A number of visual indicators 1602 are positioned so as to be visible to responders approaching by air or by sea. A number of acoustical indicators 1604 are also employed and are dispersed at positions so as to be heard by responders approaching by air and by sea and from various directions. One or more batteries 1606 are also employed as a backup source in case of loss of power from the main vehicle battery and/or motor. In one embodiment, one or more of the batteries 1606 are accessible from outside of the ship. This is because if there is an internal engine room fire, and the ship needs the visual and acoustical alerts to continue, to aid in the rescue of passengers in the nearby waters or warn other ships of it's location at night. Hydrogen or battery vehicles may remain dangerously hot or re-ignite, and the ship, even though empty can still be a danger, and it must warn all those in the vicinity until the vessel is cool enough to be safely towed to shore.

Figure 17:
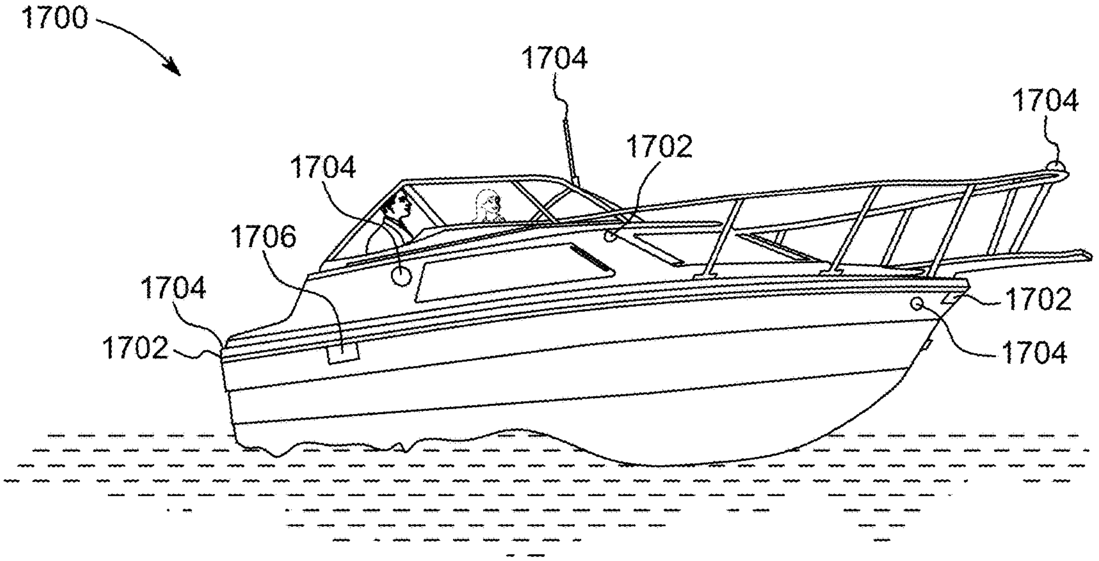
FIG. 17 is a view of an exemplary passenger recreational type boat employing an embodiment of a vehicle type indicator.
Figure 18:
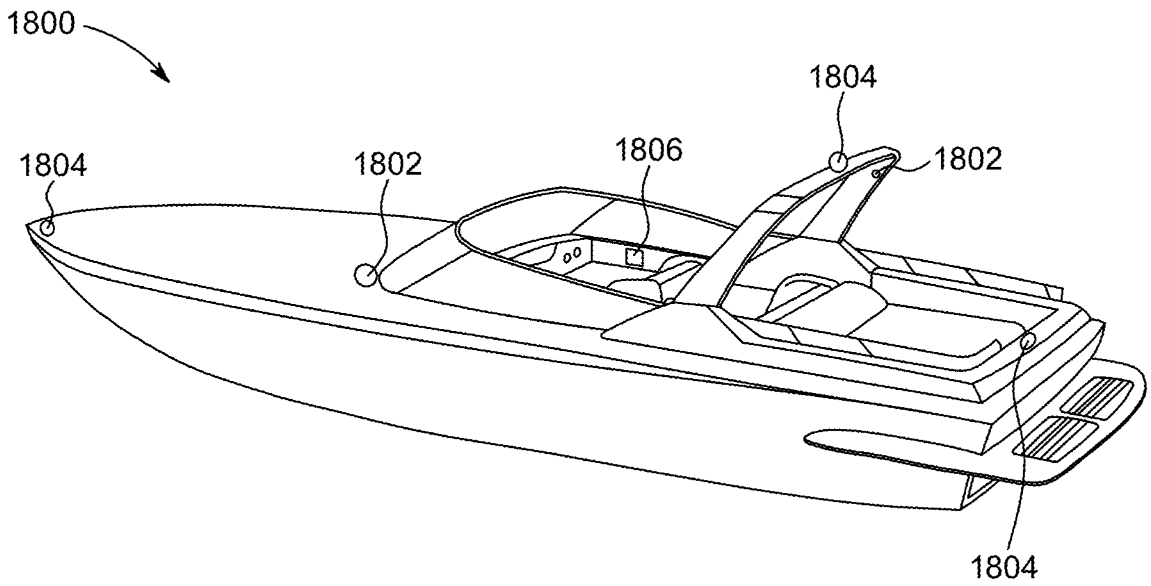
FIG. 18 is an view of an exemplary passenger recreational type ski-boat employing an embodiment of a vehicle type indicator.

FIG. 17 is a view of an exemplary passenger recreational type boat 1700 employing an embodiment of a vehicle type indicator. FIG. 18 is a view of an exemplary passenger recreational type ski-boat 1800 employing an embodiment of a vehicle type indicator. The two boats 1700 and 1800 are a bit different structurally, with the ski-boat 1800 having a support bar that is often used for attaching a tow rope for water sports. Each boat employs one or more acoustical indicators 1702/1802, preferably positioned at multiple locations (such as the fore, aft and/or mid portions) of the respective boat. Visual indicators 1704/1804 are also similarly positioned at multiple locations on each boat and may be toward the centerline of the respective boat or on each side of the boat. As seen, boat 1700 has two visual indicators 1704 at the front of the boat, one on the railing and one on the upper portion of the hull. One or more batteries 1706/1806 are also employed as a backup source in case of loss of power from the main vehicle battery and/or motor.

Figure 19:
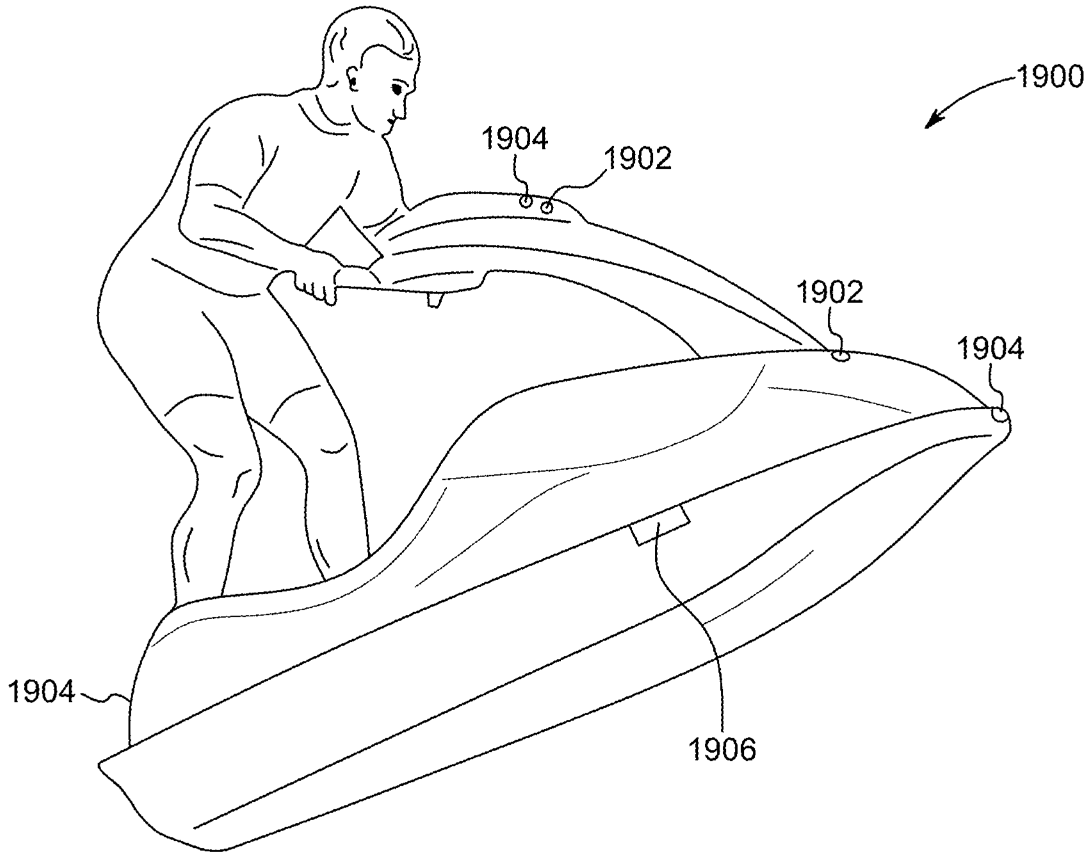
FIG. 19 is a view of an exemplary jet ski employing an embodiment of a vehicle type indicator.

FIG. 19 is a view of an exemplary jet ski 1900 employing an embodiment of a vehicle type indicator. The jet ski employs one or more acoustical indicators 1902, preferably positioned at multiple locations. Visual indicators 1904 are also similarly positioned at multiple locations and may be toward the centerline or on each side of the jet ski. As seen, the jet ski 1900 has three visual indicators 1904, one at the front, one approximately at the middle on the control handle and one at the rear. One or more batteries 1906 are also employed as a backup source in case of loss of power from the main vehicle battery and/or motor.

Figure 20:
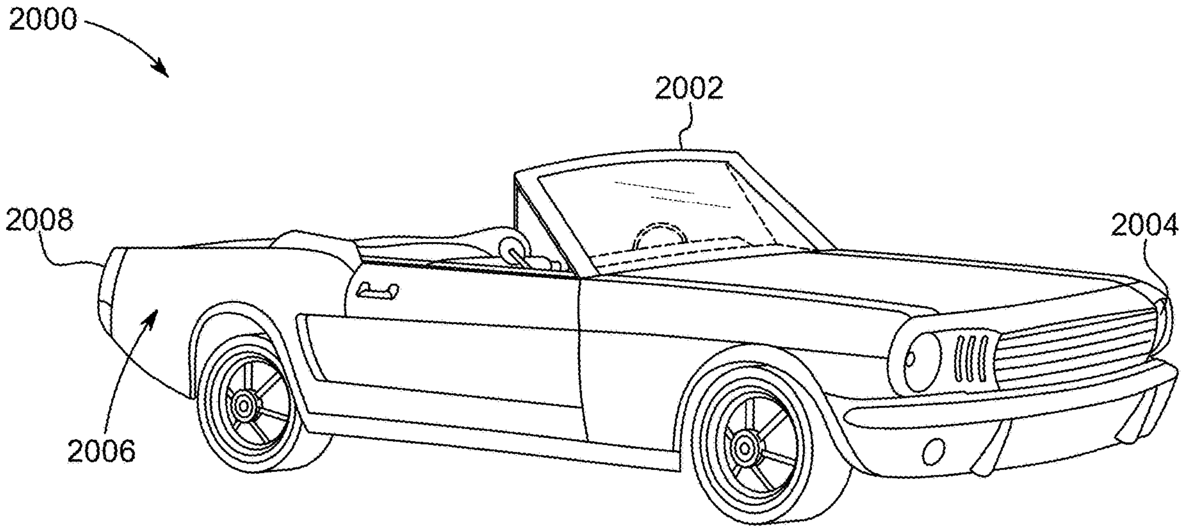
FIG. 20 is a view of an exemplary convertible passenger vehicle employing an embodiment of a vehicle type indicator.
Figure 21:
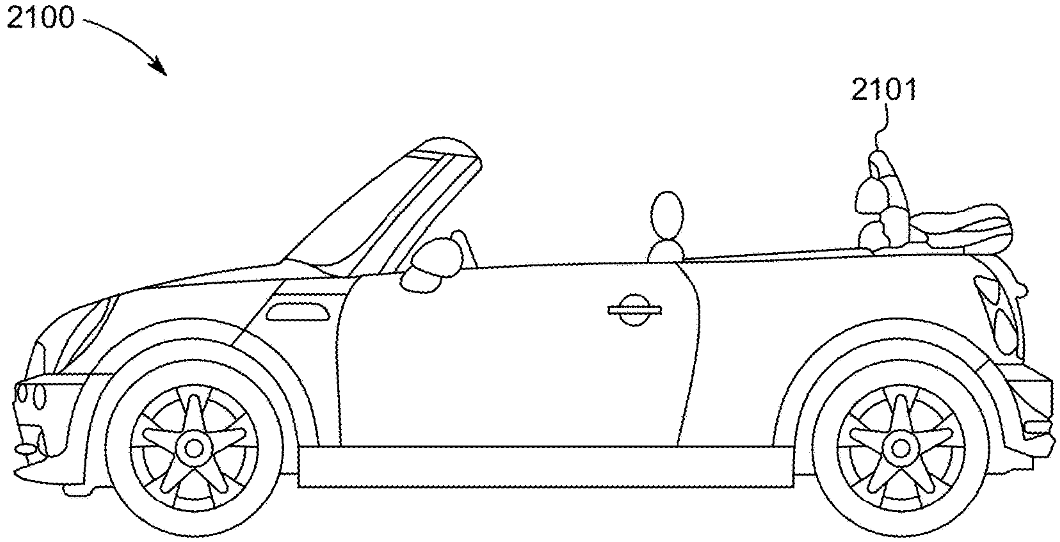
FIG. 21 is a view of another exemplary convertible passenger vehicle employing an embodiment of a vehicle type indicator.

FIG. 20 is a view of an exemplary convertible passenger vehicle 2000 employing an embodiment of a vehicle type indicator. FIG. 21 is a view of another exemplary convertible passenger vehicle 2100 employing an embodiment of a vehicle type indicator. The vehicle 2000 is an older model while the vehicle 2100 is a newer model employing a roll bar 2101, which may employ one or more acoustic and/or visual indicators. On a typical classic car such as vehicle 2000, one or more indicators may be mounted on the upper windshield 2002, front area 2004, side 2006 and rear 2008. An older vehicle such as vehicle 2000 may be retrofitted with indicators in one or more of the ways as taught herein. Additionally, many "classic" cars are not truly classic originals. There is an increasing trend to use the chassis and powertrain of a new car, and the sheet metal and body of an old car, either as a copy or modification. This presents even greater confusion because a first responder might see what looks like a 1966 Ford Mustang, which was only gasoline powered, and mistakenly assume that it is. It could be a battery vehicle, a hybrid, or a hydrogen powered vehicle. Also contributing to possible confusion regarding a vehicle's power source is that manufacturers design many different cars from the same basic platform with different power sources. For example, the 2022 Mercedes S-class which is either gasoline or hybrid, shares the same platform with the all electric 2022 eqs.

In the even that indicator(s) are positioned on the roll bar 2101, additional indicator(s) will be needed to provide an indication when the top is up as this can typically hide the roll bar 2101.

Figure 22:
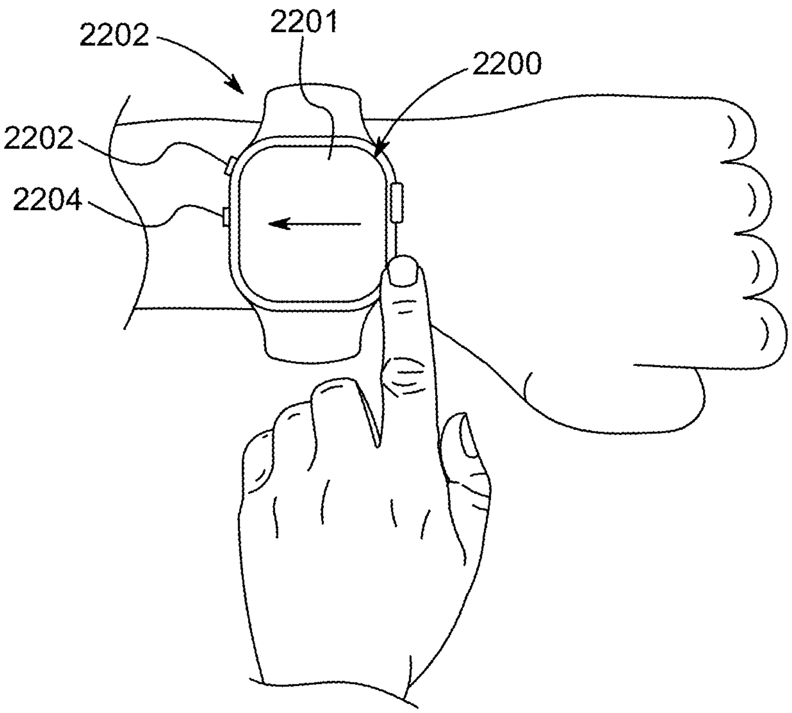
FIG. 22 is a view of a wearable device that operates to provide a vehicle type indicator.

FIG. 22 is a view of a wearable device 2200 that operates to provide a vehicle type indicator. Shown is a user's hand wearing a "Smartwatch" or wearable or other device 2200, such as the Galaxy Watch or Apple Watch. If the user is in the vicinity of an event that may put the user in danger, instructions are provided from a location remote to the user's device 2200 that cause control to be taken of the device's screen to provide instructions and other information to guide the user to safety. This can be done automatically or by swiping the screen, pushing a button or by any other means. The directions can be embedded with different lights to alert of the level of danger and "Waze" like characters like ambulances that are available for assistance. Thus, the embodiment of FIG. 22 provides safety to individuals by guiding them with indications and instructions by way of screen 2201 to stay away from a dangerous event and to guide them away from a dangerous event. The indications and instructions can include an acoustical indication by way of a speaker 2202 on the device, a visual indication such as a red warning light 2204, which is a common symbol associated with danger. A vibratory alert may also be employed.

Figure 23:
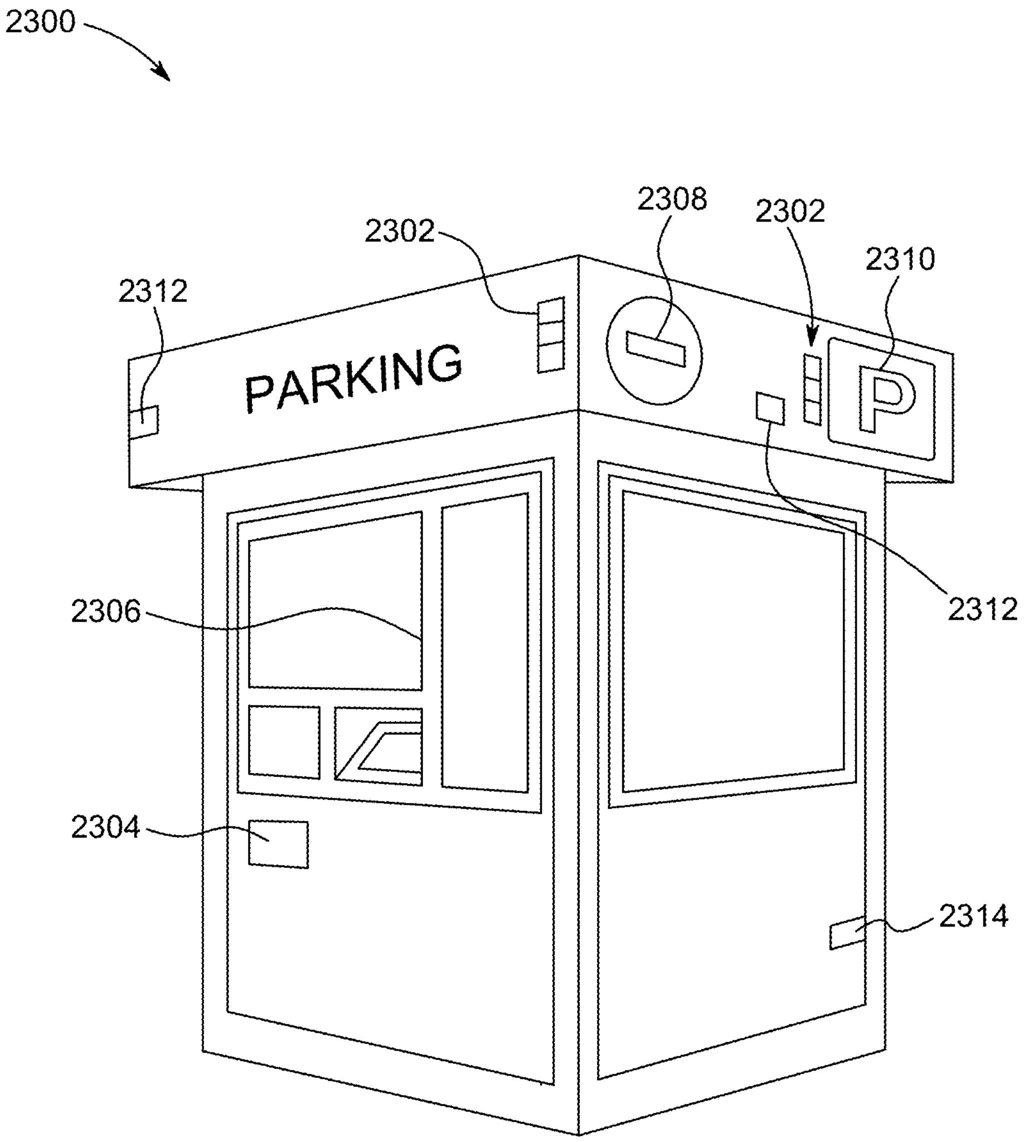
FIG. 23 is a view of a parking attendant type booth that operates to provide a vehicle type indicator.

FIG. 23 is a view of a parking attendant type booth 2300 that operates to provide a vehicle type indicator of types of vehicles in an associated parking structure or area. A visual indicator 2302 is positioned to alert the public and first responders what type of vehicles are in the structure. Meaning a blue indicator may mean hydrogen, pink indicator may mean battery and an orange indicator may mean a hybrid vehicle. A scanner 2304 operates to identify vehicles when they pull into the lot. This may be done manually by the attendant, or automatically using an "EZ Pass" type information method, RFID chip, bar code, or any other identifying means. A visual indicator 2306 operates to alert those who may try to enter, to not, by stating the incident in the garage or lot, noting the unsafe situation. Another type of visual indicator form is shown at 2308. An illuminated area 2310 by the "P" letter, alerts those looking for a parking lot. An acoustical indicator 2312 provides an acoustical indication of the types of vehicles in the structure/area. One or more batteries 2314 are also employed as a backup source in case of loss of power from the regular power source.

Figure 24:
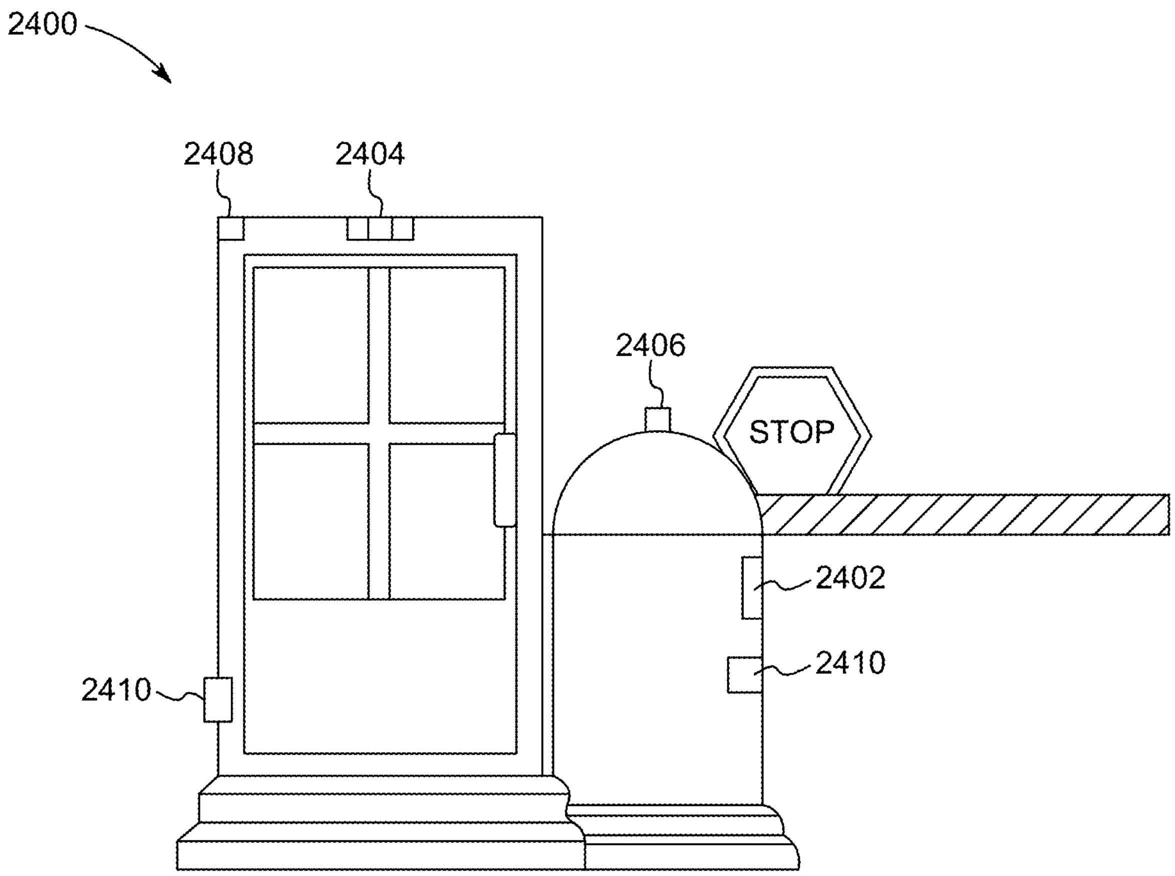
FIG. 24 is a view of an exemplary manned or unmanned parking lot entrance booth that operates to provide a vehicle type indicator.

FIG. 24 is a view of an exemplary manned or unmanned parking lot entrance booth 2400 that operates to provide a vehicle type indicator. A scanner 2402 operates to identify vehicles when they pull into the lot. This may be done manually by the attendant, or automatically using an "EZ Pass" type information method, RFID chip, bar code, or any other identifying means. A visual indicator 2404 operates to alert the public and first responders what type of vehicles are in the structure. Meaning a blue indicator may mean hydrogen, pink indicator may mean battery and an orange indicator may mean a hybrid vehicle. A visual indicator 2406 operates to alert those who may try to enter, to not, by stating the incident in the garage or lot, noting the unsafe situation. It will also alert first responders and provide information based on the illuminated symbols indicating the type of vehicles in the structure or lot. An acoustical indicator 2408 provides an acoustical indication of the types of vehicles in the structure/area. One or more batteries 2410 are also employed as a backup source in case of loss of power from the regular power source.

Figure 25:
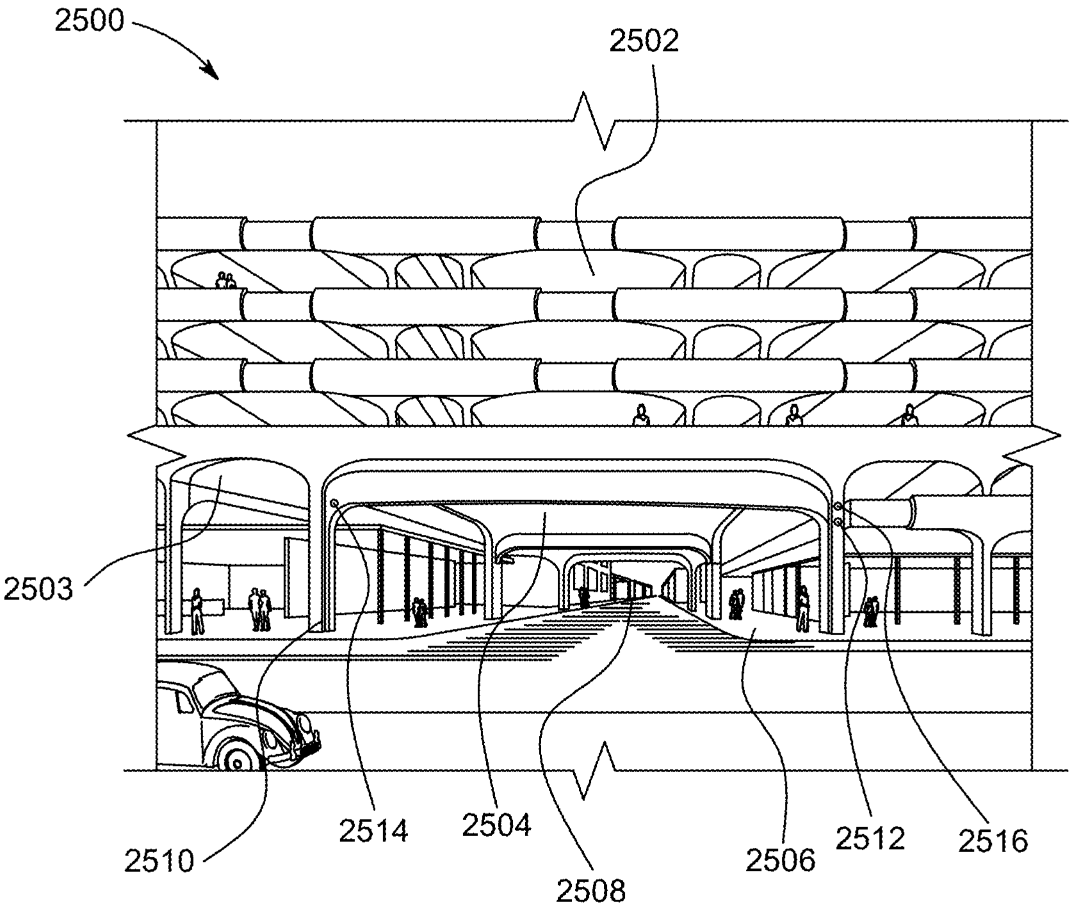
FIG. 25 is a side view of an exemplary open-air type parking structure that operates to provide a vehicle type indicator.

FIG. 25 is a side view of an exemplary open-air type parking structure 2500 that operates to provide a vehicle type indicator. The structure 2500 has barrel-vaulted walls seen at 2502, 2503, 2504. Walls that are not flat vent fires and gas, in different ways. The hydrogen can collect in the openings and create a potentially devastating after burn effect for example. Seen at 2506 are stores or pedestrian walkways which are used by non-parkers. If a structure collapses, it will not only kill or maim the drivers, it will injure any individuals in and around the structure who are not there to park or retrieve their vehicles. Looking at 2508, if a hydrogen vehicle is hit from the rear, and the TPRD vents the hydrogen inside the structure, it will vent and create a fireball, and potential explosion collapsing the structure. Looking at 2510, the structure is held together by vertical columns that buttress the arched and hydrogen trapping ceilings. This presents a grave danger. These garages were designed to store gasoline powered vehicles which do not throw explosive fumes upwards. They are not designed to accommodate hydrogen vehicles. The structure 2500 is shown with a plurality of acoustic indicators 2512 and visual indicators 2514 and one or more batteries 2516 are also employed as a backup source in case of loss of power from the regular power source.

Figure 26:
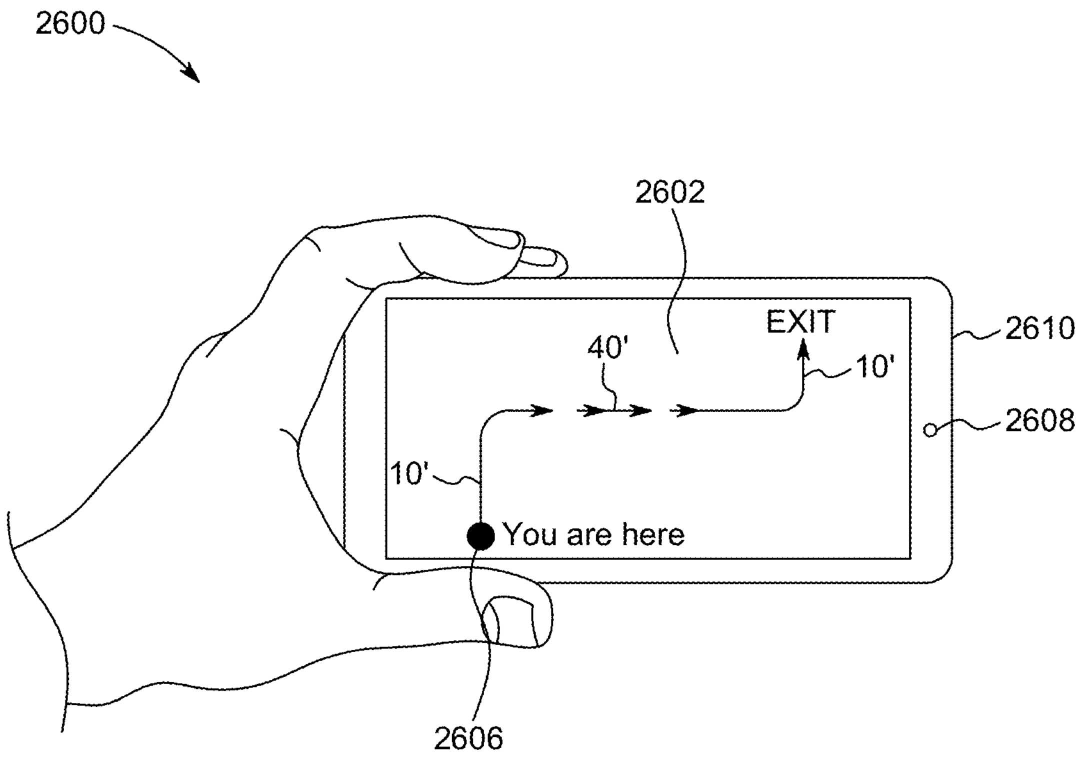
FIG. 26 is a view of an exemplary hand-held computerized device that operates to provide a warning and other information to a user.

FIG. 26 is a view of an exemplary hand-held computerized device 2600 that operates to provide warnings, instructions and/or indications to a user with regard to an emergency situation. The screen, 2602 is controlled during an event as described above in connection with FIG. 22. The instructions to safety are immediately projected onto the display 2602. At night or in dark situations, the rear facing flash on the device 2600 may be turned on to guide the user to safety, by illuminating the path. The device 2600 is programmed to provide turn by turn instructions, which may be embedded with "Waze" like icons, to guide the user to safety. The screen also provides an indicator seen at 2606 to indicate position of the user.

Figure 27:
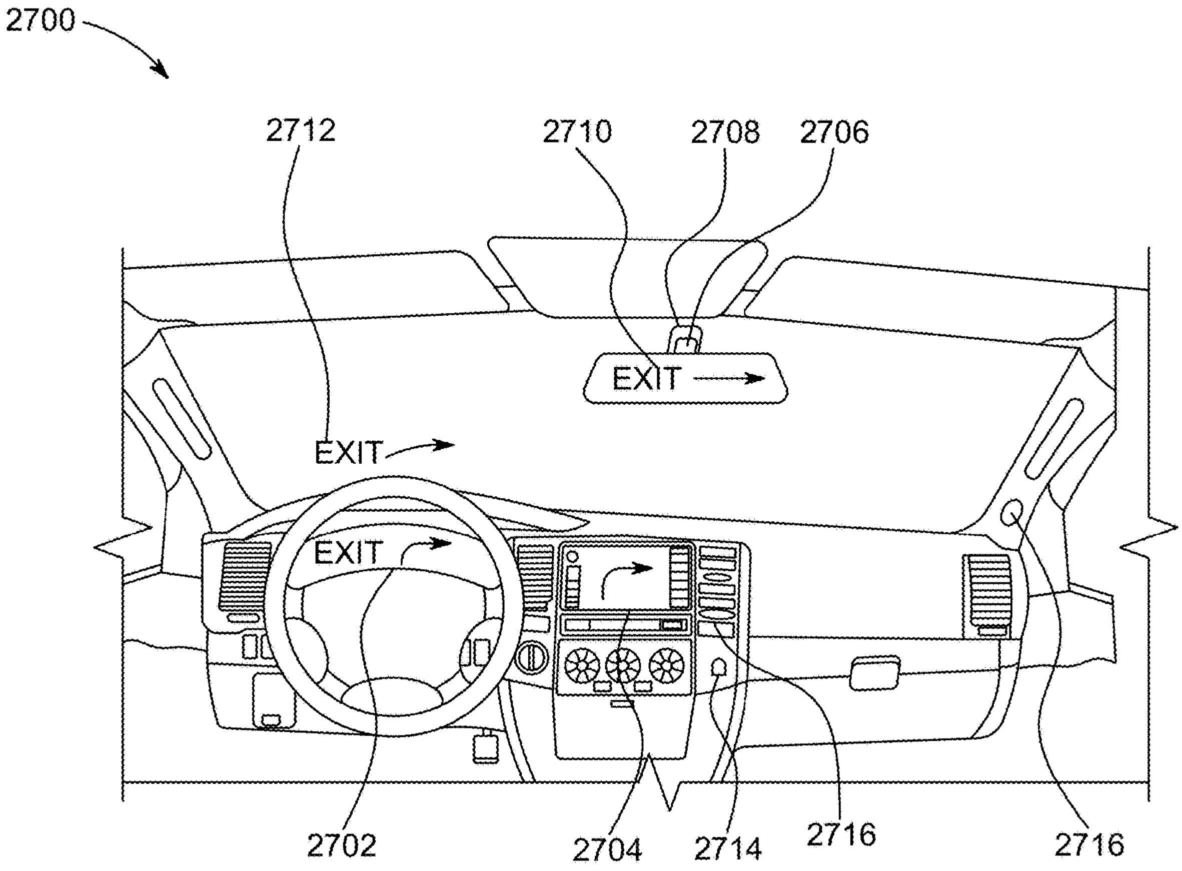
FIG. 27 is a front view of an exemplary dashboard (instrument panel) of a common passenger type vehicle.

FIG. 27 is a front view of an exemplary dashboard (instrument panel) 2700 of a common passenger type vehicle. The central display 2702 in front of the driver indicates the danger and the directions for the occupant. Meaning the danger and directions would be provided as described above in connection with FIG. 22. The Navigation screen 2704 or the central display in front of the driver operates to indicate the danger and the directions for the occupant(s). An indicator 2706 is positioned in the rear-view mirror to also provide guidance to the user as to a dangerous situation. An indicator 2708 at the rear of the rear-view mirror, may also be used to be seen by those outside of the vehicle. The rearview mirror 2710 which is often not a true mirror but a display like a television. For example, the Infinity QX-80 displays the backup camera's image in it, when the cargo area of the vehicle blocks the view from a traditional mirror. This area can be used in the manner described in connection with FIG. 22 to provide instructions and other information to guide the user to safety. An indicator or message in the "Head's Up" display 2712 on a vehicle windshield may also be provided. The "Head's Up" is an optical image displayed from the dashboard of the car, which makes the image opaque in front of the driver. A battery 2714 may also employed as a backup source in case of loss of power from the regular power source to power at least the warning systems described in this paragraph. An acoustical indicator, which in one embodiment may take the form of a dedicated speaker 2716, can operate to silence or override music or other audio emanating from the vehicle's regular speaker system. The speaker 2716 can operate to produce pre-determined warning tones in a unique way and in a unique placement.

Figure 28:
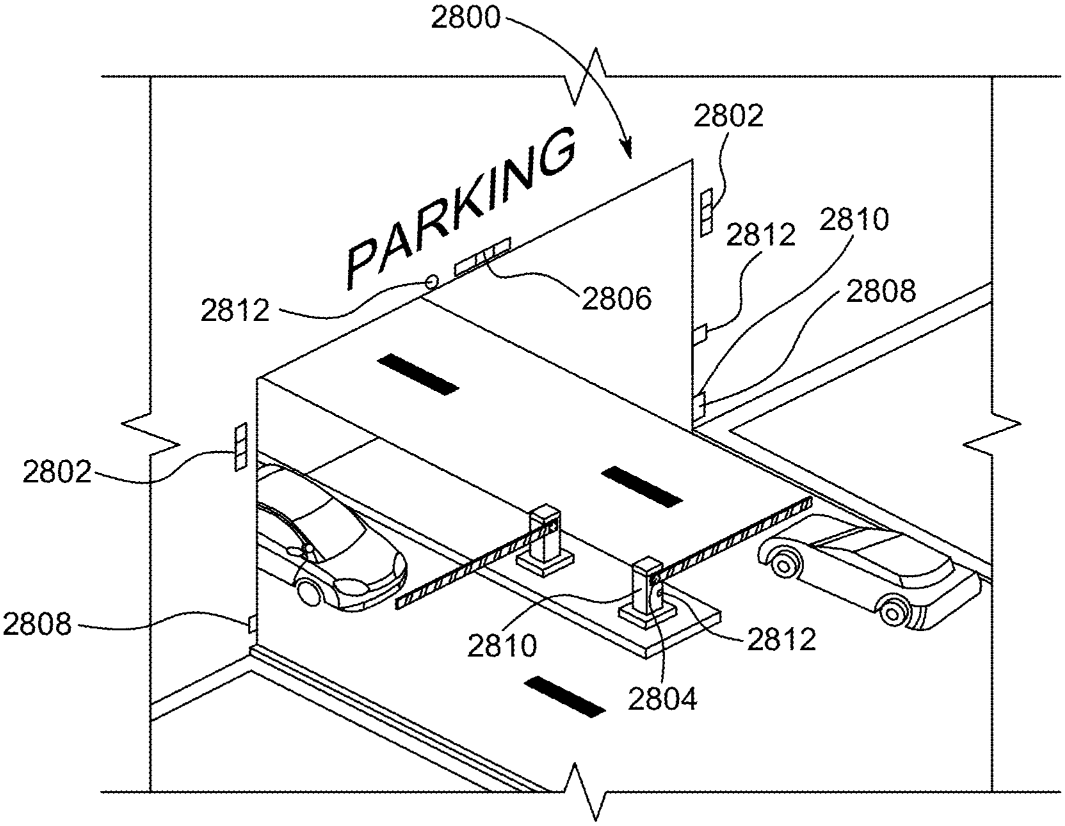
FIG. 28 is a view of an exemplary entrance to an above or below ground parking structure that operates to provide a vehicle type indicator.

FIG. 28 is a view of an exemplary entrance 2800 to an above or below ground parking structure that operates to provide a vehicle type indicator. One or more indicators 2802 are mounted on a wall adjacent to the garage opening. An indicator 2804 is located on the arm that opens and closes to let vehicles in or to prevent them from entering. An indicator 2806 is positioned above the garage entrance. An indicator 2808 is positioned at the side of the entrance. One or more batteries 2810 may also employed as a backup source in case of loss of power from the regular power source and an acoustic indicator may also be employed to provide an indication of types of vehicles in the structure.

Figure 29:
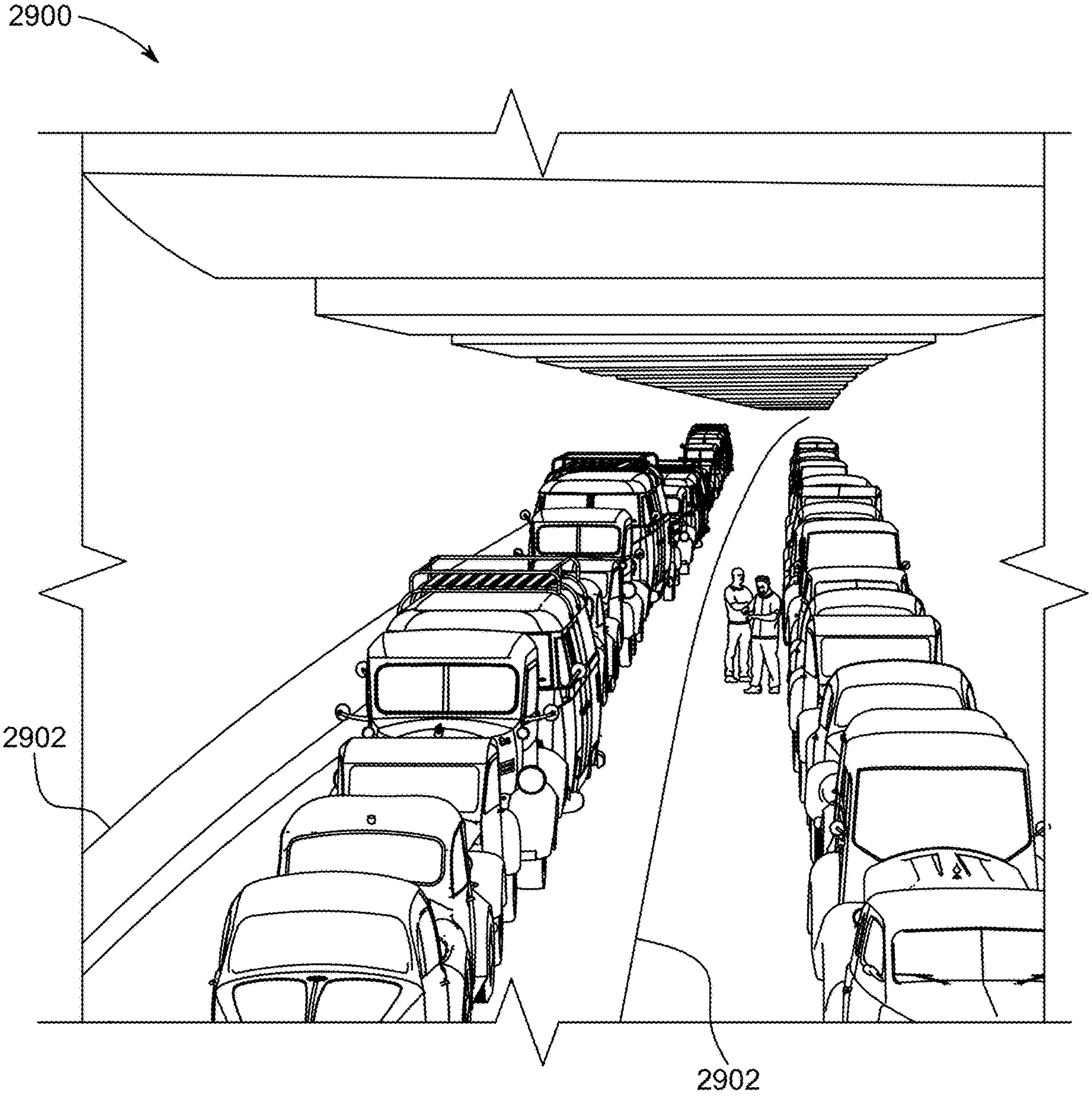
FIG. 29 is a view looking down a tunnel that is occupied with vehicles.

FIG. 29 is a view looking down a tunnel 2900 that is occupied with vehicles. Many of vehicles have an indicator positioned on top of the vehicle. Note the different heights of the vehicles and trucks. Also, note that the bumpers in front and in the rear are not visible. Currently vehicles are identified to the public by labels on the grille or rear of the vehicle. In congested tunnels the front and rear of the vehicles are not visible. The roofs of the vehicles are. The various symbols or colors will alert the first responders of the type of vehicle in the tunnel. Hydrogen vehicles must be clearly identified, and individuals in vehicles must be guided to safety. In one embodiment, the tunnel 2900 includes illuminated visual areas 2902 to guide individuals to safety. Older tunnels have generally been designed with only gasoline/diesel powered vehicles in mind. The tunnels present a grave danger during a hydrogen venting situation. Note the gas trapping uneven ceiling which can create a hydrogen collecting area, which worsens the effects of a fire or explosion. The hydrogen gas may become trapped in these areas.

Figure 30:
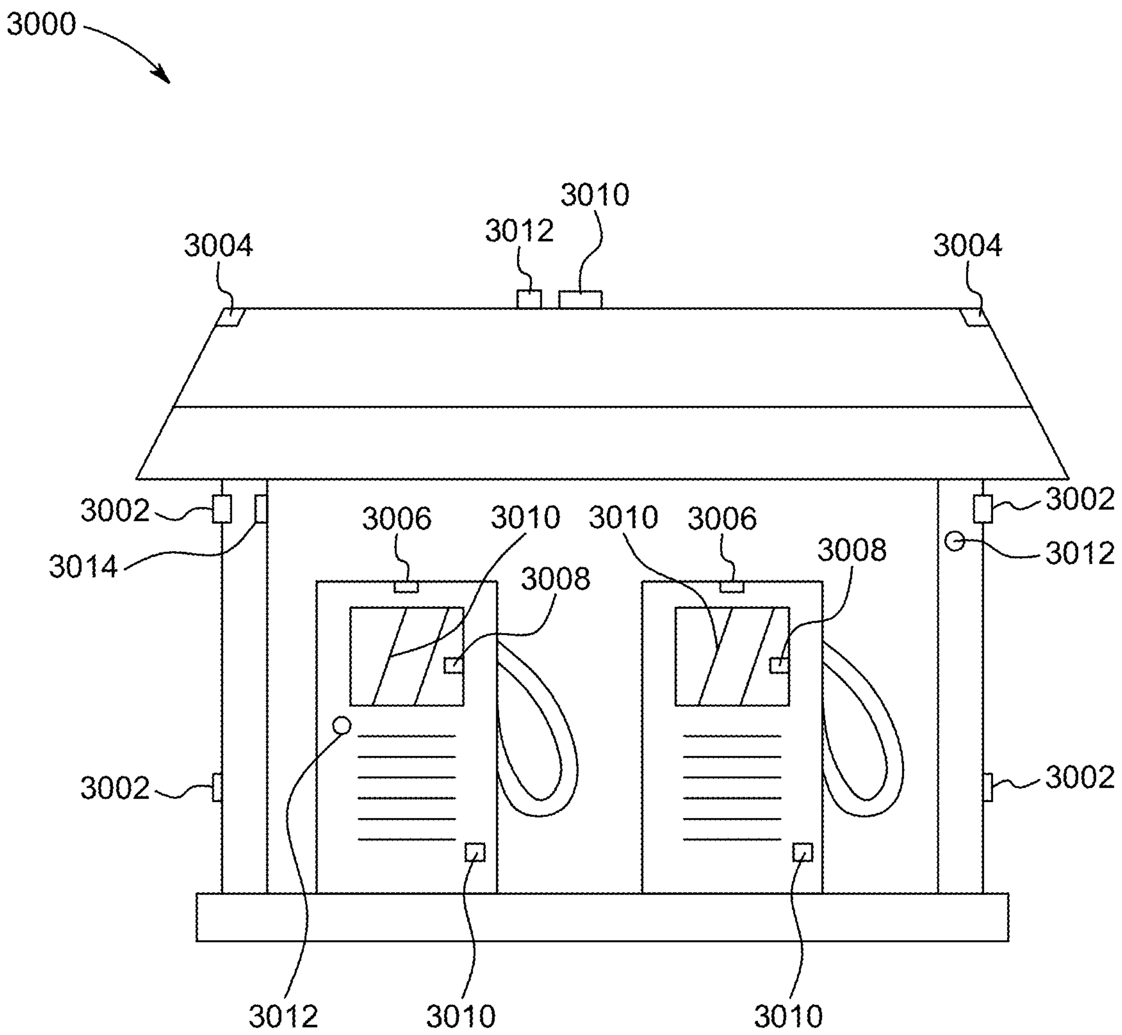
FIG. 30 is a side view of an exemplary hydrogen fueling dispenser island that operates to provide a vehicle type indicator.

FIG. 30 is a side view of an exemplary hydrogen fueling dispenser island 3000 that operates to provide an indication of a danger situation. A plurality of visual indicators 3002 are positioned at the top and lower areas of the side and also at positions 3004 on the roof covering of the structure. Each dispenser may also incorporate a dedicated visual indicator 3006 and also one on the display screen 3008, which may be controlled to display warnings, or directions. A visual indicator 3010 may also be positioned at the top of the dispenser island's cover. One or more acoustic indicators 3012 may also be employed and one or more batteries 3014 may also employed as a backup source in case of loss of power from the regular power source.

Figure 31:
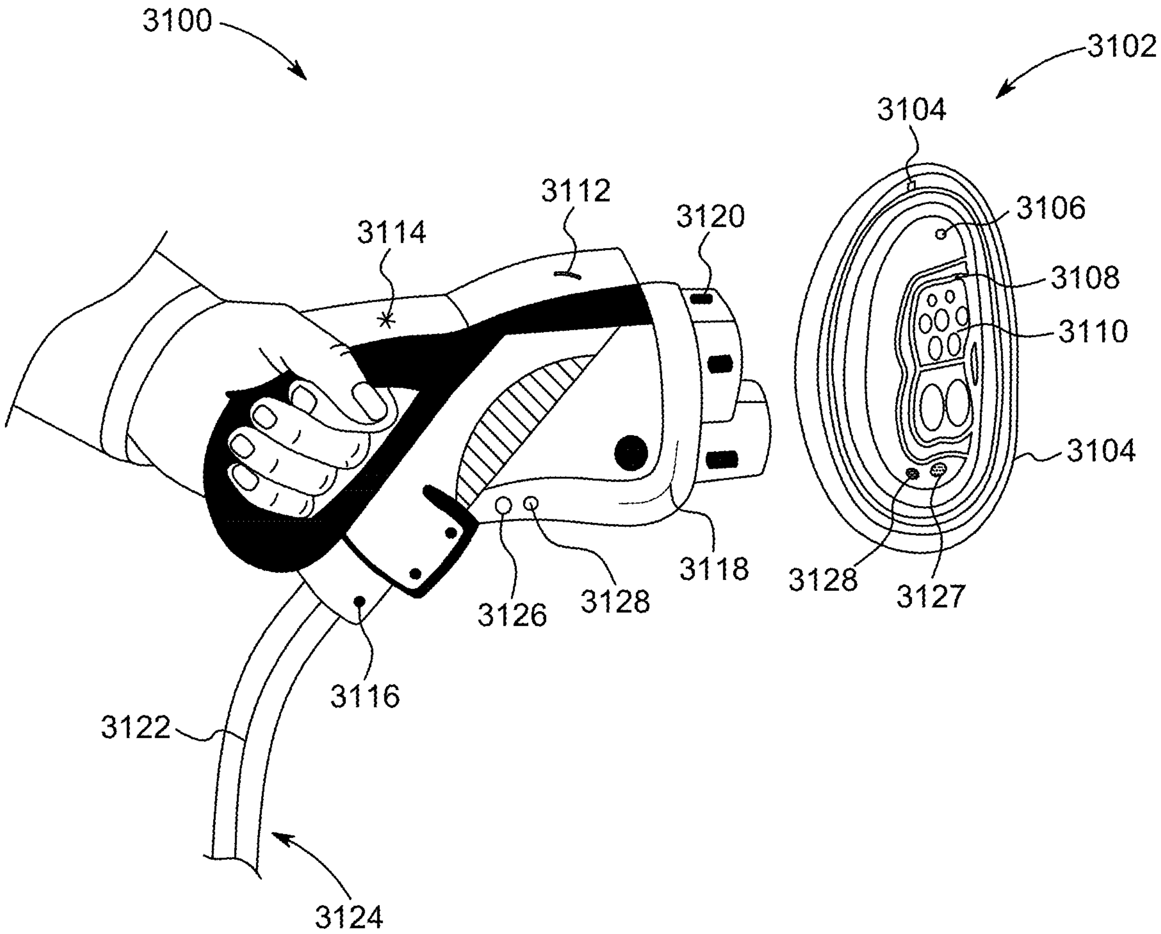
FIG. 31 is a view of an exemplary hydrogen fueling handle and receptacle that operates to provide information regarding fueling status.

FIG. 31 is a view of an exemplary hydrogen fueling handle 3100 and receptacle 3102 that operates to provide an indication of fueling status and safety conditions. A visual indicator 3104 is located around the filling area or connection area on the vehicle. In one embodiment, the indicator 3104 takes the form of an OLED painted surface, which can be controlled to light up in any color. This means that the OLED painted surface may be controlled to light up in any way, shape, color, or pattern or a combination thereof. Seen at 3106, 3108 and 3110 are additional indicators near the connection device. An indicator 3112 is also positioned at the top portion of the handle 3100. An indicator 3114 may also be positioned at the top portion of the handle 3110 closer to the user's hand. An additional indicator 3116 may be positioned near the bottom of the handle 3110 and an indicator 3118 may be positioned at the end of the handle. An indicator 3120 may also be positioned near the receptacle end of the handle 3100. A plurality of indicators 3122, 3124 may be positioned on the hose, or may be in integral part of the hose, as a line, a series of dots or a skin that makes the whole hose illuminate. A backup battery 3126 may also be incorporated into the handle 3100 as a backup source in case of loss of power from the regular power source, and an acoustical indicator 3128 may also be employed in addition to the other visual type indicators described in this paragraph.

Figure 32:
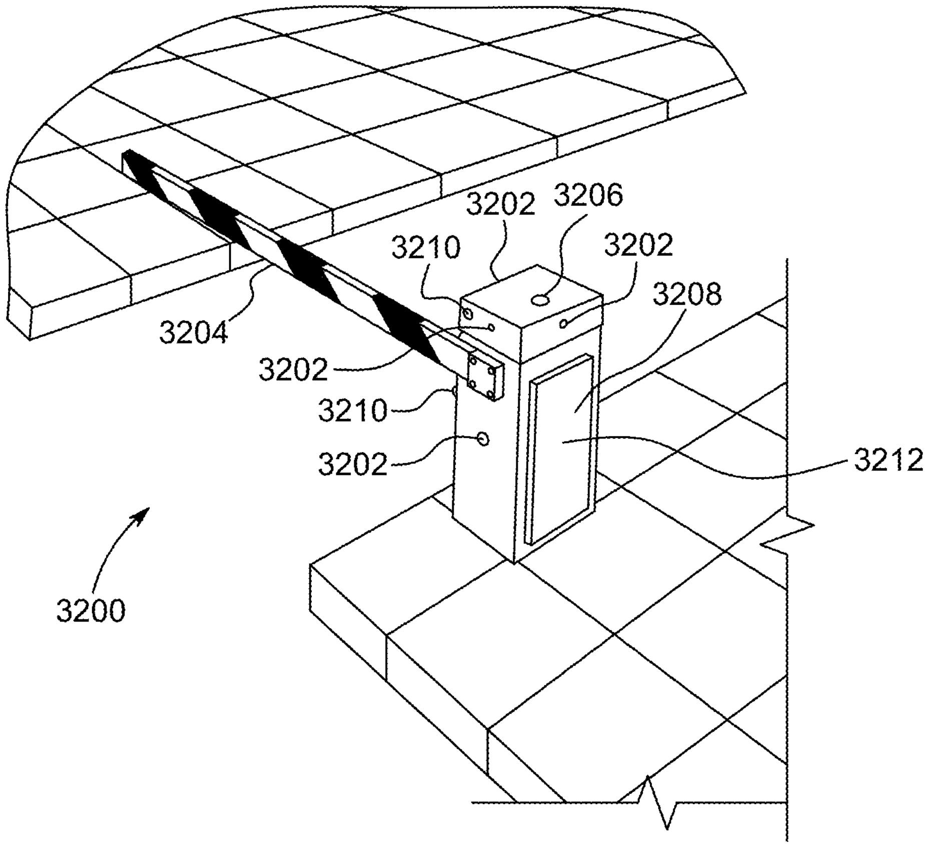
FIG. 32 is a view of an exemplary parking lot gate that operates to provide a vehicle type indicator.

FIG. 32 is a view of an exemplary parking lot gate 3200 that operates to provide a vehicle type indicator. One or more scanners 3202 may be employed to gather information about vehicles entering via the gate 3200. Arm 3204 operates to block and allow vehicles to enter, which may have indicators. A visual indicator 3206 is located at the top of the motor and control cabinet. In one embodiment, the indicator 3206 takes the form of an OLED painted surface, which can be controlled to light up in any color. This means that the OLED painted surface may be controlled to light up in any way, shape, color, or pattern or a combination thereof. An acoustical indicator 3216 may also be employed as well as a backup battery 3212 to provide a backup source of power in case of loss of power from the regular power source.

Figure 33:
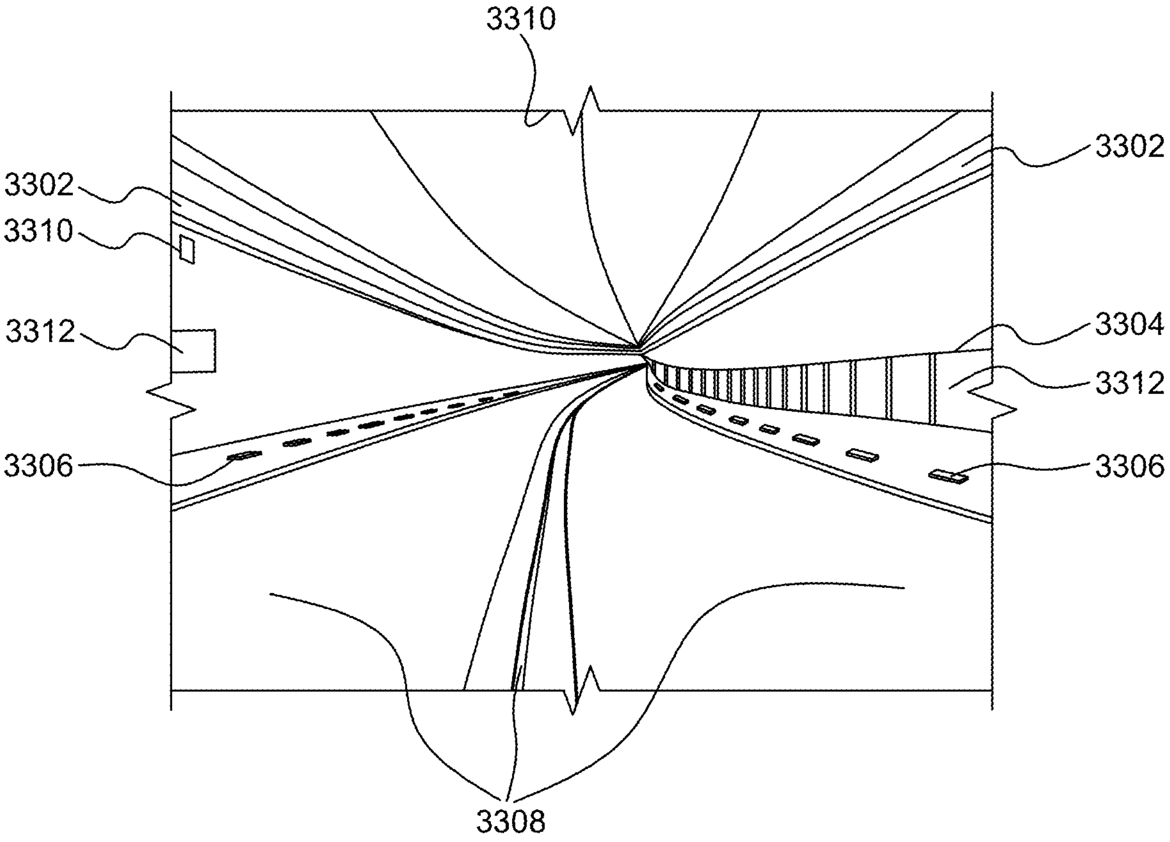
FIG. 33 is a view looking down a two-lane tunnel.

FIG. 33 is a view looking down a two-lane tunnel 3300 which could have traffic going in both directions, or one lane could be the opposite of the other. The embodiment shown in FIG. 33 has a plurality of indicators 3302 in the ceiling area to guide occupants to safety. A plurality of indicators 3304 are positioned in the railing area to assist in the path to safety. Indicators 3306 may also be positioned in the side wall or molding area to assist to safety and additional indicators 3308 may be embedded in the paved area, in the middle, center or side areas. In addition to the foregoing visual indicators, one or more acoustic indicators may also be employed and one or more backup batteries 3212 may be employed to provide a backup source of power in case of loss of power from the regular power source.

Figure 34:
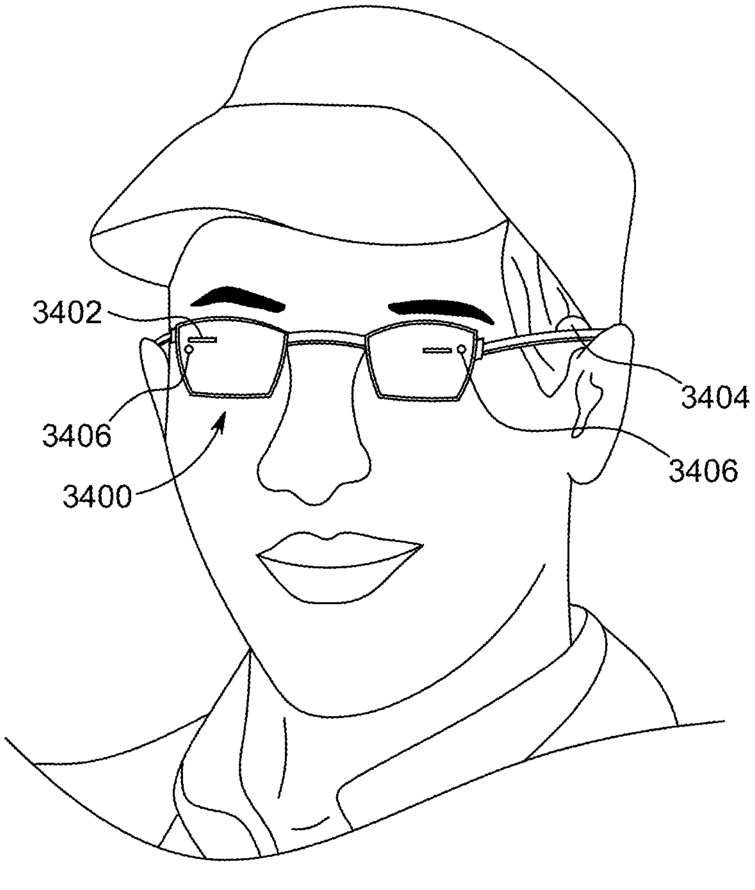
FIG. 34 is a view of a wearable computerized device in the form of eyeglasses.

FIG. 34 is a view of a wearable computerized device in the form of eyeglasses 3400. The glasses 3400 operate to project an image 3402 on the lens in a manner to be visible to the wearer. The information may only be visible during an alert or may be a constant stream of information. The indicator may provide instructions to safety, or status concerning the event. The information comes via WIFI, Bluetooth, cell transmission or by any other means, from the user's smartphone, or as the glasses acting independently. In one embodiment, a speaker 3404 may also be contained within the frame of the glasses. Additionally, a specific danger LED 3406 may be employed to provide a unique flash pattern in case of danger.

Figure 35:
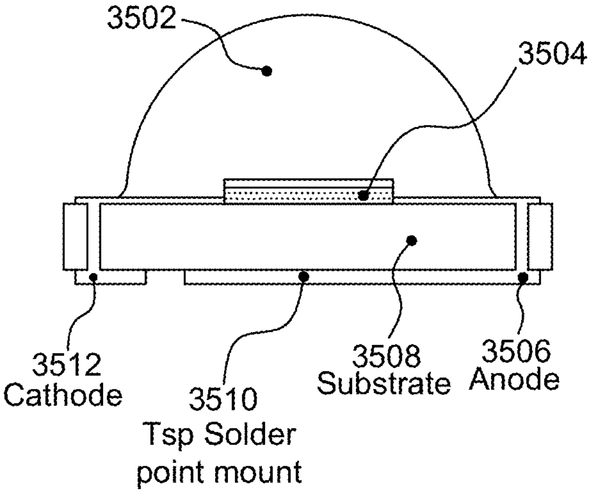
FIG. 35 is an illustration of an exemplary Light-Emitting Diode (LED).

FIG. 35 is an illustration of an exemplary Light-Emitting Diode (LED) 3500 that may be employed in the various visual indicators described herein. The LED 3500 includes a silicone lens 3502, an LED chip 3504 to control operation of the device, an anode 3506, a substrate 3508, a solder point mount 3510 and a cathode 3512.

Figure 36:
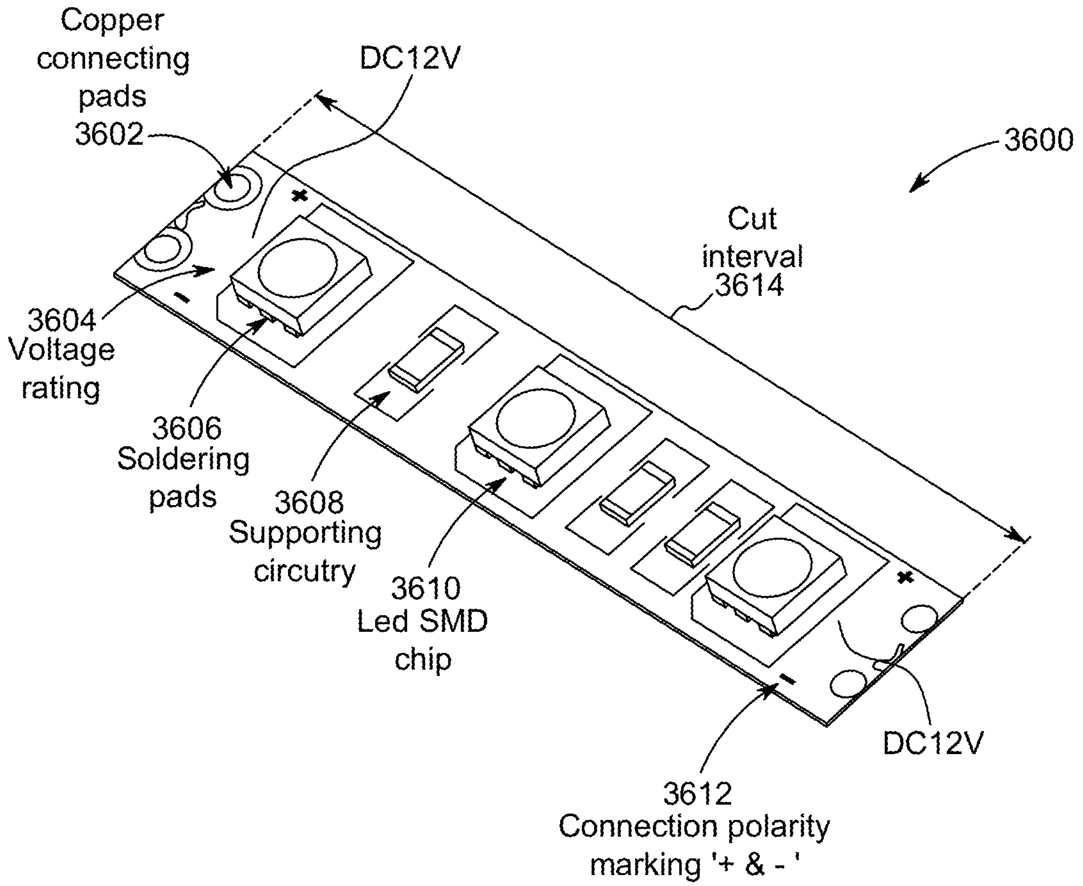
FIG. 36 is an illustration of an exemplary strip of LEDs.

FIG. 36 is an illustration of an exemplary strip 3600 of LEDs that may be employed in the various visual indicators described herein. The strip 3600 provides for multiple LEDs organized in a two-dimensional arrangement two LEDs wide and multiple LEDs long. The strip 3600 can be cut to a desired length and are malleable and fairly durable and can be coated in a clear or colored coating to be waterproof or uncoated. In one embodiment, a set of LEDs, two wide and three long can be used where the first row is red, the next is green and the third is yellow, orange or some other color that is desired to indicate various types of warnings. The components of the strip 3600 include a copper connecting pad 3602, a voltage rating indicated 3604, soldering pads 3606, supporting circuitry 3608, an LED SMD chip 3610, connection polarity markings 3612 and a cutting interval 3614.

Figure 37:
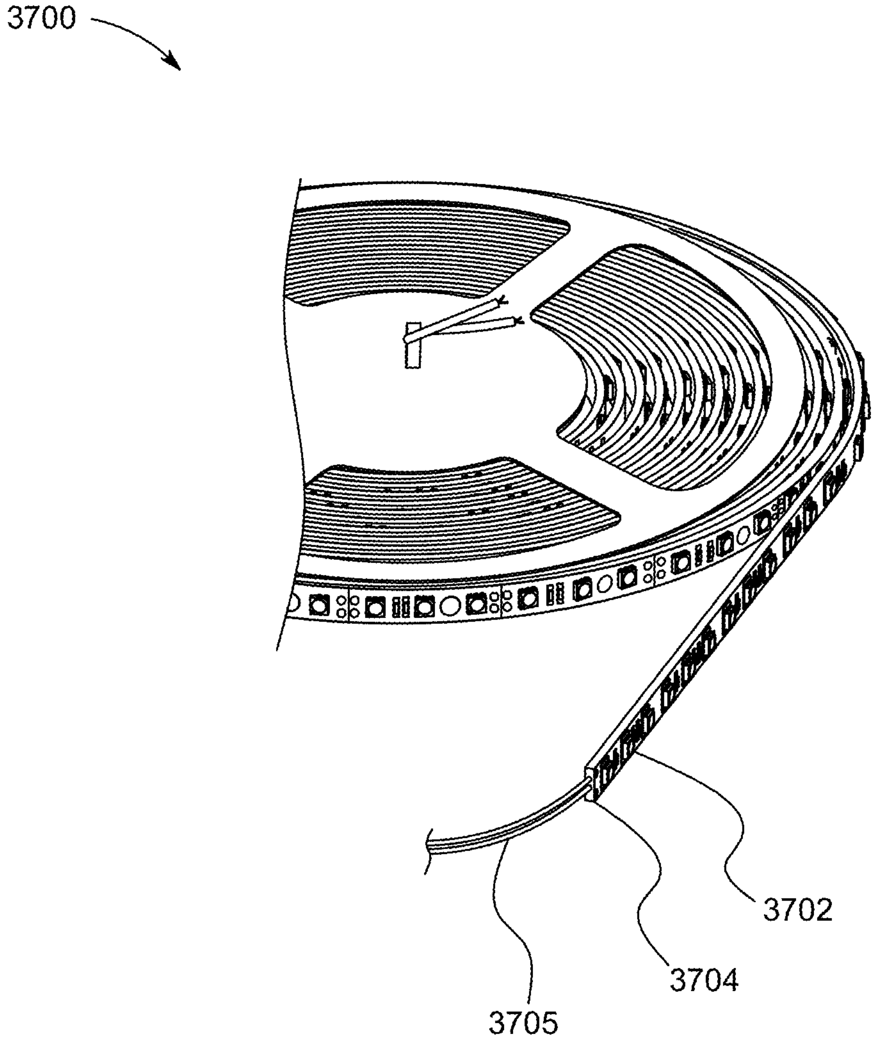
FIG. 37 is an illustration of another exemplary strip of LEDs.

FIG. 37 is an illustration of an exemplary strip 3700 of LEDs. This is similar to the strip 3600 of FIG. 36 and provides another illustration. Also shown are a waterproof coating 3702, and power and ground wires (3704/3705).

Figure 38A:
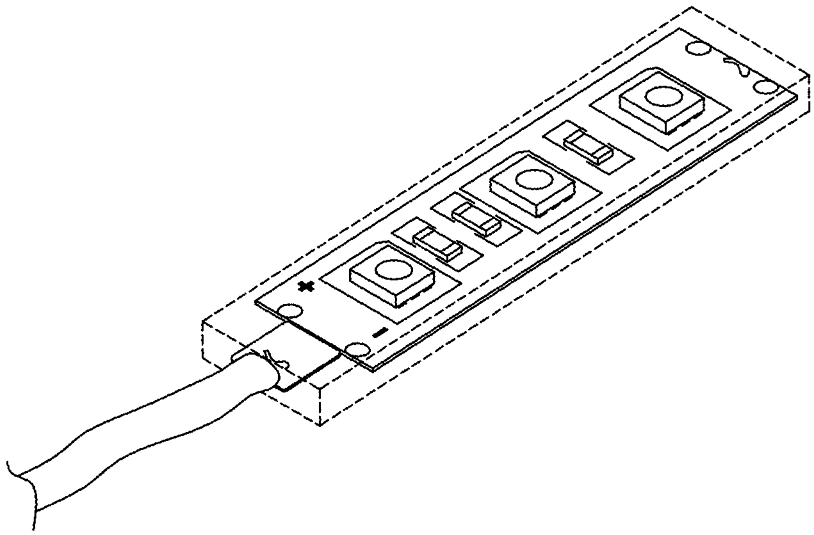
FIGS. 38A and 38B illustrations of another exemplary strip of LEDs, respectively, in coated and uncoated form.
Figure 38B:
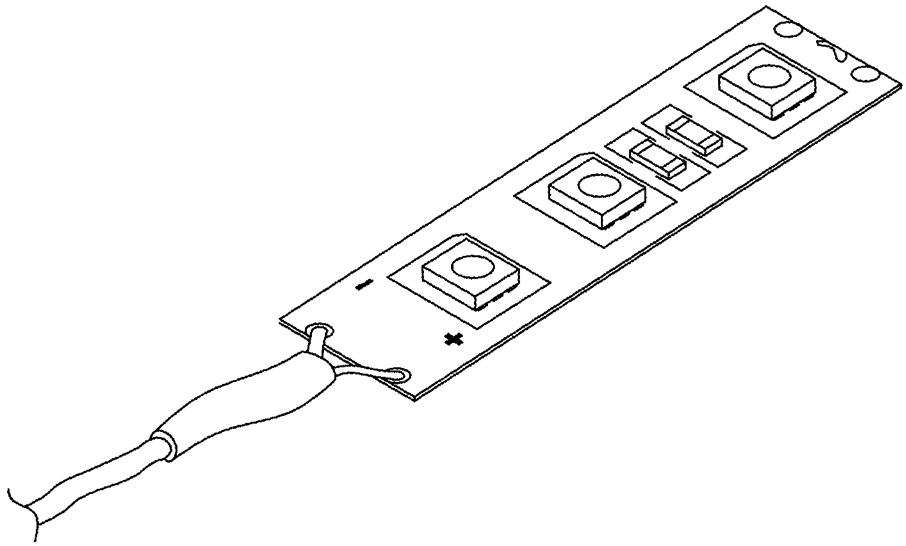

FIGS. 38A and 38B illustrations of another exemplary strip of LEDs, respectively, in coated and uncoated form. The strips shown in these figures may take the form described above in connection with FIGS. 35-37.

Figure 39:
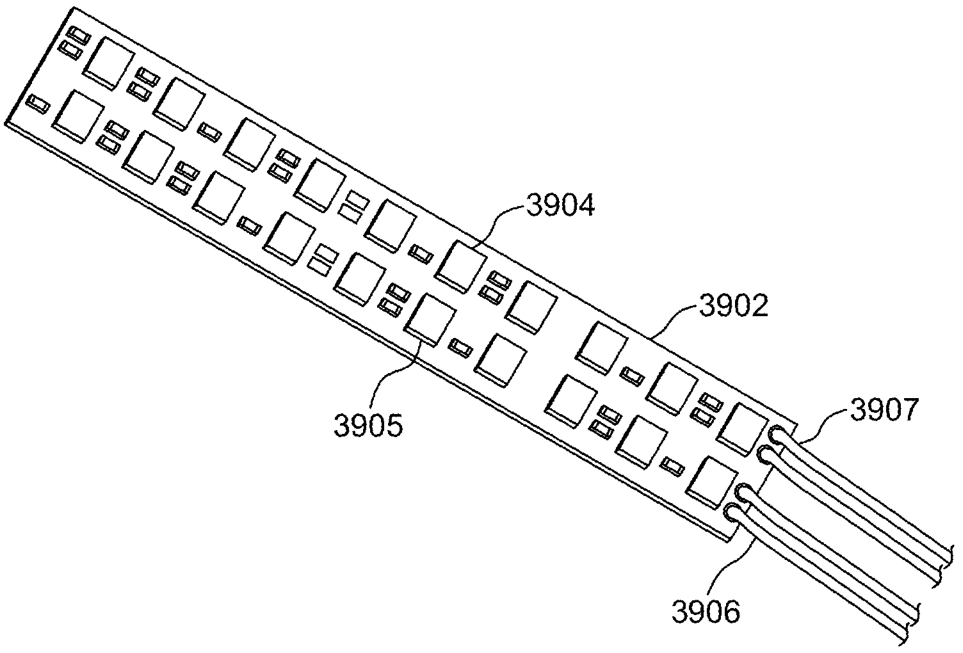
FIG. 39 is an illustration of another exemplary strip of LEDs with the LEDs mounted in two rows side by side.

FIG. 39 is an illustration of another exemplary strip of LEDs with the LEDs mounted in two rows side by side. This is an alternative to the strip shown in FIG. 36. Resistors and the circuit board are shown at 3902, LED chips at 3904, 3905 and power and ground wires at 3906 and 3907 respectively.

Figure 40:
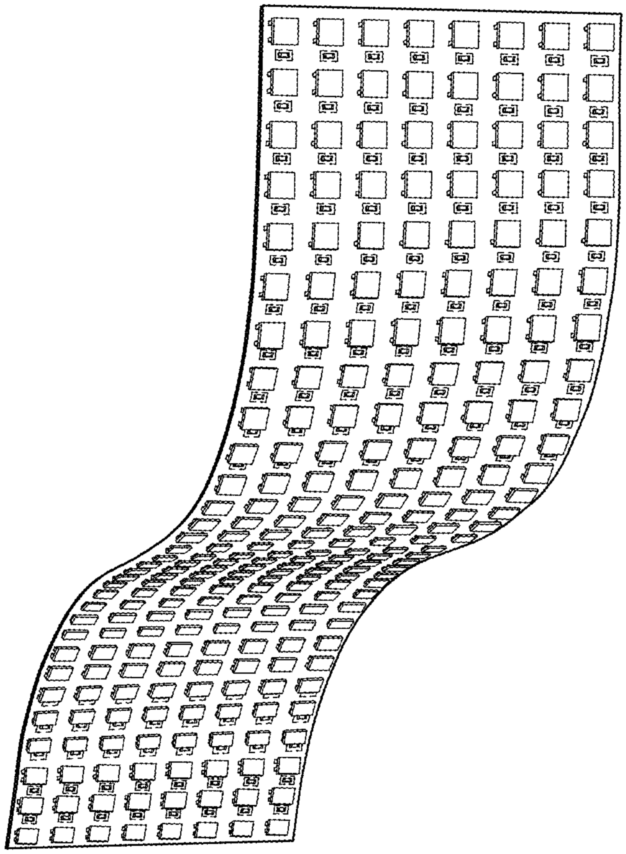
FIG. 40 is an illustration of another exemplary strip of LEDs with the LEDs mounted in multiple rows side by side.

FIG. 40 is an illustration of another exemplary strip of LEDs with the LEDs mounted in multiple rows side by side. This is a wider version to the strips shown in FIGS. 36 and 39 and provides a wider array of LEDS to be used in a visual indicator. For example, such a wide array could be employed in a pillar such as the B or C pillar of a vehicle as further described elsewhere in this specification.

Figure 41:
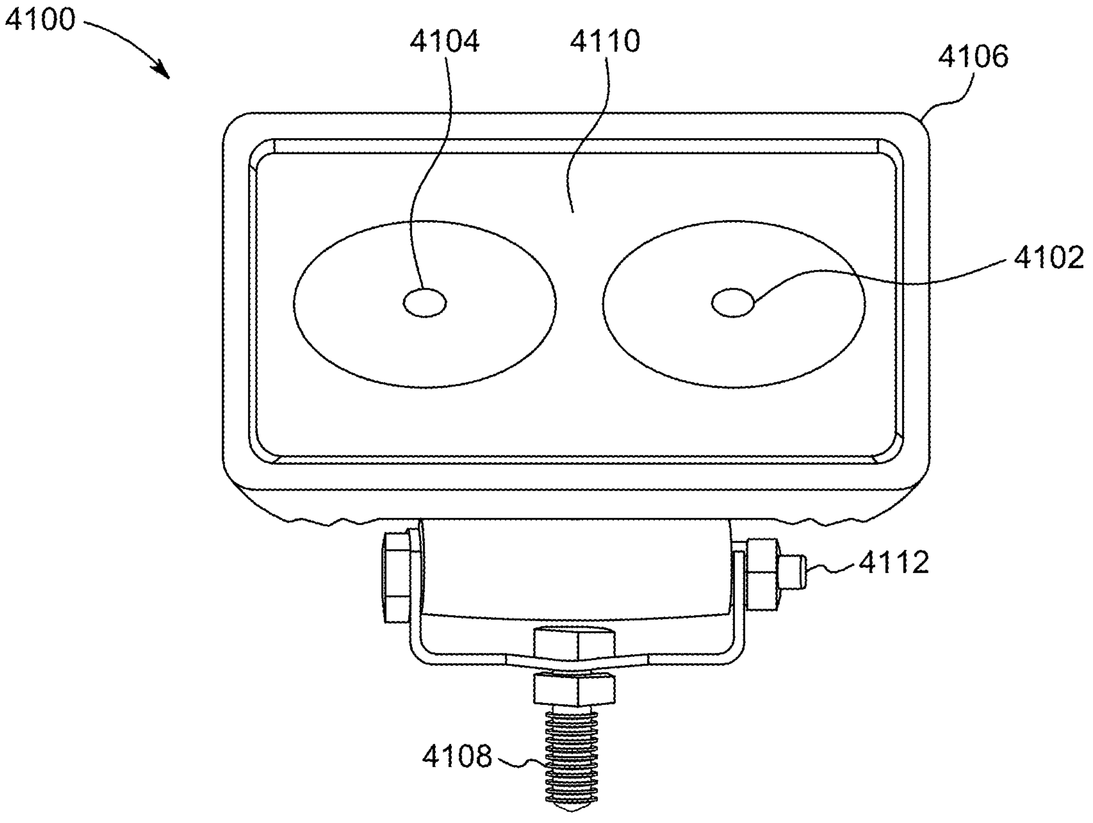
FIG. 41 is a view of an exemplary enclosed LED light with lens and waterproof housing.

FIG. 41 is a view of an exemplary enclosed LED light 4100 with lens and waterproof housing. The LED includes LED chips 4102 and 4104 which may be the same or different colors. The light 4100 includes a housing 4106, a mount 4108 and a lens 4110 which may be angled for light dispersion. The light may also be angled by way of adjustment point 4112.

Figure 42:
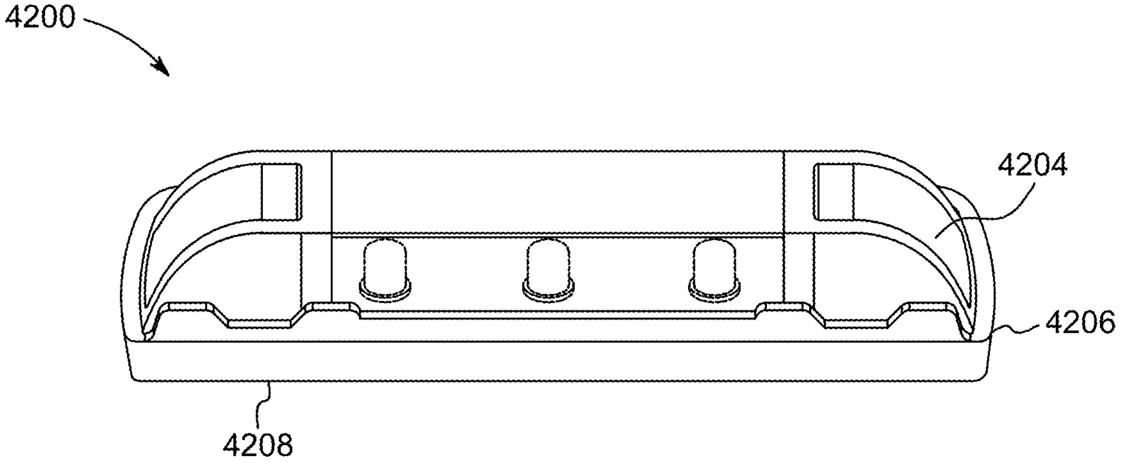
FIG. 42 is an illustration of an exemplary surface mounted LED light.

FIG. 42 is an illustration of an exemplary surface mounted LED light 4200, which features a waterproof polycarbonate housing 4204, a rubber mounting flange 4206, one or more LED light chips 4208 with associated electronics. The LEDs contained in the unit can be of any color and can be programmed to have an infinite array of colors and patterns.

Figure 43:
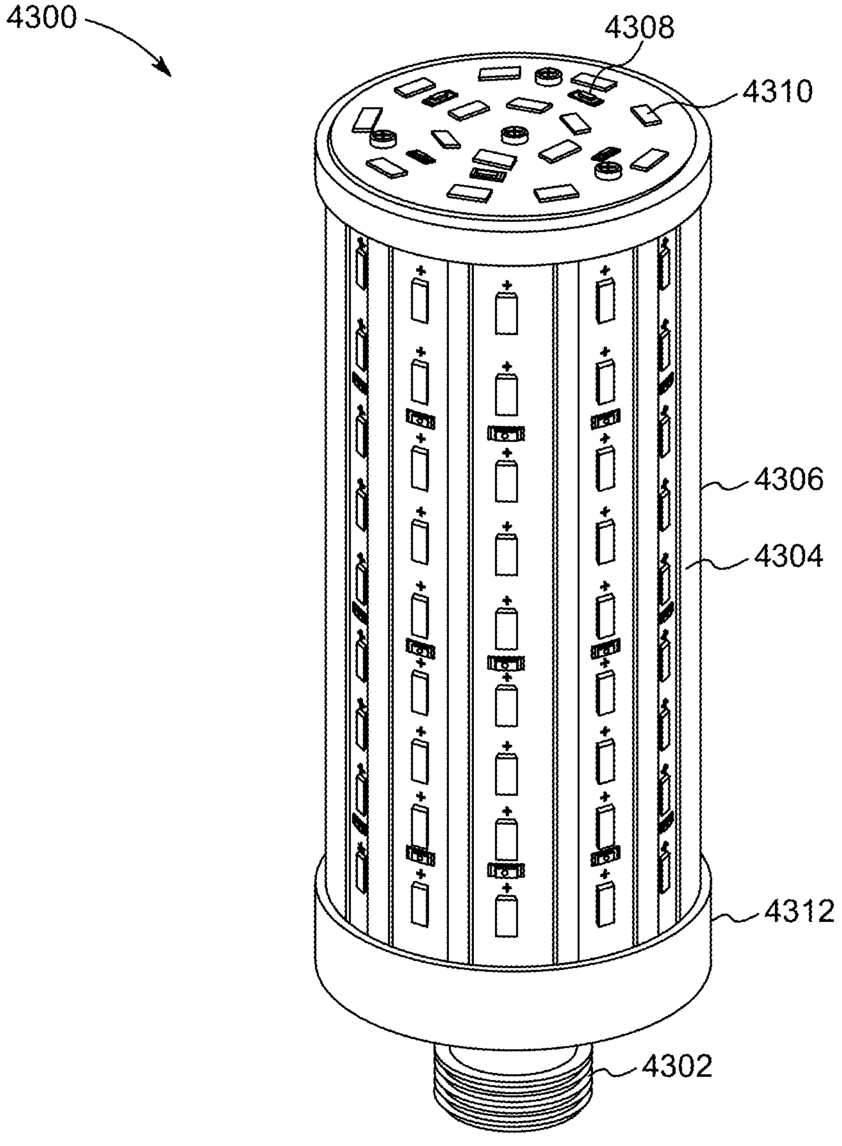
FIG. 43 is a view of an exemplary corn cob type LED light.

FIG. 43 is a view of an exemplary corn cob type LED light 4300. This type of unit has many advantages in certain embodiments. It can be used in a regular edison incandescent base seen at 4302, gives 360 degrees of illumination, has a flat top surface to project the LED light upwards, and has all of the electronics, resistors and wiring inside the "cob". These units can be coated to make them waterproof like the coated light strips and are at least ten times brighter and use a fraction of the power needed for incandescent bulbs. Such units may be simply swapped with existing incandescent bulbs. The unit shown includes a screw in base 4302 for connecting to a power source, a plurality of LED chips 4304, separators or brackets 4306, atop mounted board 4308 with LEDS 4310 and a housing 4312.

Figure 44:
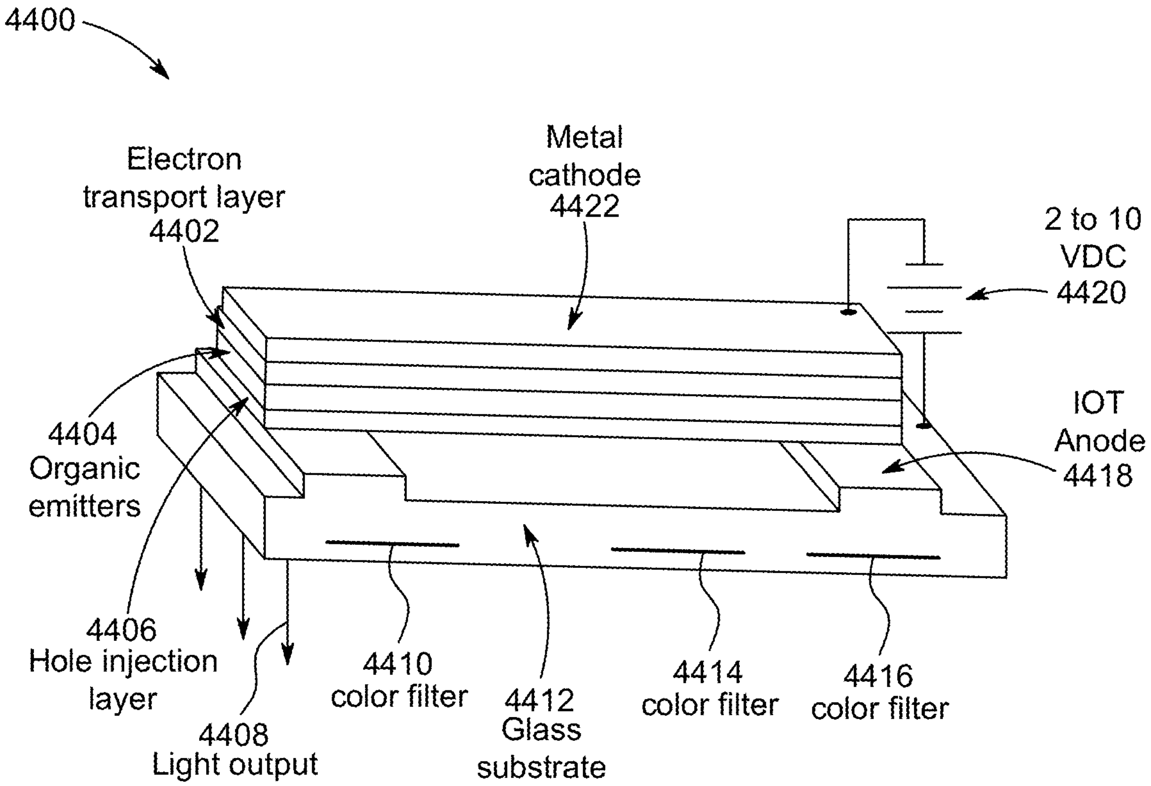
FIG. 44 is an illustration of an exemplary Organic Light Emitting Diode (OLED).

FIG. 44 is an illustration of an exemplary Organic Light Emitting Diode (OLED) 4400 that may be employed in various embodiments of visual indicators disclosed herein. OLEDS are flat and in certain forms can be painted on any surface, illuminating the whole area. They can also be painted in stripes, which can light up in different colors indicating various types of danger. Shown in connection with OLED 4400 is an electron transport layer 4402, organic emitters 4404, a hole injection layer 4406, a light output 4408, a red light filter 4410, a green light filter 4412, a blue light filter (or any other desired colors) 4414, a glass substrate 4416, an ITO anode 4418, a voltage converter 4420, and a metal cathode 4422.

Figure 45:
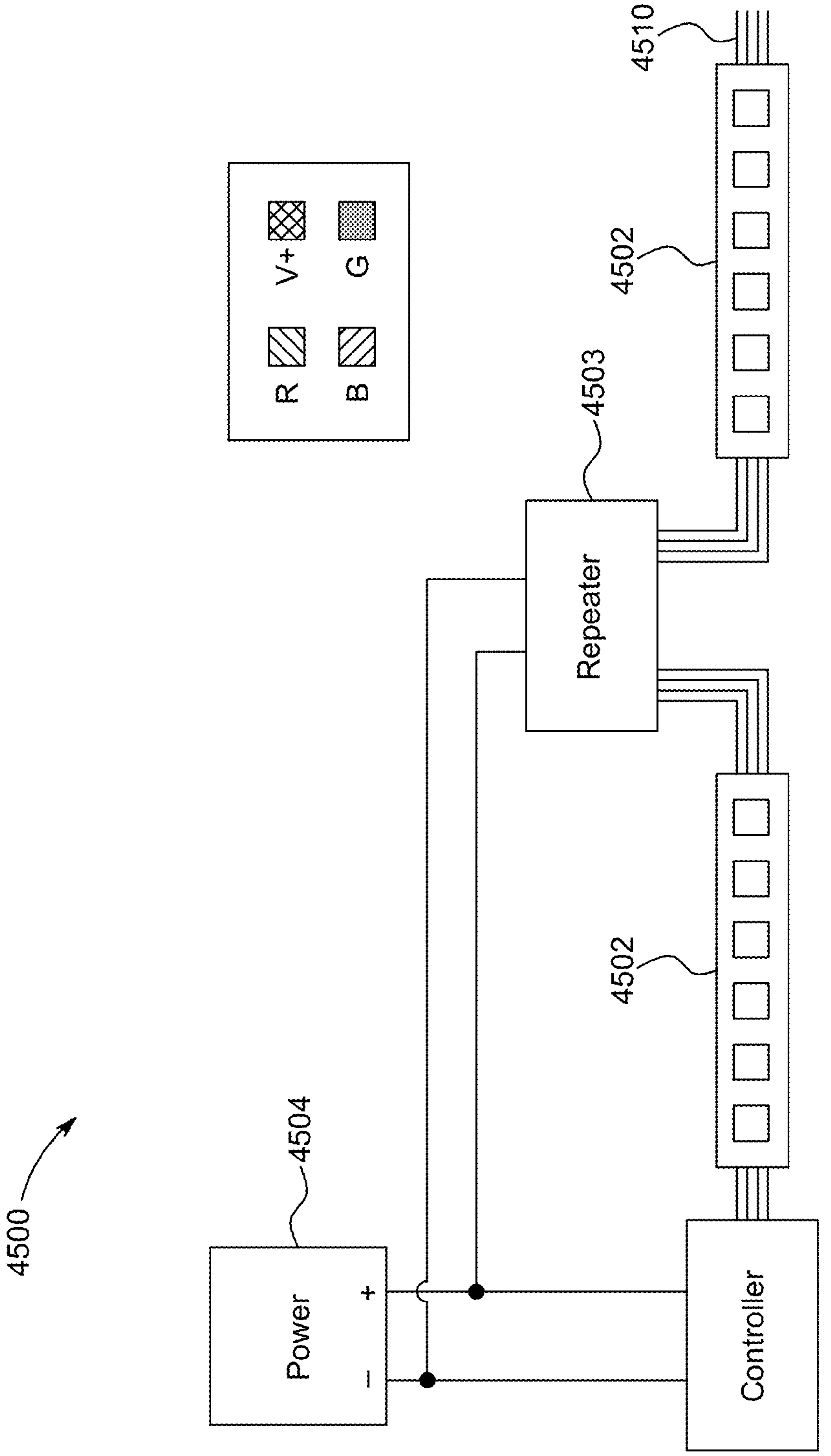
FIG. 45 is an illustration of an exemplary LED lighting system with associated controls.

FIG. 45 is an illustration of an exemplary LED lighting system 4500 with associated controls to implement a signal amplifier to control multiple LED strips 4502. The system 4500 includes a power source 4504, a controller 4506, a repeater (data repeater) 4508 and connector wires 4510 to permit connection to another system 4500.

Figure 46:
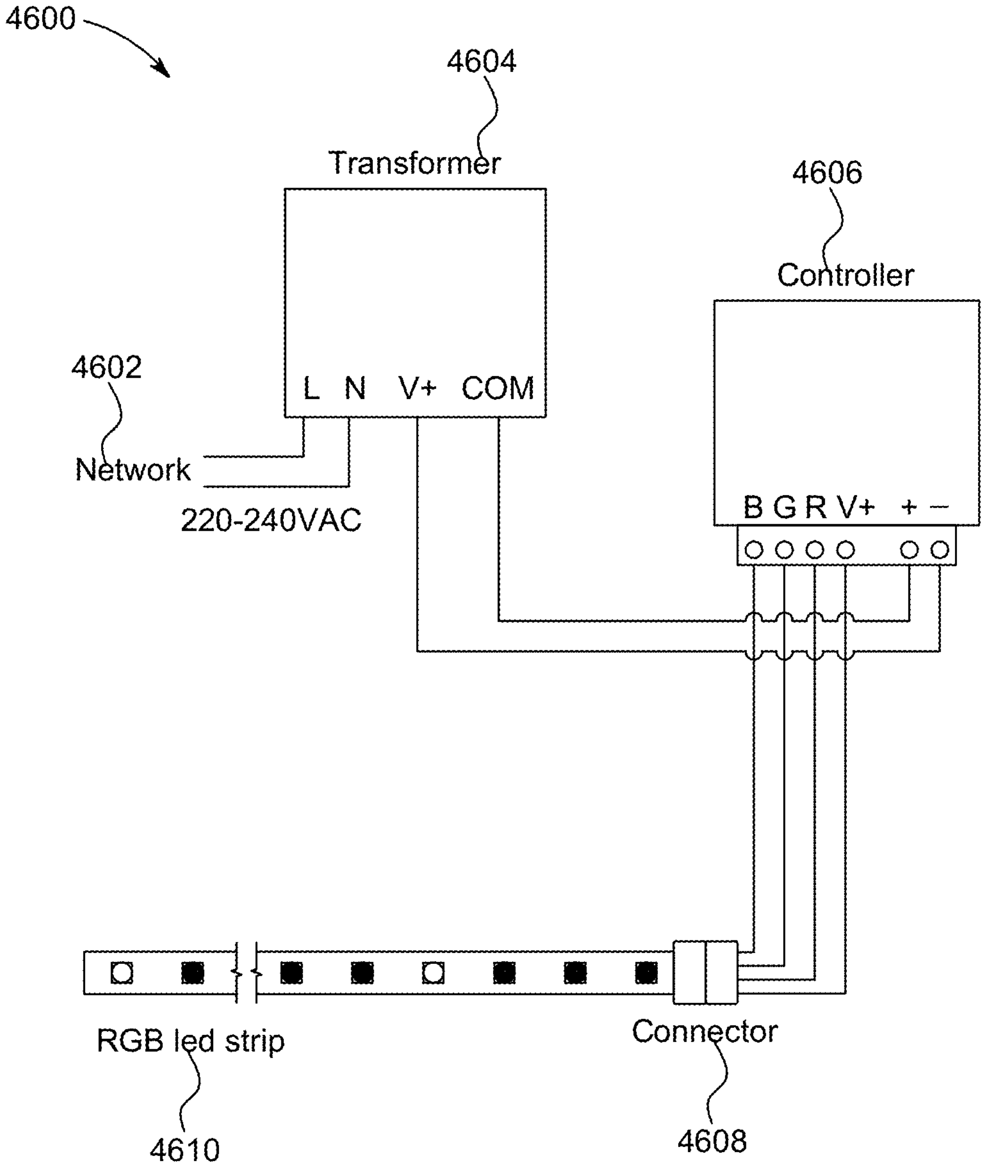
FIG. 46 is an illustration of another exemplary LED lighting system with associated controls.

FIG. 46 is an illustration of another exemplary LED lighting system 4600 with associated controls. This embodiment includes a power network 4602, a transformer 4604, a controller 4606, a connector 4608 and an LED strip 4610.

Figure 47:
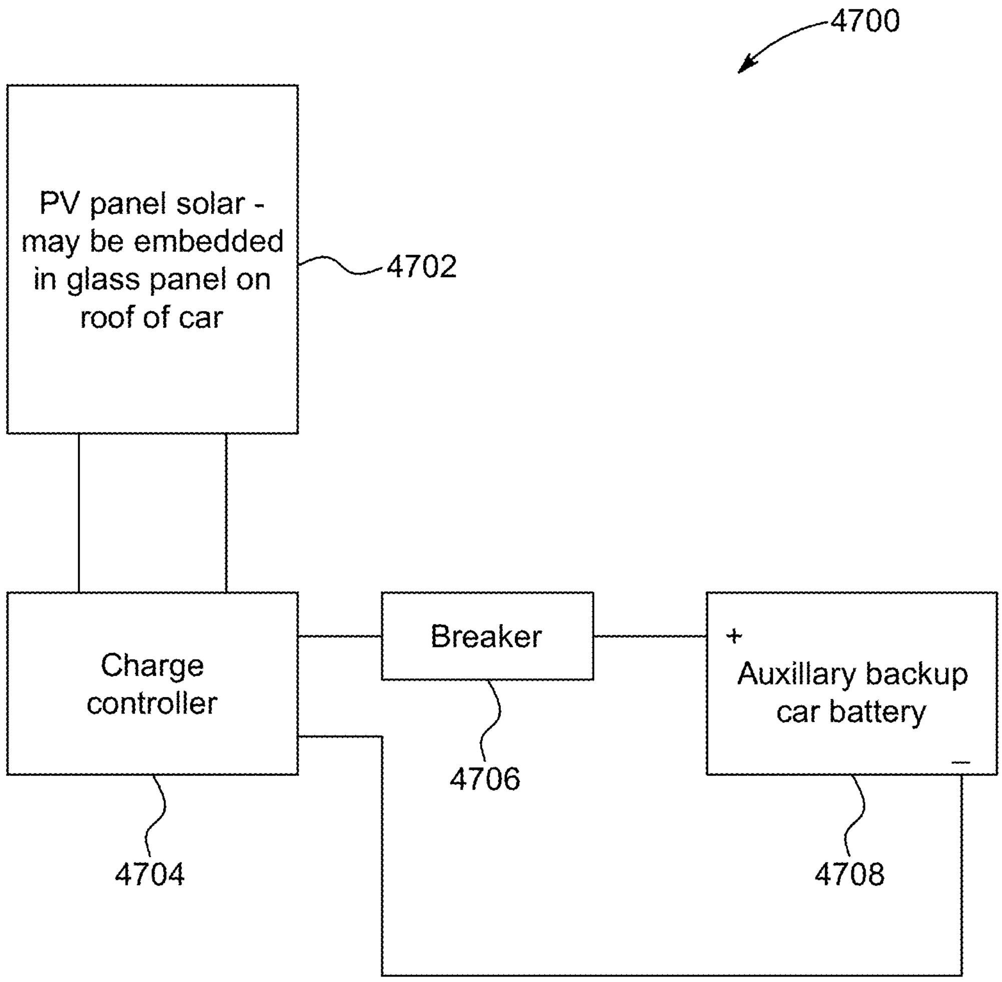
FIG. 47 is an illustration of a solar charging system that may be used in connection with the disclosed vehicle indicator(s).

FIG. 47 is an illustration of a solar charging system 4700 that may be used in connection with the disclosed vehicle indicator(s). The system 4700 can be employed to provide solar charging of the various disclosed back up batteries for light and sound components. The system 4700 includes a photo-voltaic solar panel 4702, a charge controller 4704, a breaker (to protect from power overload situations) for example and a backup battery 4708.

Figure 48:
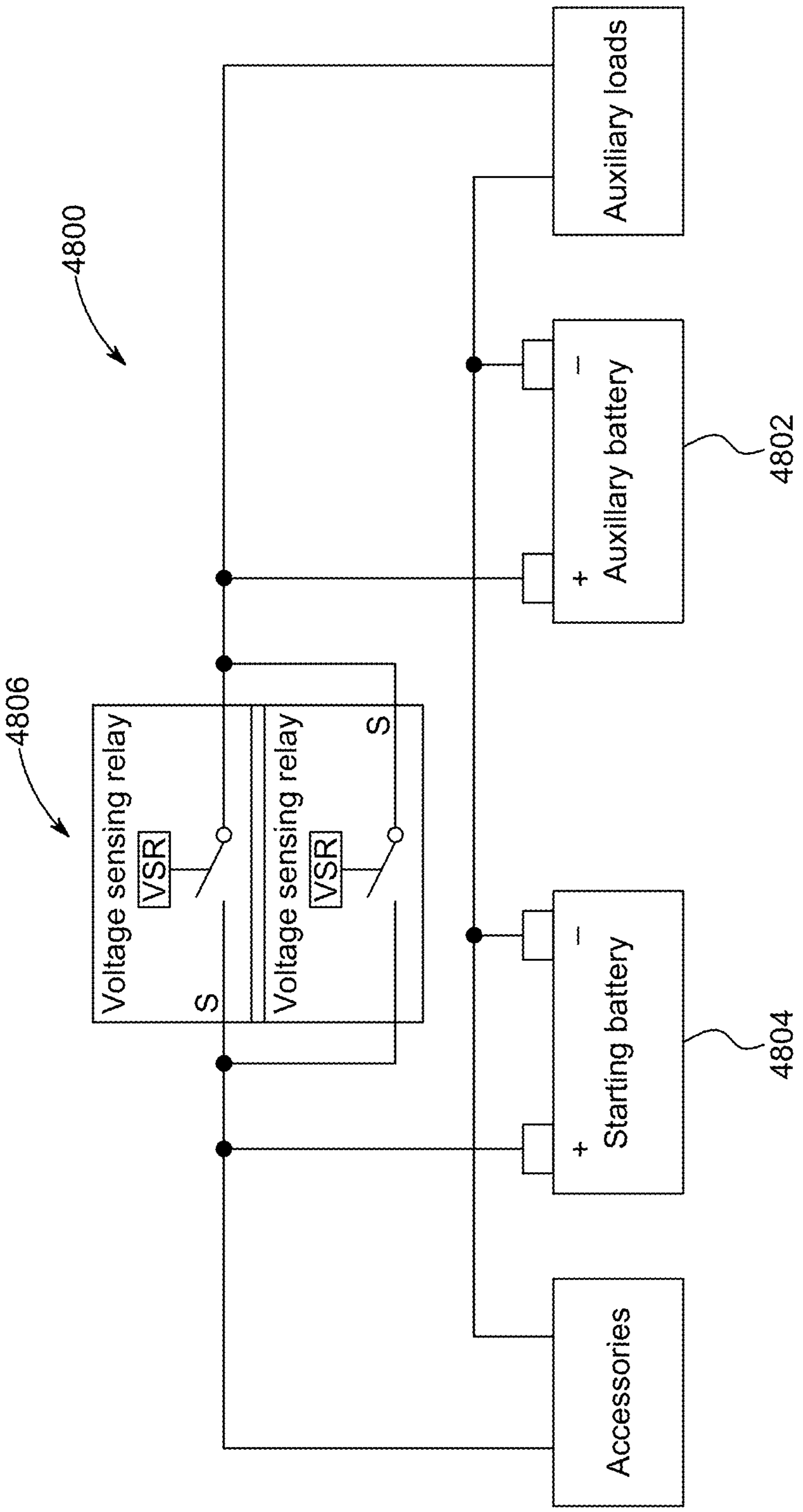
FIG. 48 is an illustration of a battery backup system that may be used in connection with the disclosed vehicle indicator(s).

FIG. 48 is an illustration of a battery backup system 4800 that may be used in connection with certain of the disclosed vehicle indicator(s). This system 4800 includes an auxiliary battery 4802 connected in parallel with a starting battery 4804 by way of relays 4806. In certain embodiments, short term backup power may be provided by way of a capacitor associated with a particular indicator to provide a charge for a brief period of time to provide the necessary power to the associated indicator. Given the fairly constant state of power in a vehicle and such a capacitor will remain continuously charged when power is available and will provide necessary power for a brief period of time to power the associated indicator.

Figure 49:
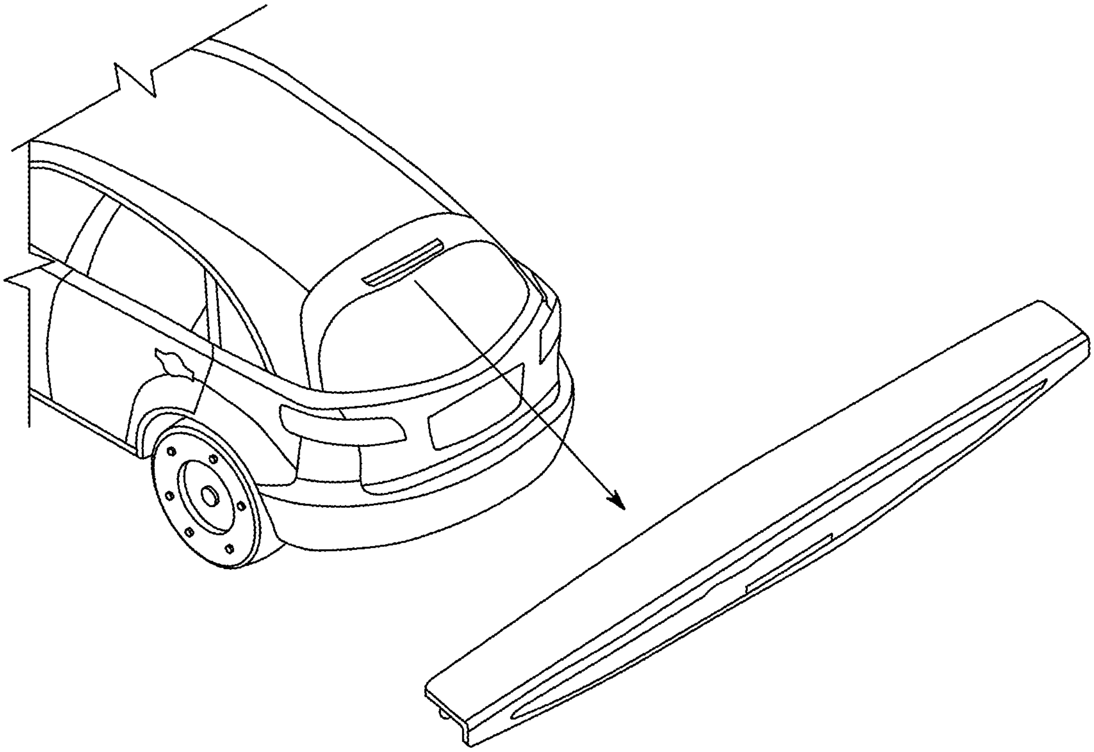
FIG. 49 is an illustration of a vehicle indicator mounted in a third brake type light.

FIG. 49 is an illustration of a vehicle indicator mounted in a third brake type light. Such lights are required in the U.S. and integration into such a device can simplify the required components.

Figure 50:
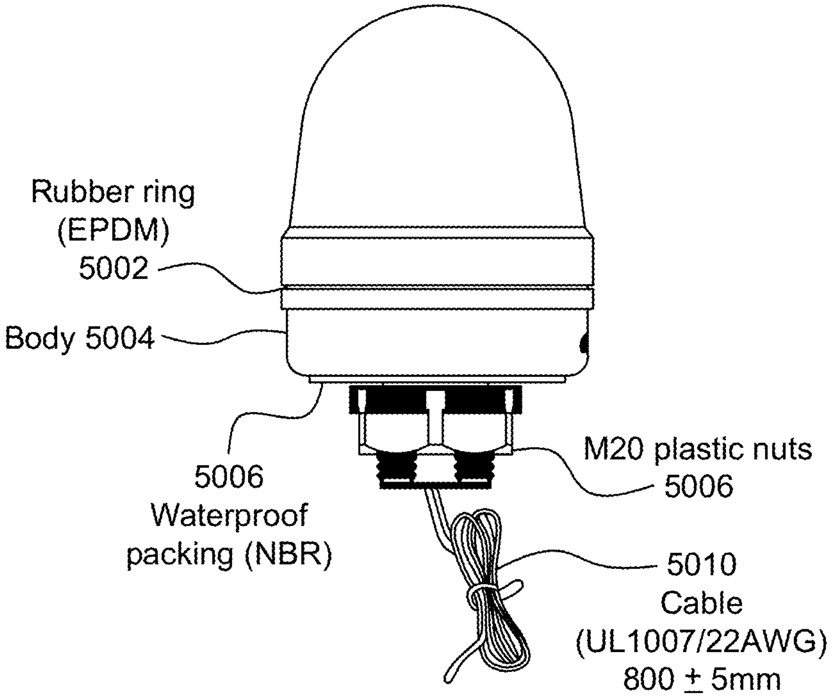
FIG. 50 is an illustration of an exemplary bulb that may be used in a vehicle indicator.

FIG. 50 is an illustration of an exemplary bulb 5000 that may be used in a vehicle indicator. The bulb 5000 may contain a corn cob LED arrangement, an incandescent bulb, LED strips, one high power LED chip, or the entire inner or outer surface may be painted with LED. As described in this application. an advantage of using what the observer may think of as a typical bulb, would make the user look to that bulb if there is an emergency. Typically we know police cars have special lights, as do exit signs in theatres. If there is an emergency, those in the vicinity may look for the traditional warnings which may be advantageous. The bulb 5000 includes a body 5002, a rubber ring 5004, a waterproof packing 5006, plastic nuts 5008 and a cable 5010.

Figure 51:
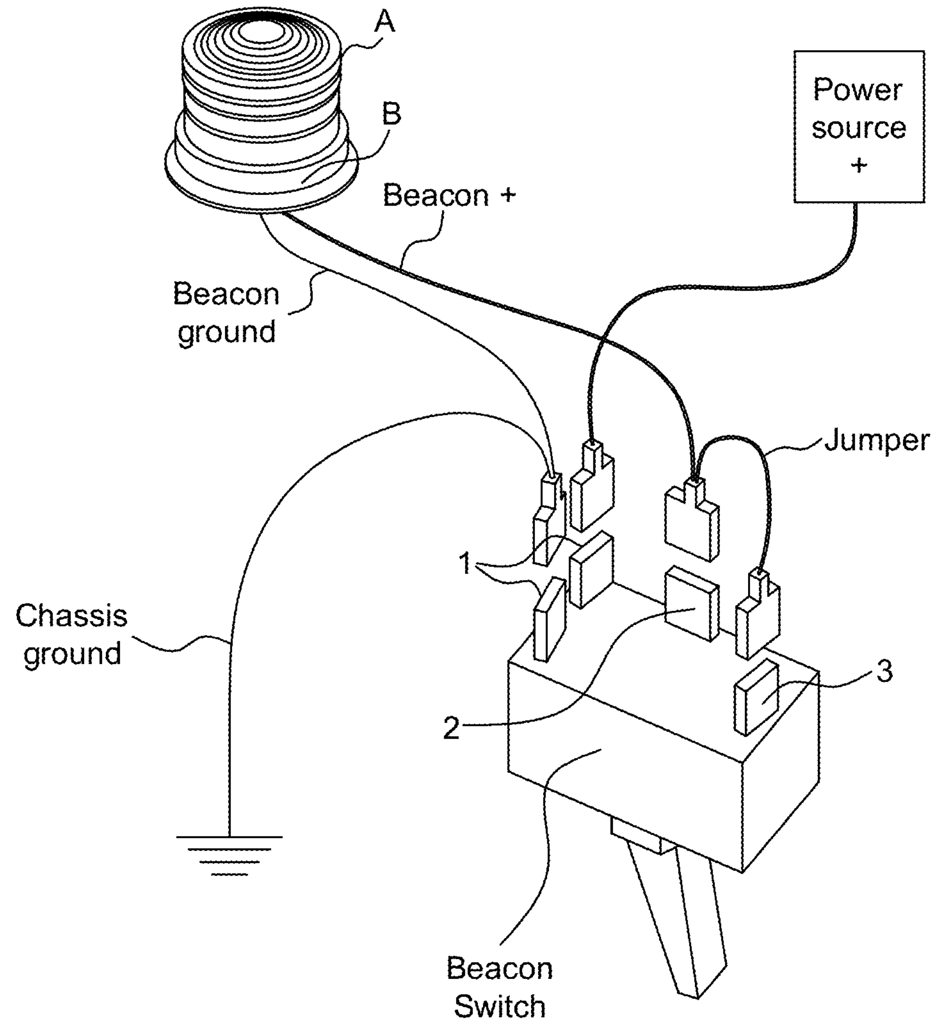
FIG. 51 is an illustration of an exemplary connection for the bulb of FIG. 50.

FIG. 51 is an illustration of an exemplary connection for the bulb of FIG. 50. The light mimics a traditional boat's beacon light. Those in the immediate area have been trained to look for boat lights like these. The external casing of the corn cob, OLED light, or it's contents mask as a traditional light, so the danger is immediately recognizable. Initially an OLED waring stripe on the side of a boat, ship or ferry may cause confusion until the public is trained to understand the warning or such warnings have been in use. LEDs illuminate faster than incandescent bulbs, are brighter and go from dark to bright faster, increasing the noticeability.

Figure 52:
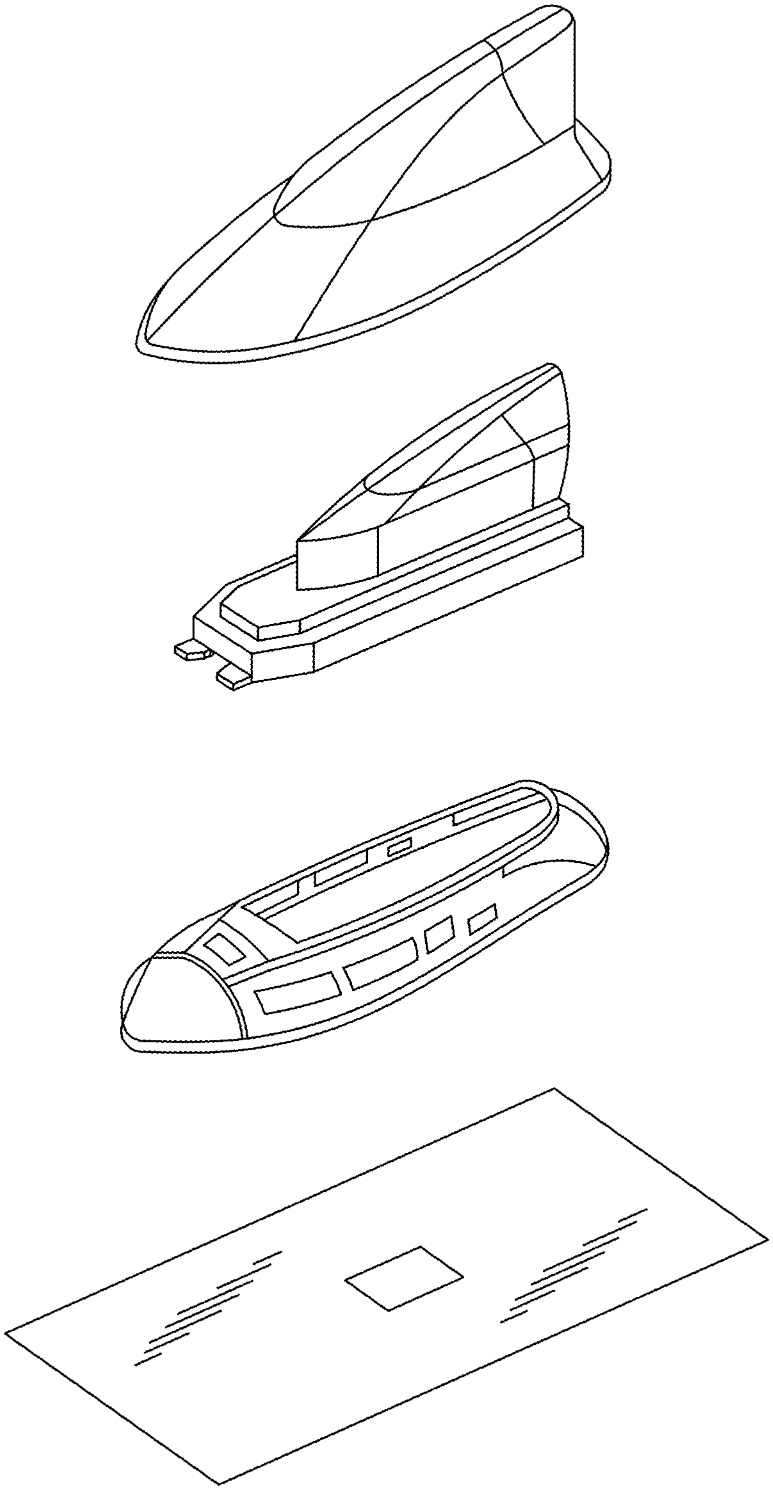
FIG. 52 is an illustration of a "sharks fin" type roof mounting that may be used in a vehicle indicator.

FIG. 52 is an illustration of a "sharks fin" type roof mounting that may be used in a vehicle indicator. The outer shell may be painted with an OLED substrate, may be painted inside with an OLED substrate, may have one or a plurality of LEDs flushly mounted on the surface, along with a sound component.

In the foregoing embodiments, the visual indicator may take a variety of forms, such as an incandescent bulb or an LED (Light Emitting Diode) that is disposed in a water and otherwise weather, resistant housing. LEDs are thin and can be applied on a surface or fit into an indented area. Organic OLEDs are even thinner and can be applied to any surface. Bulbs use more power, and produce less light per watt, so LEDs are likely to perform better for many applications. Since they are not "bulbs" their lifespan can be greater than ten years. LEDs also do not dim as much as they age, like incandescent bulbs. The lumens can vary, but the indicator should be visible in any outdoor condition. For example, a bright car's reverse light has 950 lumens, which is sufficiently bright to be visible to a first responder even in inclement weather. See, e.g. https://www.vleds.com/shop-application/reverse-back-up/921-led/921-6-ho-c.html. For other applications, to permit visibility from a greater distance, the brightness may be greater, perhaps in the vicinity of 10,000 lumens (e.g. approximately that of an LED high beam headlight).

In certain embodiments the indicator may provide an indication other than or in addition to a visual indication. The indication may be an audible indication or may be an electronic indication provided from the vehicle to an electronic device separate from the vehicle.

The indicator should be positioned so as to be visible to an average person. If the indicator is positioned on the roof of a vehicle, it should be visible from any viewpoint, in other words a 360-degree viewing area. In an embodiment where the indicator takes the form of a roof mounted LED, it can take the form of a series of LEDs, in a circular row, like a wedding band, covered in diamonds, one LED in a light guide that disperses the light in a circle or one bright incandescent bulb, that has a 360 degree viewing area.

In embodiments where the indicator employs RFID, the RFID tag disposed on the vehicle should be within a water and weather resistant housing, such as within a clear lens, such that the housing does not interfere with transmission or reception of the signal to/from the tag. In one embodiment, the tag may be located by the rear-view mirror in a car, which is typically where tags employed for toll purposes (e.g. E-ZPass and similar systems). These tags need to be positioned to be read by a receiving unit. If the tag is going to be read by a scanner, upon entry to a garage the tag's information needs to be in a position to be read, such as in the center, side, front or rear of the vehicle depending on the desired application. The tag/QR Code, Bar Code, chip etc., may be mounted on the roof of the vehicle which would present a 360 degree of transmission or readability. An advantage of RFID tags is that they can be read outside the line-of sight. In a conventional implementation, an RFID tag consists of an integrated circuit and an antenna. The tag is also composed of a protective material that holds the pieces together and shields them from various environmental conditions. The protective material depends on the application. RFID tags come in a variety of shapes and sizes and are either passive or active. Passive tags are smaller and less expensive to implement. Passive tags must be "powered up" by the RFID reader before they can transmit data. Unlike passive tags, active RFID tags have an onboard power supply (e.g., a battery), thereby enabling them to transmit data at all times.

Some embodiments may employ a bar code or a QR (Quick Response) code for identification. A barcode is a machine-readable optical label that contains information about the item to which it is attached. A QR code consists of black squares arranged in a square grid on a white background, which can be read by an imaging device such as a camera, and processed using Reed-Solomon error correction until the image can be appropriately interpreted. The required data is then extracted from patterns that are present in both horizontal and vertical components of the image. QR codes often contain data for a locator, identifier, or tracker that points to a website or application.

In one embodiment, the vehicle information may be encoded in a manner such as in chip cards used for financial transactions. Such chip cards, which may store the vehicle information in a computer chip permit generation of one or more unique codes pertaining to the vehicle that are not stored. This permits collection of the vehicle information, for example by a garage or tunnel and only temporarily storing the information (e.g. 1 day, 30 days). This permits greater compliance with privacy concerns.

Any indicator that requires power should be coupled to power in a manner to cause power to be supplied to the indicator even when power from the vehicle is off. This can be accomplished by way of connection to one or more power sources, including a local battery, to enable power to the indicator in the event that one or more power sources of the vehicle are inoperative.

The results and advantages are an all-inclusive safety system that protects the public, first responders, drivers, etc. The system in part or in its whole, provides information as to what vehicles are in tunnels, and garages. It can then send a visual and or acoustical warning outside the area or in the area, alerting the public and first responders of an imminent danger if one occurs outside of or in the parking area or in a tunnel. A visual indicator(s) and potentially a sound component may be employed to warn of a danger, and in the case of battery vehicles and hydrogen vehicles, when they are safe to approach. The gasoline vehicle can be approached after the fire is extinguished, the battery vehicle may be approachable for days, due to the excessive heat from the batteries, and the hydrogen vehicle is safe to approach only when the hydrogen has been vented from the vehicle tank(s). Additional advantages in a nighttime, dark tunnel or dark parking garage area is that the visual warnings would be placed in plain sight, in areas that statistically stay intact during a crash (Insurance Institute for Highway Safety 2019). The illuminated indicator would have 360 degrees viewing area. In one version, it would have illuminated indicators at the top of the "B" pillar, above the front windshield and above the rear window.

Additionally, the indications disclosed herein are vital in situations such as multi-car/truck accidents on interstates. Cars and trucks routinely pile up due to fog or ice. In such an accident, the vehicles may be so densely packed together, that it is extremely difficult to visually identify the type of power source(s) of each involved vehicle. The power source (s) can be hydrogen, gasoline, battery, etc. and various combinations thereof and each may require a different type of rescue procedure.

The information pertaining to power source type can also be transmitted to other vehicles, with or without drivers. Autonomous vehicles may play a dominant role in the future, and the occupants must know where the accident is, and what is the safest way exit to safety, to avoid a fire or hydrogen venting situation. The instructions pertaining to an emergency event can take the form of an alert in the in-cabin screen and or an audible alert, using a recorded voice or any other type of warning. Autonomous vehicles will be connected via Bluetooth, WiFi or IoT (The Internet of Things) or any other future communication methods. This system can be accessed remotely by emergency responders, to guide the occupants. For individual passenger, driver driven cars, the alert and guidance can appear on the IP (Instrument Panel), navigation screen or in the "Head's Up" display. It will alert the driver as to how to exit the vehicle and the path to take, if it is safe to exit the vehicle. If it is not safe to exit the vehicle, the responders can communicate vocally, through an acoustical alert, or through any display system that they should remain in the vehicle, until rescued or it is safe to exit.

Aspects of certain of the embodiments herein can be implemented employing computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The terms "computer system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 53:
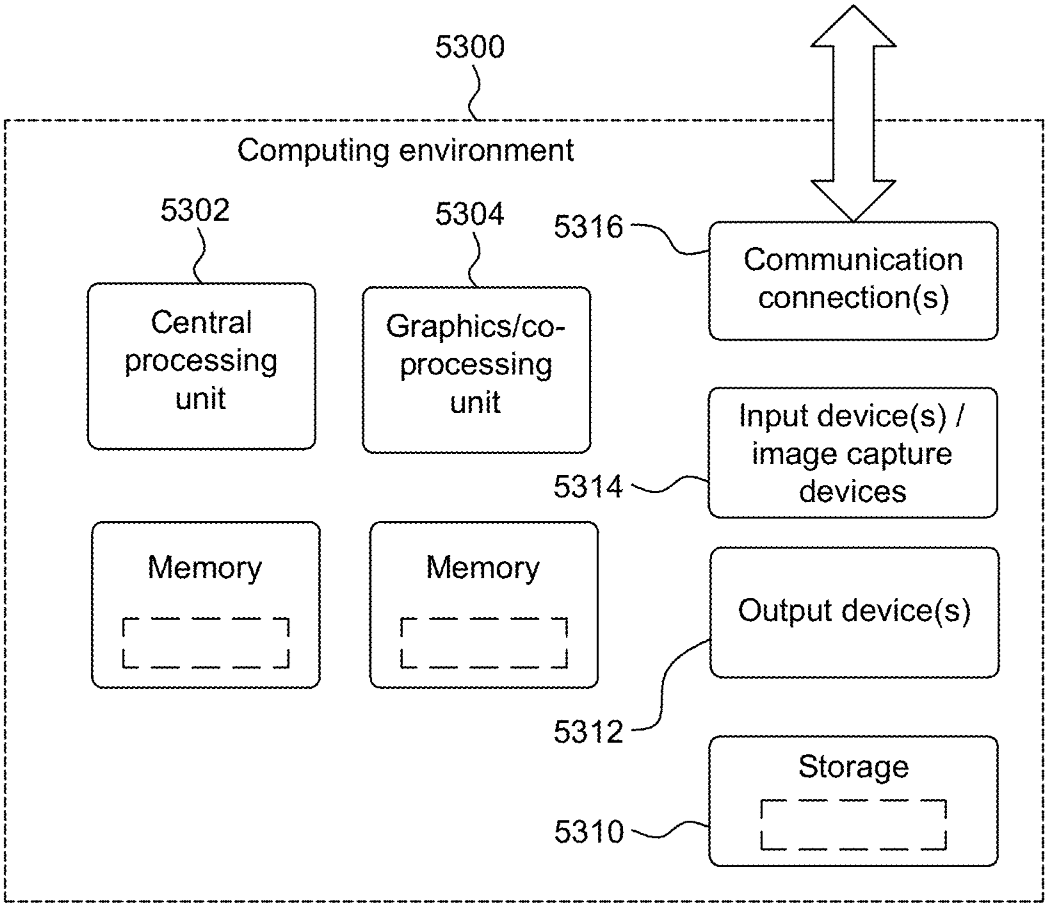
FIG. 53 is a block diagram of an exemplary computing environment that may be employed in implementing computerized aspects of the systems, methods and stored program modules described herein.

FIG. 53 illustrates a block diagram of hardware that may be employed in an implementation of the embodiments disclosed herein employing computer-executable instructions. FIG. 53 depicts a generalized example of a suitable general-purpose computing system 5300 in which the described innovations may be implemented in order to improve the processing speed and efficiency with which the computing system 5300 operates to perform the functions disclosed herein. With reference to FIG. 53 the computing system 5300 includes one or more processing units 5302, 5304 and memory 5306, 5308. The processing units 5302, 5306 execute computer-executable instructions. A processing unit can be a general-purpose central processing unit (CPU), processor in an application-specific integrated circuit (ASIC) or any other type of processor. The tangible memory 5306, 5308 may be volatile memory (e.g., registers, cache, RAM), non-volatile memory (e.g., ROM, EEPROM, flash memory, etc.), or some combination of the two, accessible by the processing unit(s). The hardware components in FIG. 53 may be standard hardware components, or alternatively, some embodiments may employ specialized hardware components to further increase the operating efficiency and speed with which the system 10 operates. The various components of computing system 5300 may be rearranged in various embodiments, and some embodiments may not require nor include all of the above components, while other embodiments may include additional components, such as specialized processors and additional memory.

Computing system 5300 may have additional features such as for example, storage 5310, one or more input devices 5314, one or more output devices 5312, and one or more communication connections 5316. An interconnection mechanism (not shown) such as a bus, controller, or network interconnects the components of the computing system 5300. Typically, operating system software (not shown) provides an operating system for other software executing in the computing system 5300, and coordinates activities of the components of the computing system 5300.

The tangible storage 5310 may be removable or non-removable, and includes magnetic disks, magnetic tapes or cassettes, CD-ROMs, DVDs, or any other medium which can be used to store information in a non-transitory way, and which can be accessed within the computing system 5300. The storage 5310 stores instructions for the software implementing one or more innovations described herein.

The input device(s) 5314 may be a touch input device such as a keyboard, mouse, pen, or trackball, a voice input device, a scanning device, or another device that provides input to the computing system 5300. For video encoding, the input device(s) 5314 may be a camera, video card, TV tuner card, or similar device that accepts video input in analog or digital form, or a CD-ROM or CD-RW that reads video samples into the computing system 5300. The output device (s) 5312 may be a display, printer, speaker, CD-writer, or another device that provides output from the computing system 5300.

The communication connection(s) 5316 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with the disclosed embodiments, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A structure that accepts a plurality of vehicles comprising:

a receiving unit that receives a first electronic signal from a first vehicle entering the structure, the first electronic signal encoded to contain information identifying one or more energy sources used by the first vehicle;

a processing unit that processes the first electronic signal to generate identification data that identifies for the first vehicle the one or more energy sources used by the first vehicle; and a storage unit that stores the identification data.

2. The structure of claim 1 wherein:

the processing unit compares the identification data to stored structure permission data to generate a vehicle entry indicator that indicates whether the first vehicle may enter the structure; and the structure further comprising a transmission unit that transmits to the first vehicle a second electronic signal that indicates to the first vehicle whether it may enter the structure.

3. The structure of claim 2 wherein:

the receiving unit receives the first electronic signal in response to a vehicle query signal generated by the processor and transmitted by the transmission unit.

4. The structure of claim 3 wherein:

the vehicle query signal is transmitted periodically by the transmission unit.

5. The structure of claim 1 wherein the structure is a parking structure.

6. The structure of claim 1 wherein the structure is a bridge.

7. The structure of claim 1 wherein the structure is a tunnel.

8. The structure of claim 1 wherein the first electronic signal takes the form of an RFID signal.

9. The structure of claim 1 further comprising a visual indicator positioned to be visible at an entrance to or exit from the structure, wherein the visual indicator provides a visual indication of one or more types of vehicles in the structure, an incident that occurred in the structure, or both.

10. The structure of claim 9 wherein the visual indicator provides the visual indication by way of one or more colors, text, a light pattern, a brightness characteristic, a flashing characteristic, or a combination thereof.

11. The structure of claim 1 further comprising an acoustical indicator that provides an acoustical indication of one or more types of vehicles in the structure, an incident that occurred in the structure, or both.

12. The structure of claim 2 wherein the vehicle entry indicator is further generated as a function of time of day and traffic density.

13. The structure of claim 11, wherein the acoustical indicator provides the acoustical indication by way of an alarm, spoken instructions, or both.

14. The structure of claim 1, wherein the structure is, or is a part of: an open-air type parking structure, a garage, a dock, an airport, a naval yard, a depot, a gas station, a liquefied petroleum (LP) fueling station, a liquid hydrogen station, a gaseous hydrogen fueling station, a system for charging electric vehicles, a nuclear reactor, a power generating system, or a combination thereof.

15. The structure of claim 1, wherein the first vehicle comprises: a car, a truck, a bus, a railroad car, a subway car, a moving crane, an airplane, a drone, an autonomous vehicle, a satellite, a ship, a submarine, or a tank.

16. The structure of claim 2, wherein the transmission unit is further configured to wirelessly transmit an indication of one or more types of vehicles in the structure, an incident that occurred in the structure, or both.

17. The structure of claim 16, wherein the indication is wirelessly transmitted to a mobile phone, a station operator, an emergency service, a remote location, or a combination thereof.

* * * * *